United States Patent
Thomas et al.

(10) Patent No.: US 7,958,245 B2
(45) Date of Patent: *Jun. 7, 2011

(54) METHOD AND SYSTEM FOR PROVIDING SECURE ACCESS TO PRIVATE NETWORKS WITH CLIENT REDIRECTION

(75) Inventors: Christopher Thomas, Watsonville, CA (US); Theron Tock, Mountain View, CA (US); Sriram Ramachandran, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,151

(22) Filed: Oct. 20, 2009

(65) Prior Publication Data

US 2010/0057845 A1    Mar. 4, 2010

Related U.S. Application Data

(63) Continuation of application No. 10/410,619, filed on Apr. 8, 2003, now Pat. No. 7,631,084, which is a continuation-in-part of application No. 10/060,792, filed on Jan. 29, 2002, now Pat. No. 7,774,455.

(60) Provisional application No. 60/350,097, filed on Nov. 2, 2001.

(51) Int. Cl.
*G06F 15/16* (2006.01)
(52) U.S. Cl. .......................... 709/227; 709/203; 713/168
(58) Field of Classification Search .......... 709/227–228, 709/245, 238, 250; 713/168, 155; 726/12
See application file for complete search history.

(56) References Cited

U.S. PATENT DOCUMENTS

| | | |
|---|---|---|
| 5,491,752 A | 2/1996 | Kaufman et al. |
| 5,586,260 A | 12/1996 | Hu |
| 5,649,099 A | 7/1997 | Theimer et al. |
| 5,752,022 A | 5/1998 | Chiu et al. |
| 5,799,318 A | 8/1998 | Cardinal et al. |
| 5,812,769 A | 9/1998 | Graber et al. |
| 5,826,014 A | 10/1998 | Coley et al. |
| 5,826,242 A | 10/1998 | Montulli |
| 5,898,836 A | 4/1999 | Freivald et al. |
| 5,935,212 A | 8/1999 | Kalajan et al. |
| 5,978,842 A | 11/1999 | Noble et al. |

(Continued)

FOREIGN PATENT DOCUMENTS

EP    0 855 659    7/1998

(Continued)

OTHER PUBLICATIONS

Co-pending U.S. Appl. No. 10/410,619, filed Apr. 8, 2003; Christopher Thomas et al., entitled "Method and System for Providing Secure Access to Private Networks with Client Redirection".

(Continued)

*Primary Examiner* — Salad Abdullahi
(74) *Attorney, Agent, or Firm* — Harrity & Harrity, LLP

(57) ABSTRACT

Improved approaches for providing secure access to resources maintained on private networks are disclosed. The secure access can be provided through a public network using client software of client-server software and/or with file system software. Multiple remote users are able to gain restricted and controlled access to at least portions of a private network through a common access point, such as an intermediate server of the remote network.

20 Claims, 33 Drawing Sheets

U.S. PATENT DOCUMENTS

| | | | |
|---|---|---|---|
| 5,983,268 | A | 11/1999 | Freivald et al. |
| 5,991,878 | A | 11/1999 | Mcdonough et al. |
| 6,006,258 | A | 12/1999 | Kalajan |
| 6,012,087 | A | 1/2000 | Freivald et al. |
| 6,052,730 | A | 4/2000 | Felciano et al. |
| 6,141,686 | A | 10/2000 | Jackowski et al. |
| 6,158,011 | A | 12/2000 | Chen et al. |
| 6,167,438 | A | 12/2000 | Yates et al. |
| 6,182,141 | B1 | 1/2001 | Blum et al. |
| 6,182,142 | B1 | 1/2001 | Win et al. |
| 6,185,598 | B1 | 2/2001 | Farber et al. |
| 6,202,156 | B1 | 3/2001 | Kalajan |
| 6,205,481 | B1 | 3/2001 | Heddaya et al. |
| 6,289,333 | B1 | 9/2001 | Jawahar et al. |
| 6,304,908 | B1 | 10/2001 | Kalajan |
| 6,356,934 | B1 | 3/2002 | Delph |
| 6,505,230 | B1 | 1/2003 | Mohan et al. |
| 6,510,464 | B1 | 1/2003 | Grantges et al. |
| 6,532,493 | B1 | 3/2003 | Aviani, Jr. et al. |
| 6,598,081 | B1 | 7/2003 | Coile et al. |
| 6,671,724 | B1 | 12/2003 | Pandya et al. |
| 6,950,935 | B1 | 9/2005 | Allavarpu et al. |
| 7,085,817 | B1 | 8/2006 | Tock et al. |
| 7,228,438 | B2 | 6/2007 | Bushmitch et al. |
| 2001/0047421 | A1 | 11/2001 | Sridhar et al. |
| 2002/0083342 | A1 | 6/2002 | Webb et al. |
| 2002/0133549 | A1 | 9/2002 | Warrier et al. |
| 2003/0051161 | A1 | 3/2003 | Smith et al. |
| 2003/0065791 | A1 | 4/2003 | Garg et al. |
| 2004/0073566 | A1 | 4/2004 | Trivedi |
| 2005/0021762 | A1 | 1/2005 | Gbadegesin |
| 2005/0060725 | A1 | 3/2005 | D'Souza et al. |

FOREIGN PATENT DOCUMENTS

| | | |
|---|---|---|
| EP | 0 967 765 | 12/1999 |
| EP | 1 039 396 | 9/2000 |
| JP | 2003-30143 | 1/2003 |
| JP | 2003-44381 | 2/2003 |
| WO | WO 99/66385 | 12/1999 |
| WO | WO 00/11832 | 3/2000 |
| WO | WO 01/90913 A1 | 11/2001 |

OTHER PUBLICATIONS

Hunt, Ray, "Internet/Intranet firewall security-policy, architecture and transaction services," Computer Communications, Elsevier, vol. 21, 1998, pp. 1107-1123.

Barrett, Rob et al., "Intermediaries: new places for producing and manipulating Web content," Computer Networks and ISDN Systems 30 (1998), pp. 509-518.

Co-pending U.S. Appl. No. 10/060,792, filed Jan. 29, 2002; Theron Tock et al., entitled "Method and System for Providing Secure Access to Private Networks".

NetMind, "Products: Free Mind-it Service," http://www.netmind.com/html/free_mind-it_service.html, print date Jul. 4, 2000. pp. 1-2.

NetMind, "Products: Tracking," http://www.netmind.com/html/products_tracking.html, print date Jul. 4, 2000, pp. 1-2.

NetMind, "Company: Technology," http://www.netmind.com/html/technology.html, print date Jul. 4, 2000. pp. 1-2.

Yahoo! Companion, "What is the Stock Market Toolbar?," http://docs.companion.yahoo.com/companion/learnmore_s_companion.html, print date Nov. 3, 2000, pp. 1-6.

Yahoo! Companion, "What is Yahoo! Companion?," http://docs.companion.yahoo.com/companion/learnmore_companion.html, print date Nov. 3, 2000, pp. 1-4.

Yahoo! Companion,"Yahoo! Content and features on your browser!," http://edit.yahoo.com/config/download_companion, print date Nov. 3, 2000, 1 page.

Third Voice, http://www.thirdvoice.com/discuss.htm, print date Sep. 4, 2000, pp. 1-3.

NetMind, "Webmaster: Your Web Site Essentials," http://www.netmind.com/html/webmasters.html, print date Sep. 4, 2000, pp. 1-2.

Desktop.com, "Welcome to Desktop.com!," http://desktop.com/, print date Sep. 26, 2000, 1 page.

Desktop.com, "Desktop.com Solutions," http://desktop.com/app/home/show/solutions/solutions.dtml, print date Sep. 26, 2000. pp. 1-2.

Desktop.com, "Company-About Us," http://www.desktop.com/static/home/company.html, print date Sep. 4, 2000, 1 page.

Desktop.com, "Company-Products," http://www.desktop.com/static/home/products.html, print date Sep. 4, 2000, pp. 1-2.

Google, How to Google, "Why Use Google?," http://www.google.com/why_use.html, print date Sep. 4, 2000, pp. 1-3.

Google, Business Development, "Google's Advanced Search Features," http://www.google.com/adv_features.html, print date Sep. 4, 2000, pp. 1-2.

Anonymizer.com, Online Privacy Services, http://www.anonymizer.com/, print date Sep. 26, 2000, 1 page.

Anonymizer.com, Online Privacy Services, "Privacy is your right," http://www.anonymizer.com/services/index.shtml, print date Sep. 26, 2000, pp. 1-4.

Third Voice, "Meet your Web Assistant," http://www.thirdvoice.com/whatIs/index.htm, print date Sep. 26, 2000, pp. 1-3.

AltaVista, "Translations," http://babelfish.altavista.com/translate.dyn, print date Sep. 4, 2000, 1 page.

AltaVista, "How to Use Babel Fish—What is AltaVista Babel Fish?," http://live.altavista.com/s?spage=help/bf_what.htm, print date Sep. 4, 2000, pp. 1-2.

International Search Report for corresponding PCT application with a mailing date of Jun. 21, 2005; 1 page.

Fukuda Takao, Internet Solutions No. 63, Japan, Nikkei Business Publications Inc, Sep. 22, 2002, pp. 96-103. (Includes English Summary).

Yoshio Matsuno, Internet Working, first edition, Ric Telecom Ltd, Jun. 15, 1996, first edition, p. 108-115. (Includes English Summary).

Masaya Norifusa, Security Protocol Practical Methods for Safe Internet, Nikkei Communications, No. 265, Japan, Nikkei Business Publications Inc., Mar. 2, 1998, p. 154-160. (Includes English Summary).

METHOD AND SYSTEM FOR PROVIDING SECURE ACCESS TO PRIVATE NETWORKS WITH CLIENT REDIRECTION

CROSS-REFERENCE TO RELATED APPLICATIONS

This application is a continuation of U.S. patent application Ser. No. 10/410,619, filed Apr. 8, 2003, which is a continuation-in-part of U.S. patent application Ser. No. 10/060,792, filed Jan. 29, 2002, which claims the benefit of U.S. Provisional Patent Application No. 60/350,097, filed Nov. 2, 2001. The entire contents of each of the applications are hereby incorporated herein by reference.

BACKGROUND OF THE INVENTION

1. Field of the Invention

The present invention relates to client-server computing and, more particularly, to client-server computing for securely accessing resources over a network.

2. Description of the Related Art

Network browsers (browser applications), such as Netscape Navigator or Microsoft Explorer, allow users of client machines to request and retrieve resources from remotely located server machines via the Internet. These network browsers can display or render HyperText Markup Language (HTML) documents provided by the remotely located server machines. Additionally, browsers are able to execute script programs embedded in the HTML documents to provide some local functionality.

Conventionally, network browsers are used to access public networks, such as the Internet. Private networks are normally protected by firewalls so that network browsers residing on computing machines outside the private network are not able to gain access to any resources on the private network.

While firewalls are effective at protecting against external access to private networks, there is often the need for external persons or businesses to gain at least limited access to the private networks of other persons or businesses. For example, a supplier of parts to a business customer may be able to better serve their business customer by having access to information (e.g., inventory levels or orders) maintained on the private network of the business customer. One conventional approach is to allow the supplier's machine to access the private network through the firewall via a public network. This provides a "hole" in the firewall that seriously compromises the security of the private network. Hence, this conventional approach is normally not permitted if security is an important concern. Another conventional approach is to establish a Virtual Private Network (VPN) with the supplier's machine. Here, the supplier's machine is also able to access the private network through the public network and the firewall, but all data transmissions are encrypted. Some firewalls support VPNs and protocols providing the encrypted communications, such as Point-to-Point Tunneling Protocol (PPTP), can be used. While VPNs offer remote secure access, they are difficult to arrange, configure and manage. Each VPN must also be provided for each external person or business given access to the private network. Still further VPNs are costly and each VPN provides some security exposure to the entire private network.

Thus, there is a need for improved approaches to providing secure remote access to resources maintained on private networks.

SUMMARY OF THE INVENTION

The invention pertains to improved approaches for providing secure access to resources maintained on private networks. The secure access can be provided through a public network using client software of client-server software, and/or with file system software. Multiple remote users are able to gain restricted and controlled access to at least portions of a private network through a common access point, such as an intermediate server of the remote network. One example of a remote network is a private network.

The invention can be implemented in numerous ways, including as a system, method, device, and a computer readable medium. Several embodiments of the invention are discussed below.

In one method embodiment, a network connection request is received, the network connection request is redirected, and data are sent towards the intermediate server. The method can permit secure remote access to the remote network.

The network connection request can be received on a computer on a local network. The network connection request can be initiated by a client application of a client-server application. The client application can be on the computer. The network connection request can include a destination on a remote network. A server application of the client-server application can be on the remote network.

The network connection request can be redirected within a Windows socket layer on the computer. This can include redirecting the network connection request with the namespace provider (e.g., utilized for domain name service lookups on the remote network) and the layered service provider (e.g., utilized for redirecting the data of the client application from the local network to the remote network). The network connection request can be redirected away from a transport service provider (e.g., a TCP/IP transport service provider) of the computer. The network connection request can be redirected to an intermediate server in the remote network. The intermediate server can perform the network connection request on behalf of the computer. The redirecting can be based on one or more of: a name of the client application, a checksum of the client application, a version of the client application, a server of the destination, and a port of the destination. Prior to the redirecting, the network request can pass through one or more of: the Winsock dynamic link library and the Winsock 2 dynamic link library. The network connection request can be redirected to the intermediate server in the remote network via at least a proxy on the computer.

The data of the client application can be sent from the computer towards the intermediate server. A secure sockets layer (SSL) can encrypt communication between the computer and the intermediate server. The data of the client application can be sent from the intermediate server towards the server application. Various embodiments send the data of the client application from the intermediate server towards the server application, or allow this to occur by software or hardware outside of the embodiment. The data of the client application can be sent through at least a local address and a local port of the computer prior to sending the data of the client application towards the intermediate server.

In some embodiments, a visual cue can be provided to indicate a secure connection between the client application and the intermediate server. The namespace provider and the layered service provider can be automatically installed on the computer and/or uninstalled from the computer.

In another method embodiment, a network connection request is received, the network connection request is redirected, and data are received from the intermediate server. The method can permit secure remote access to the remote network.

The network connection request can be received on a computer on a local network. The network connection request can be initiated to a file system on a remote network. The network connection request can include a name of the file system.

The network connection request can be redirected using a transport driver interface on the computer, and may further use a namespace provider. The redirecting can capture network file system traffic. The network connection request can be redirected away from a transport driver (e.g., a TCP/IP transport driver) on the computer. The network connection request can be redirected to an intermediate server in the remote network. The intermediate server performs the network connection request on behalf of the computer. The redirecting is based on one or more of: a destination server and a destination port. Prior to the redirecting, the network connection request can pass through at least a transport driver interface filter.

At the computer data of the file system from the intermediate server can be received. A secure sockets layer (SSL) can encrypt communication between the computer and the intermediate server. The data of the file system can be transferred between the intermediate server and the file system on the remote network. Various embodiments transfer the data of the file system between the intermediate server and the file system, or allow this happen via hardware or software outside of the embodiment.

In some embodiments, the transport driver interface can be automatically installed on the computer and/or uninstalled from the computer.

The various aspects, features, embodiments or implementations of some embodiments described above can be used alone or in various combinations.

Some embodiments can be implemented in software, but can be implemented in hardware or a combination of hardware and software. Some embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Computer code in various embodiments can be implemented in hardware, software, or a combination of hardware and software.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches for providing secure access to resources maintained on private networks. The secure access can be provided through a public network using a standard network browser. Multiple remote users are able to gain restricted and controlled access to at least portions of a private network through a common access point.

The solution can enable users, such as employees, contractors or partners, to access resources resident on a private network in a secure manner while being remotely located from a direct connection to the private network. The solution provided by some embodiments of the invention is not only easily set up and managed, but also able to support many remote users in a cost-effective manner.

Embodiments of this aspect of the invention are discussed below with reference to FIGS. 1A-27. However, those skilled in the art will readily appreciate that the detailed description given herein with respect to these figures is for explanatory purposes as the invention extends beyond these limited embodiments.

Figure 1A:
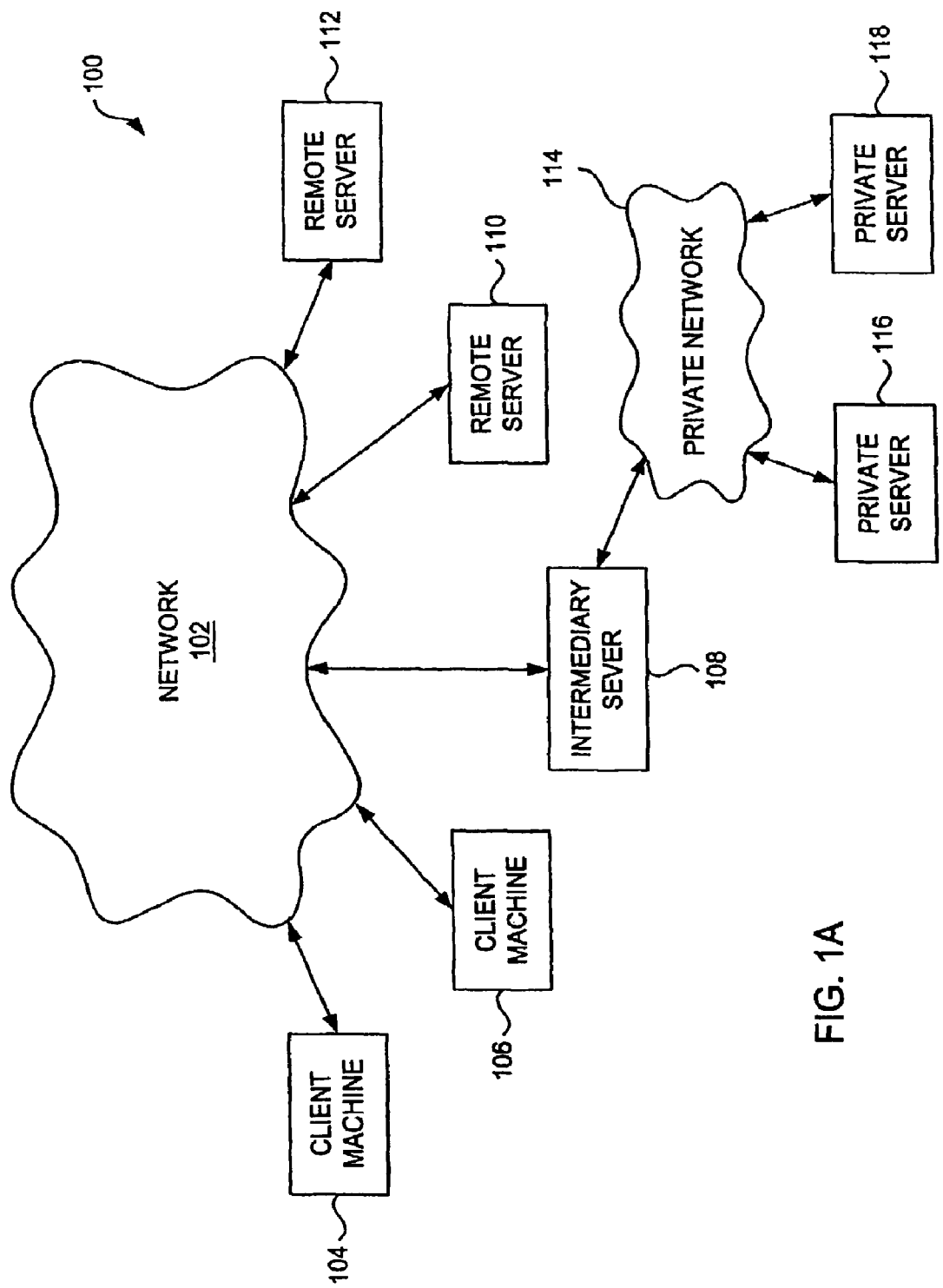
FIG. 1A is a block diagram of an information retrieval system according to one embodiment of the invention.

FIG. 1A is a block diagram of an information retrieval system 100 according to one embodiment of the invention. The information retrieval system 100 includes a network 102, client machines 104 and 106, an intermediary server 108, remote servers 110 and 112, a private network 114, and private servers 116 and 118. The network 102 serves as a communication medium through which the client machines 104 and 106, the intermediary server 108 and the remote servers 110 and 112 can communicate. The network 102 is, for example, a data network which can include the Internet, a wide area network, or a local area network. The Internet refers to a global network of interconnected computers. The private network 114 also serves as a communication medium through which the intermediary server 108 and the private servers 116 and 118 can communicate. The network 114 is also a data network. Often the private network 114 is associated with an entity and thus employees operating computing devices on the private network 114 are able to communicate with the private servers 116 and 118. For example, the private network 114 can be referred to as a corporate network or an intranet. However, access to the private network 114 by an outside computing device is typically limited by a firewall (not shown). The intermediary server 108 is permitted to communicate with the private network 114 through the firewall. Here, to the extent a client machine (requestor) is authorized and permitted, the intermediary server 108 communicates with the private network 114 on behalf of the client machine (requestor). The intermediary server 108, in effect, controls the extent to which it allows outside computing devices to access the private network 114.

According to some embodiments of the invention, requests for content residing on the private servers 116 and 118 can be received from the client machines 104 and 106. As used herein, "content" is any information or resource that can be stored on a server and retrieved by a client. Typically, the content is embodied as an electronic file and contains text and/or images. Often, the client machines 104 and 106 operate browser applications that facilitate requesting and retrieval of content over the network 102 and the private network 114. In such cases, the content is often returned to the browser application as a browser-viewable document (e.g., markup language document, webpage, etc.) so that the browser application can display the same. The client machines 104 and 106 communicate with an intermediary server 108. Initially, the intermediary server 108 determines whether the client machines 104 and 106 seeking the content are authenticated and permitted such access to the private network 114. Following successful authentication and permission verifications, the intermediary server 108 then, in turn, accesses the private servers 116 and 118 residing on the private network 114 on behalf of the client machines 104 and 106. Once the intermediary server 108 obtains the requested content from the private servers 116 and 118, the intermediary server 108 can directly return the requested content to the client machines 104 and 106 or can first modify the requested content and then deliver it to the client machines 104 and 106.

The modification to the requested content by the intermediary server 108 can take a variety of forms. As one example, the intermediary server 108 can insert a toolbar into the requested content before delivery to the client machines 104 and 106. As another example, the intermediary server 108 can alter the hyperlinks within the requested content so as to point to an intermediary server (e.g., the intermediary server 108). Various other tasks can be performed on the requested content by the intermediary server 108. Additionally, the information retrieval system 100 can also support centralized storage at the intermediary server 108 of server stored information. The server stored information is often referred to as "cookies," though cookies are conventionally stored on client machines.

Although the information retrieval system 100 illustrated in FIG. 1A depicts only a pair of client machines, a pair of remote servers, a single intermediary server and a pair of private servers, it should be understood that the information retrieval system 100 can support many client machines and many server machines. It should also be understood that the information retrieval system 100 can also support multiple intermediary servers.

Figure 1B:
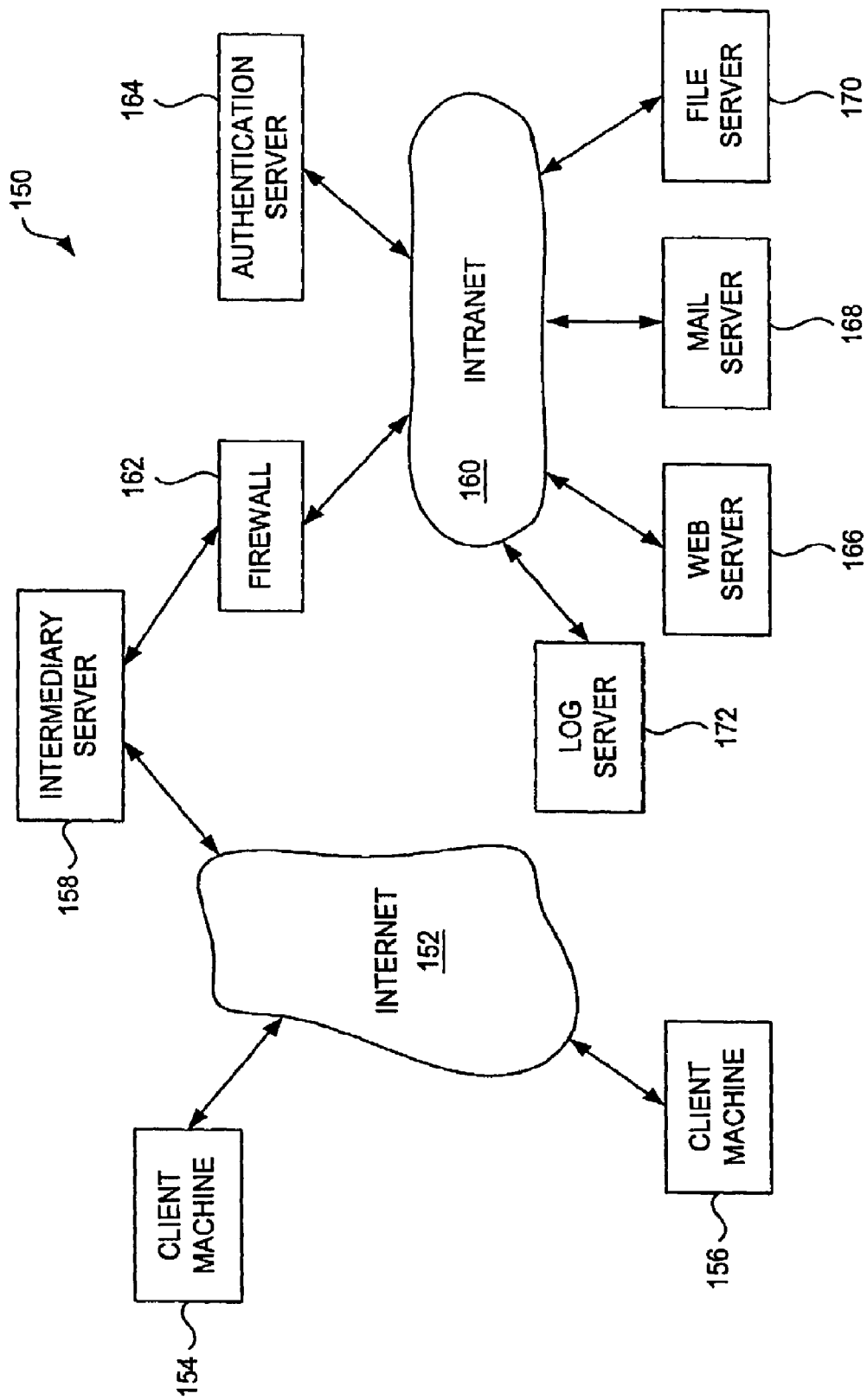
FIG. 1B is a block diagram of an information retrieval system according to another embodiment of the invention.

FIG. 1B is a block diagram of an information retrieval system 150 according to one embodiment of the invention. The information retrieval system 150 is, for example, a more detailed implementation of the information retrieval system 100 illustrated in FIG. 1A.

The information retrieval system 150 makes use of the Internet 152 and client machines 154 and 156 that couple to the Internet 152 through wired or wireless means. Typically, the client machines 154 and 156 operate client-side applications, such as a network browser or a mail application. When requestors (users) of the client machines 154 and 156 desire to access remote resources, resource requests are sent from the client machines 154 and 156 through the Internet 152 to an intermediary server 158. Typically, the communications between the client machines 154 and 156 and the intermediary server 158 are secured by an encryption technique (e.g., Secure Socket Layer (SSL)). The intermediary server 158 provides access to an intranet 160. The resources being requested by the client machines 154 and 156 reside within the intranet 160. Since a firewall typically limits or precludes external access to the intranet 160, the intermediary server 158 must be permitted to communicate with the intranet through the firewall 162. The intranet 160 typically includes various different types of resources that can be accessed electronically. Typically, these resources are stored on server machines that couple to, or form part of, the intranet. As shown in FIG. 1B, the intranet 160 couples to, or includes, an authentication server 164, a web server 166, a mail server 168, a file server 170 and a log server 172. Hence, a given client machine can access any one of the servers 164-172 residing within or on the intranet 160 by way of the intermediary server 158. Consequently, a given client machine can request and receive resources residing on the web server 166 using a network browser application. As another example, the given client machine can access the mail resources residing on the mail server 168 using a client-side mail application. As still another example, the given client machine can access the file server 170 residing within or on the intranet 160 to obtain, store or view electronic files thereon.

The intermediary server 158 is configured to ensure that access to the intranet 160 via the intermediary server 158 remains protected. In this regard, the requestors that are seeking to access resources or content residing on the intranet 160 must be authenticated. The authentication can utilize the authentication server 164 residing within or on the intranet 160. In this regard, native authentication techniques utilized by the intranet 160 can be used in authenticating a requestor at the intermediary server 158. Still further, the intermediary server 158 can be configured by an administrator such that different requestors (e.g., users of client machines) can be given different access privileges to different resources (e.g., servers) within or on the intranet 160. The log server 172 allows the storage of log information pertaining to access requests to the intranet 160 at the intermediary server 158. The log information can be provided on an application level basis such that it is more user-discernable.

Figure 2A:
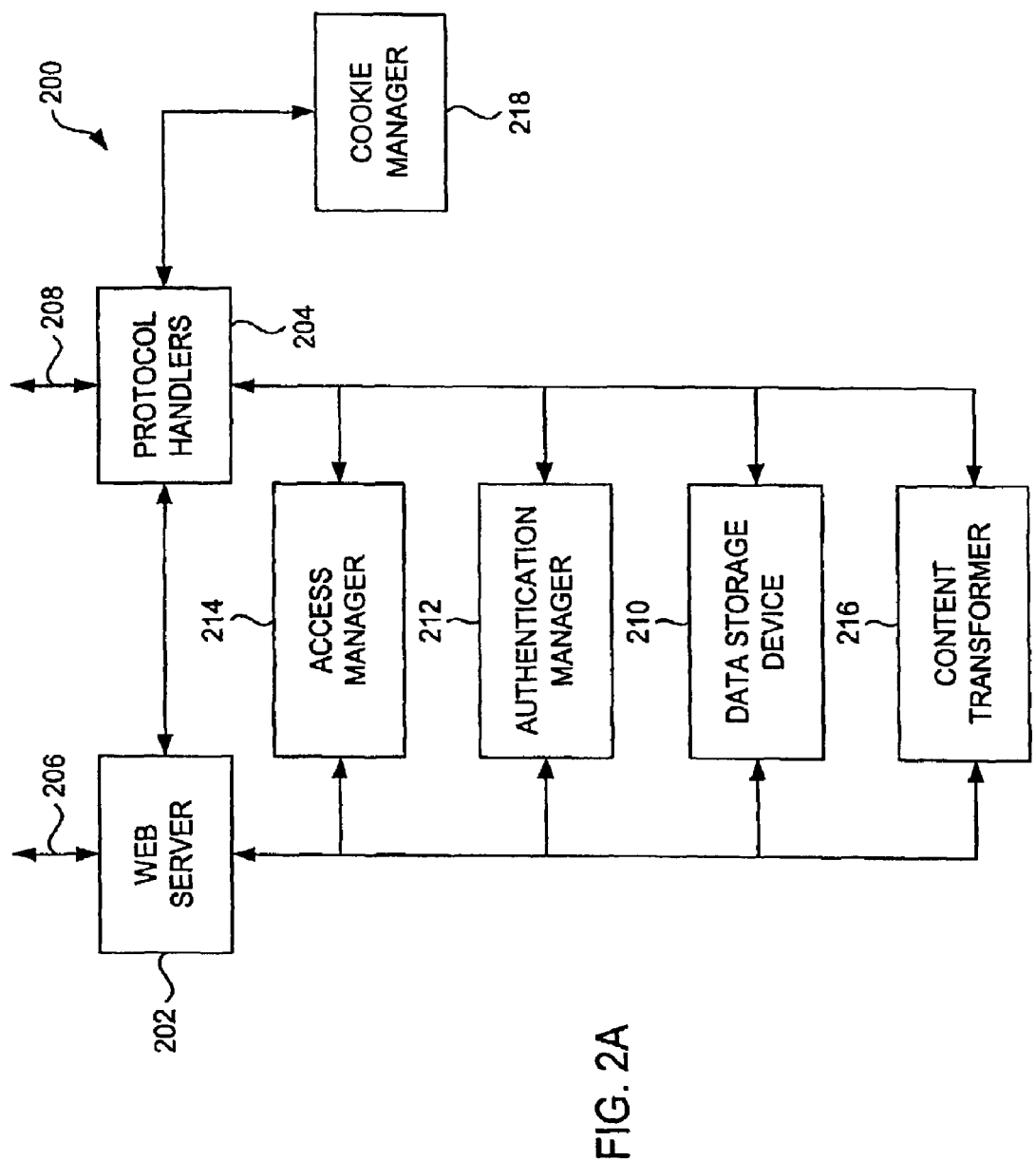
FIG. 2A is a block diagram of an intermediary server according to one embodiment of the invention.

FIG. 2A is a block diagram of an intermediary server 200 according to one embodiment of the invention. The intermediary server 200 is, for example, suitable for use as the intermediary server 108 illustrated in FIG. 1. The intermediary server can also be called an intermediate server.

The intermediary server 200 includes various processing modules typically implemented by computer program code executed by a processing device utilized by the intermediary server. More particularly, the processing modules of the intermediary server 200 include a web server 202 and a protocol handler 204. The web server 202 couples to client machines through a link 206 (via a network) and the protocol handler 204 couples to remote servers through a link 208 (via a network). The web server 202 and the protocol handler 204 also communicate with one another as well as with various supporting modules and a data storage device 210. The data storage device 210 provides persistent or non-volatile storage for various data items being maintained by the intermediary server 200. Typically, for each user or requestor associated with a client machine, the data storage device provides separate storage.

The processing modules include an authentication manager 212 and an access manager 214. The authentication manager 212 manages authentication processing which serves to determine whether the requestor is who they say they are. The authentication processing can be local or external to the intermediary server 200. For example, external authentication can be provided by an authentication server within a private network (e.g., authentication server 164). The access manager 214 provides access limitations to the various resources on the private network. Namely, different requestors can be assigned different levels, types or areas of access privileges. For example, requestor A can access server X but not servers Y and Z, and requestor B can access server Y for read-only and not servers X and Z.

The intermediary server 200 also includes a content transformer 216, which is another processing module that is used to parse requested content received from a remote server and then modify the content in predetermined ways.

Another processing module that the intermediary server 200 might include is a cookie manager 218. The cookie manager manages "cookies" such that those being received from a remote server are stored to the data storage device 210 and those "cookies" previously stored in the data storage device 210 are delivered to the remote server at appropriate times. More generally, "cookies" refer to server stored information. Such server stored information is often set by a remote server and used for session, state or identification purposes.

Figure 2B:
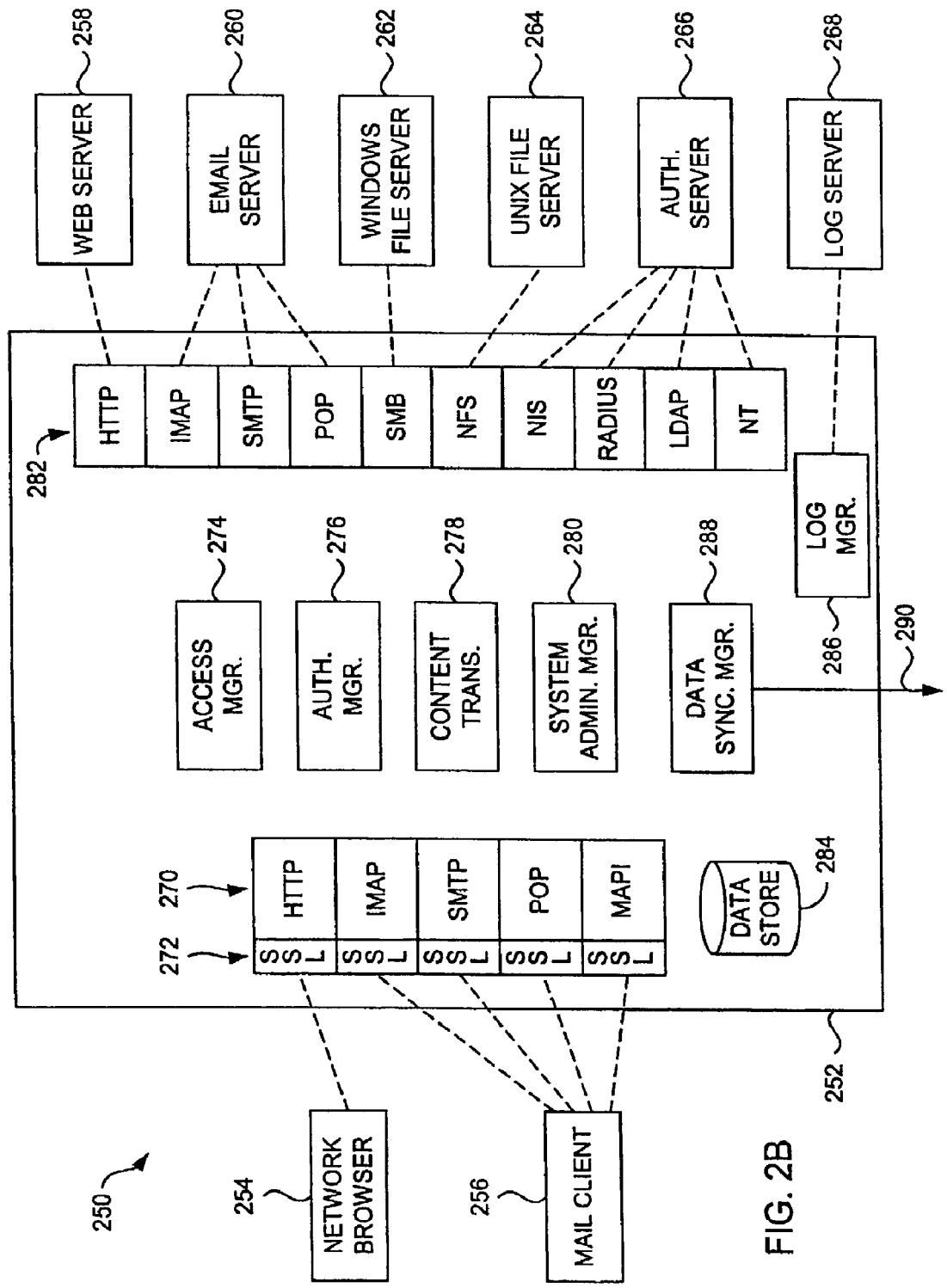
FIG. 2B is a block diagram of a remote access system according to one embodiment of the invention.

FIG. 2B is a block diagram of a remote access system 250 according to one embodiment of the invention. The remote access system 250 operates in a client-server environment to allow users of clients to gain access to resources at remote servers. In particular, the remote access system 250 includes a network browser 254 and a mail client 256. The network browser 254 and the mail client 256 are client applications that operate or run on client machines. Typically, a user or requestor will interact with these one or more client programs to request resources located on the remote servers. The network browser 254 and the mail client 256 couple to an intermediary server 252 over secure links or connections. The intermediary server 252 also couples to the remote servers through either secure or unsecure connections or links. The intermediary server 252 can support connections to various different servers, such as servers found on private networks. One example of a private network is a corporate network. The servers illustrated in FIG. 2B include a web server 258, an email server 260, a Windows file server 262, a UNIX file server 264, an authentication server 266 and a log server 268.

The intermediary server 252 includes a Secure Socket Layer (SSL) 272 that provides encryption handling for the connection or link with the client applications prior to reaching a front-end protocol handler layer 270. The front-end protocol handler layer 270 includes a plurality of protocol handlers to handle the different types of incoming protocols that may be utilized by the various client applications. As shown in FIG. 213, the front-end protocol handler layer 270 includes separate protocol handlers for the protocols of HTTP, IMAP, SMTP, POP, and MAPI. After the appropriate protocol handler has been utilized for an incoming request, other functional modules within the intermediary server 252 can then be utilized. In particular, an access manager 274 can determine whether the requestor associated with the incoming request is permitted the type of access being requested. An authentication manager 276 can determine whether the requestor is able to be authenticated. A content transformer 278 can perform transformation of the content of the received request or the requested response provided by the remote server. A system administration manager 280 allows a system administrator to interact with the intermediary server 252 to configure access privileges, system configuration and login features.

The intermediary server 252 also includes back-end protocol handlers 282. The back-end protocol handlers 282 provide the appropriate protocol for outgoing and incoming communications with respect to a particular server. The layer of back-end protocol handlers shown in FIG. 2B includes protocol handlers for the protocols of: HTTP, IMAP, SMTP, POP, SMB, NFS, NIS, RADIUS, LDAP, and NT. To the extent that an incoming protocol to the intermediary server 252 differs from an outgoing protocol from the intermediary server 252, the content transformer 278 can perform the protocol transformations (e.g., translations). Still further, the intermediary server 252 includes a data store 284, a log manager 286, and a data synchronization manager 288. The data store 284 can provide temporary or semi-permanent data storage for the various components of the intermediary server 252. For example, a local record for authentication purposes can be stored for each of the clients or requestors in the data store 284. In addition, session identifiers, or cookies, for the clients or requestors can also be stored in a centralized fashion in the data store 284. The data synchronization manager 288 is a module that enables coupling of one intermediary server with another intermediary server to provide fault tolerance. Hence, if one intermediary server fails, then, through a link 290, the failing intermediary server can couple to an operating intermediary server to provide some or all of the operations typically associated with an intermediary server. The log manager 286 is provided to enable application level logging of various access requests that are made through the intermediary server 252. The log formed by the log manager 286 is stored in the log server 268.

Figure 3:
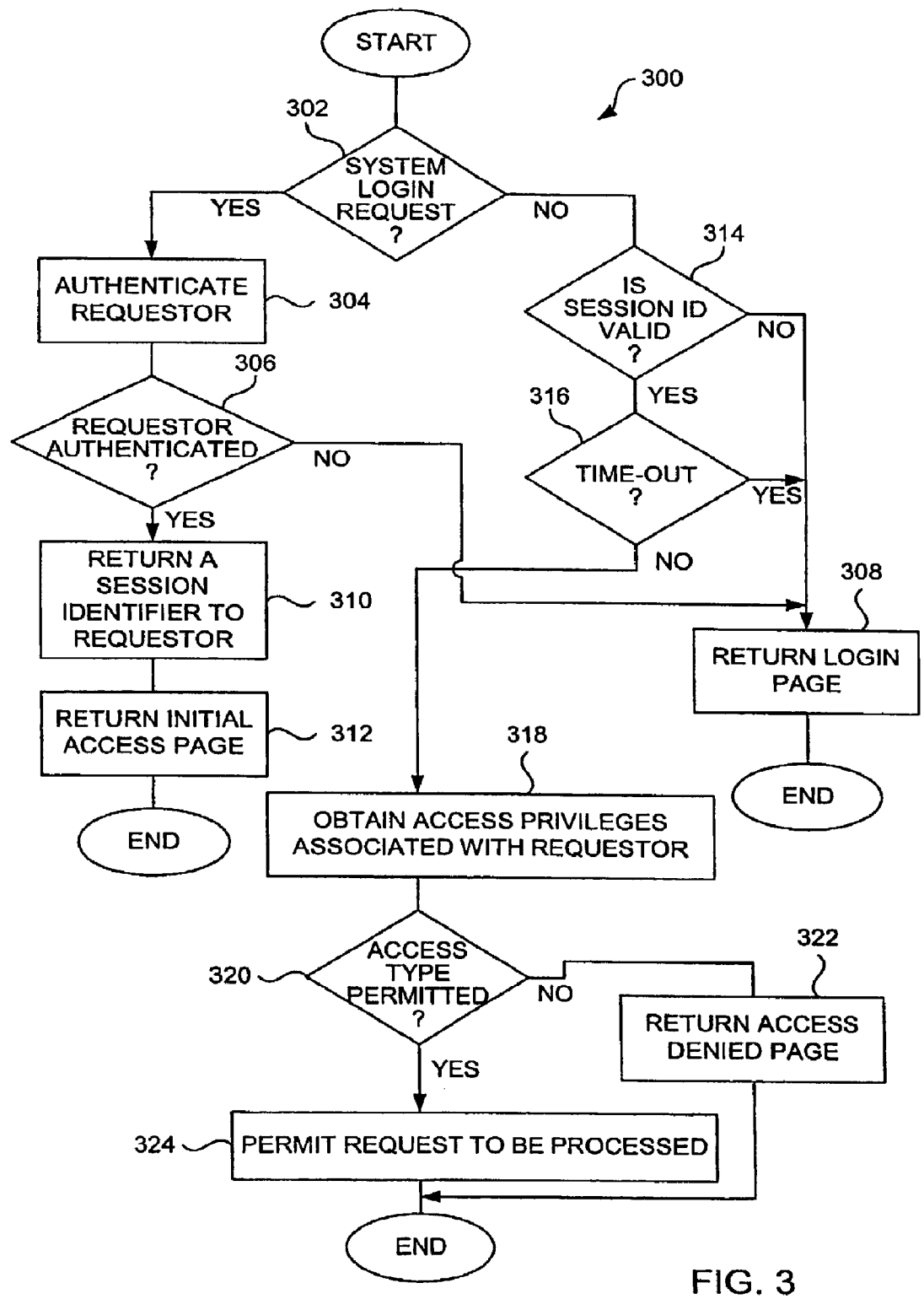
FIG. 3 is a flow diagram of request processing according to one embodiment of the invention.

FIG. 3 is a flow diagram of request processing 300 according to one embodiment of the invention. The request processing 300 is invoked whenever a request from a requestor is received by an intermediary server, such as the intermediary server 108 illustrated in FIG. 1A, the intermediary server 158 illustrated in FIG. 1B, the intermediary server 200 illustrated in FIG. 2A or the intermediary server 252 illustrated in FIG. 2B.

The request processing 300 begins with a decision 302 that determines whether the received request is a system login request. When the decision 302 determines that the received request is a system login request, then the request processing 300 attempts to authenticate 304 the requestor. The authentication can be performed locally or remotely. Additional details on authentication are provided below. Thereafter, a decision 306 determines whether the requestor has been authenticated. When the decision 306 determines that the requestor cannot be authenticated, then the login attempt fails and a login page can be returned 308 to the requestor. The login page facilitates login retry by the requestor. Following the operation 308, the request processing 300 is complete and ends for the case in which the login request failed.

Alternatively, when the decision 306 determines that the requestor is authenticated, then a session identifier is returned 310 to the requestor. The requestor can refer to a client device or the user of the client device depending on context. The session identifier is used in subsequent requests to the intermediary server as long as the session is active. Additionally, an initial access page is returned 312 to the requestor. From the initial access page, the requestor is able to access various resources available on a private network. Following the operation 312, the request processing 300 is complete and ends for the case in which the login request was successful.

Besides the processing of login requests, the request processing 300 also operates to process all other requests for remote access via the intermediary server. Hence, when the decision 302 determines that the received request is not a system login request, then a decision 314 determines whether the received request has a valid session identifier. The received request would have a valid session identifier if the requestor has already been authenticated (i.e., logged into the intermediary server) and the session is still valid. Hence, when the decision 314 determines that the session identifier associated with the received request is not valid, then access to the intermediary server is denied and the login page can be returned 308 to the requestor. Alternatively, when the decision 314 determines that the session identifier is valid, then a decision 316 determines whether the session has timed-out. When the decision 316 determines that the session has timed-out, then access to the intermediary server is denied and the login page can be returned 308 to the requestor. Here, if the requestor has an invalid session identifier or the session has timed-out, the requestor is forced to login to be authenticated.

On the other hand, when the decision 316 determines that the session has not timed-out, then the requestor is permitted to access the private network via the intermediary server. Thereafter, depending upon the type of access the requestor is seeking to make, additional processing is performed to ensure that the requestor gains access to only those resources deemed appropriate and intended. In particular, with respect to the request processing 300, access privileges associated with the requestor are obtained 318. The access privileges indicate which resources the requestor is entitled to access. Next, a decision 320 determines whether the particular access type associated with the received request is permitted. When the decision 320 determines that the access type associated with the received request is not permitted, then an access denied page is returned 322 to the requestor. Alternatively, when the decision 320 determines that the access type of the received request is permitted, then the received request is permitted 324 to be processed. Here, the processing of the received request enables the requestor to access (e.g., view, retrieve, etc.) the protected resources from the private network. Following the operations 322 and 324, the request processing 300 is complete and ends with the received request having been processed only when access is deemed permitted.

Figure 4:
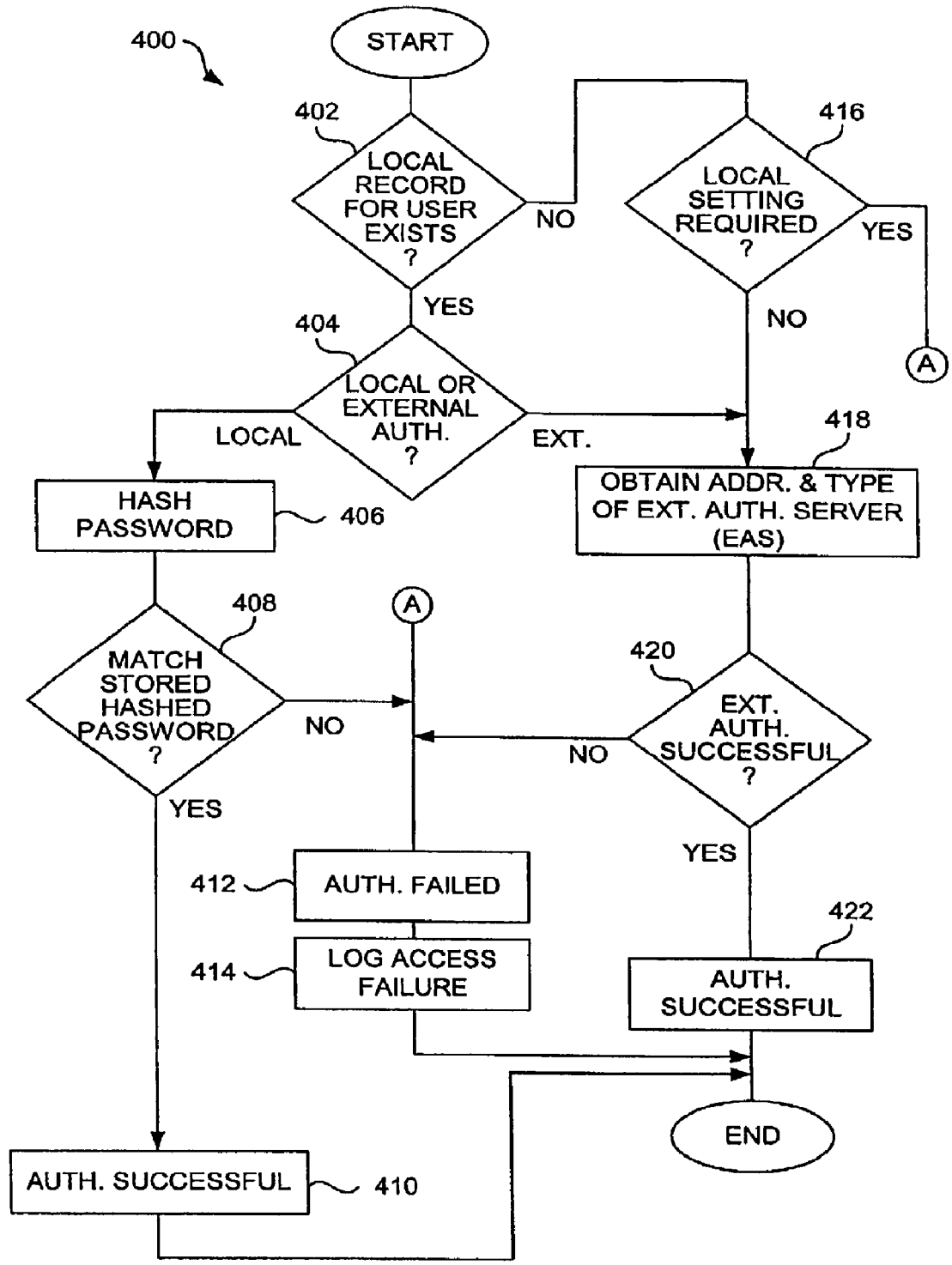
FIG. 4 is a flow diagram of authentication processing according to one embodiment of the invention.

FIG. 4 is a flow diagram of authentication processing 400 according to one embodiment of the invention. The authentication processing 400 is, for example, processing associated with the authentication operation 304 illustrated in FIG. 3.

The authentication processing 400 begins with a decision 402 that determines whether a local record for the requestor (user) exists. When the decision 402 determines that a local record for the requestor does exist, then a decision 404 determines whether local or external authentication is required. Here, the local record indicates whether local or external authentication should be performed. Besides an indication of whether local or external authentication should be performed, a local record can also store other useful information, for example, requestor's (user's) name, time last logged in, account status, etc. When the decision 404 determines that local authentication is to be performed, a password provided with the login request being processed for authentication is hashed 406. Hashing is the transformation of a string of characters into another string of characters referred to as a "key" that represents the original string. A hash function can perform the hashing operation. Hashing is often performed in the encryption and decryption context.

Next, a decision 408 determines whether the hashed password matches a stored hash password. When the decision 408 determines that a match is present, then the authentication is deemed successful 410. Alternatively, when the decision 408 determines that a match is not present, then the authentication is deemed to have failed 412. Further, when the decision 408 determines that there is no match, then an access failure can also be logged 414 in a log. In one embodiment, the log can be provided by a log server. The logging 414 of the access failure can provide application-level information that facilitates understanding of the nature of the access failure that occurred when later viewing the log. Following the operations 410 and 414, the authentication processing 400 is complete and ends with the authentication either succeeding or failing depending on whether the login request contains the correct password.

Figure 7:
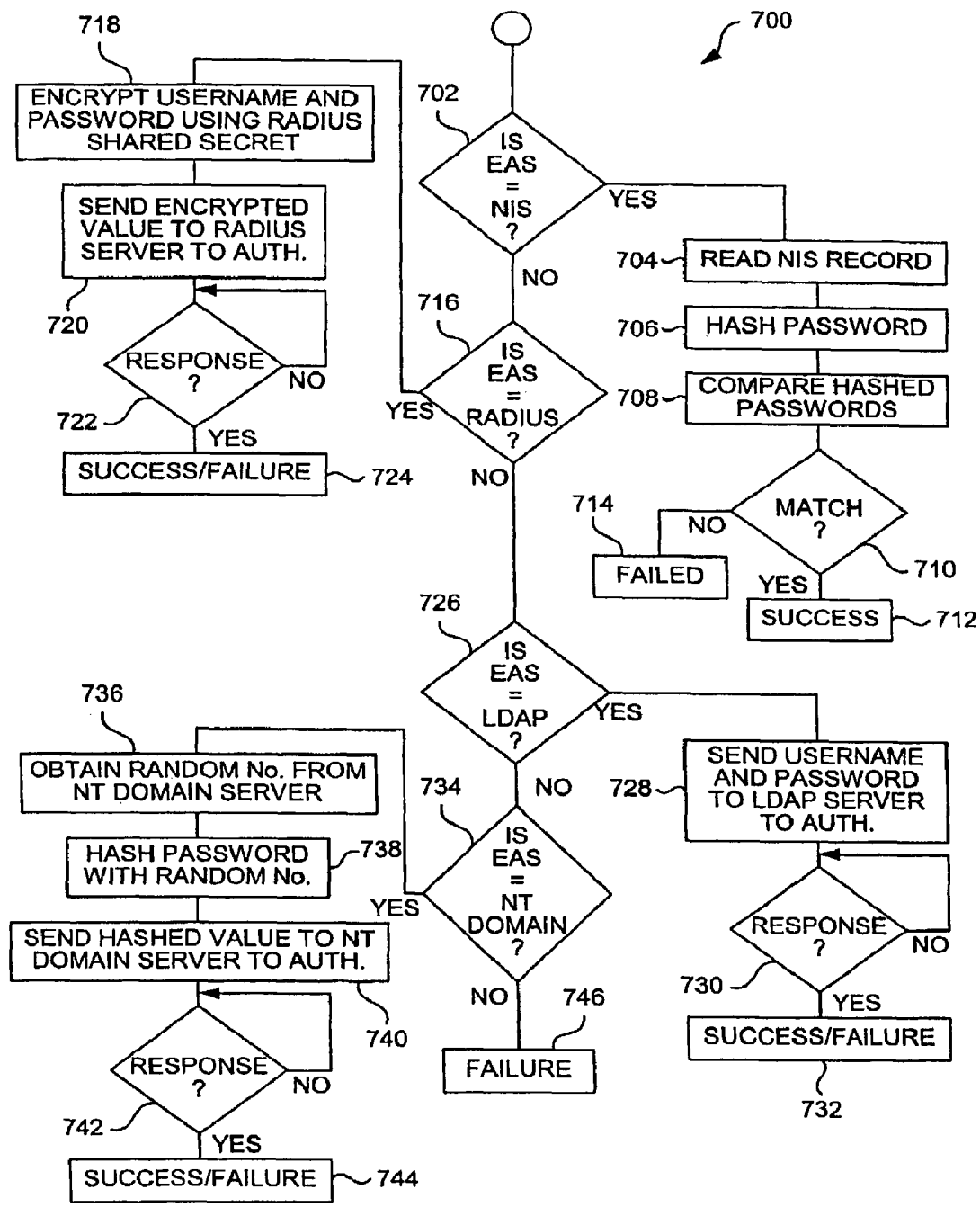
FIG. 7 is a flow diagram of detailed external authentication processing according to one embodiment of the invention.

On the other hand, when the decision 402 determines that a local record for the requestor does not exist, then a decision 416 determines whether a local setting is required. A system setting can be used to indicate whether or not a local record is required. An administrator can use such a system setting to limit access to only those users having local records. When the decision 416 determines that a local setting is required, then the authentication is deemed to have failed 412 because there is no available local record. Again, the access failure can be logged 414. Alternatively, when the decision 416 determines that a local setting is not required, or when the decision 404 determines that external authentication is to be performed, then an address and type of external authentication server (EAS) to be used for the authentication are obtained 418. Different processing is typically performed with different types of external authentication servers. Normally, these external authentication servers are already provided within the private network for purposes of performing authentications. Typically, there is a system setting that indicates a particular external authentication server to be used. Hence, the authentication processing 400 can make use of the native authentication provided by such external authentication servers. The discussion below pertaining to FIG. 7 provides additional detail on different types of external authentications.

Next, a decision 420 determines whether the external authentication has been successful. Here, external authentication is performed depending upon the particular type of external authentication that has been indicated. When the decision 420 determines that external authentication is not successful, then the authentication is deemed to have failed 412. Additionally, the access failure can be logged 414 as previously discussed. On the other hand, when the decision 420 determines that the external authentication has been successful, then the authentication is deemed to be successful 422. Following the operation 422, the authentication processing 400 is complete and ends with the requestor being authenticated.

Figure 5:
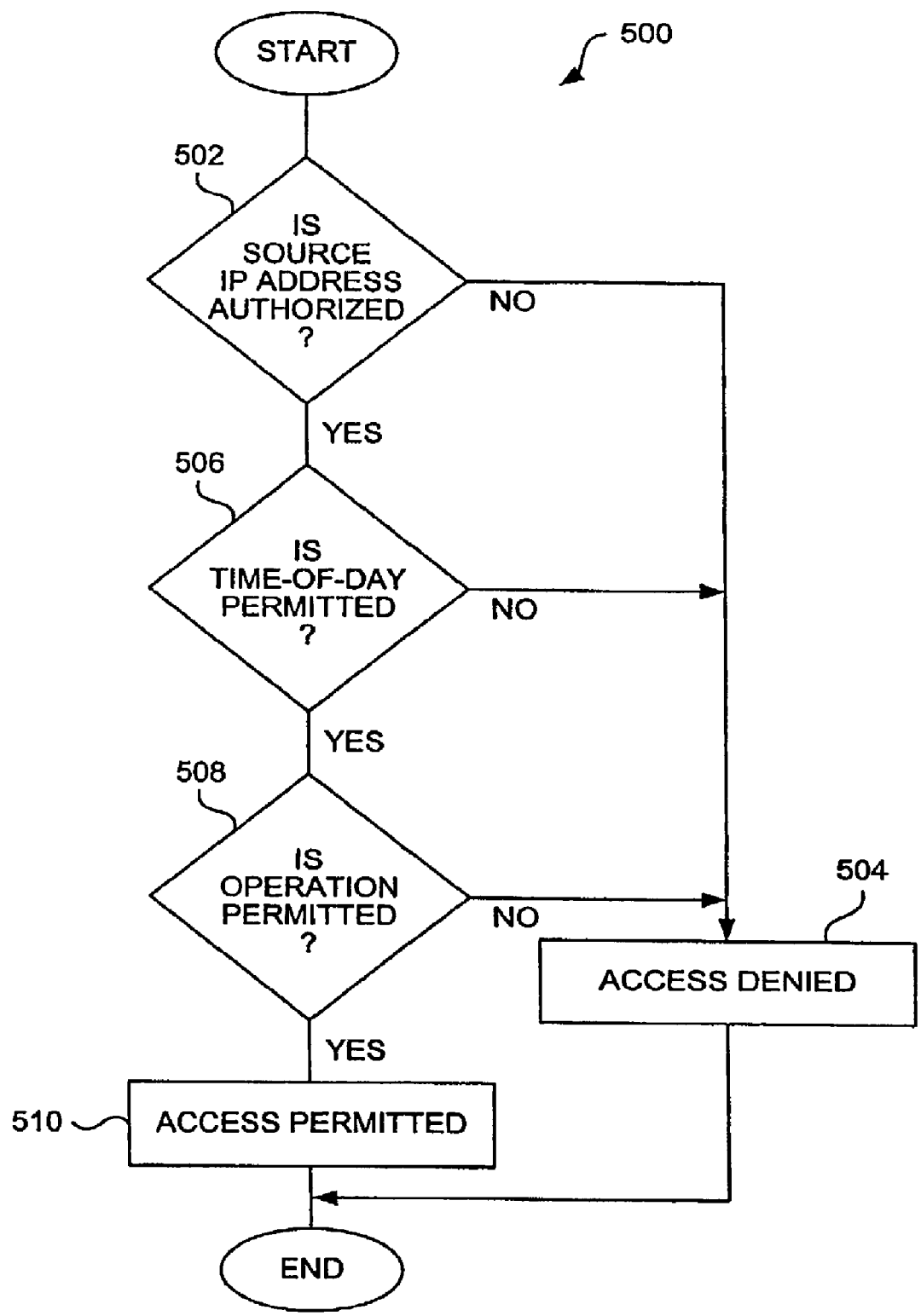
FIG. 5 is a flow diagram of access privilege processing according to one embodiment of the invention.

FIG. 5 is a flow diagram of access privilege processing 500 according to one embodiment of the invention. The access privilege processing 500 is, for example, processing performed by the decision 320 of FIG. 3. Namely, the access privilege processing 500 determines whether the access type being requested is permitted by a particular requestor. In effect, the access type provides various criteria that can be used to limit access by requestors. With respect to the embodiment shown in FIG. 5, the criteria includes source Internet Protocol (IP) address, time-of-day, and operations.

The access privilege processing 500 begins with a decision 502 that determines whether the source IP address associated with the received request (i.e., the requestor) is authorized. When the decision 502 determines that the source IP address associated with the received request is not authorized, then the access privilege processing 500 denies access 504. Here, to reduce risk of unauthorized access, the access privilege processing 500 ensures that only those IP addresses of known requestors are able to access the private resources.

When the decision 502 determines that the source IP address is authorized, then a decision 506 determines whether the time at which the request is being made satisfies a time-of-day access limitation. Typically, this limitation can be configured for all requestors or separately for each requestor. Here, the intermediary server can be configured, if desired, to permit access to private resources only during certain time periods. This, for example, can permit access only during business hours or other limited hours. When the decision 506 determines that the time of the received request is not within the time-of-day permitted, then the access privilege processing 500 denies access 504.

When the time associated with the received request is determined 506 to be within the time-of-day permitted, a decision 508 determines whether the particular operation associated with the received request is permitted. Here, the incoming request can request various different operations to be performed with respect to the private resources. These various different operations tend to vary with type of application being provided. The decision 508 can operate to limit the operations permitted to be used by different requestors. When the decision 508 determines that the operation being requested is not permitted, then access is denied 504. On the other hand, when the decision 508 determines that the requested operation is permitted, then access is permitted 510. Following the operations 504 and 510, the access privilege processing 500 is complete and ends.

Figure 6:
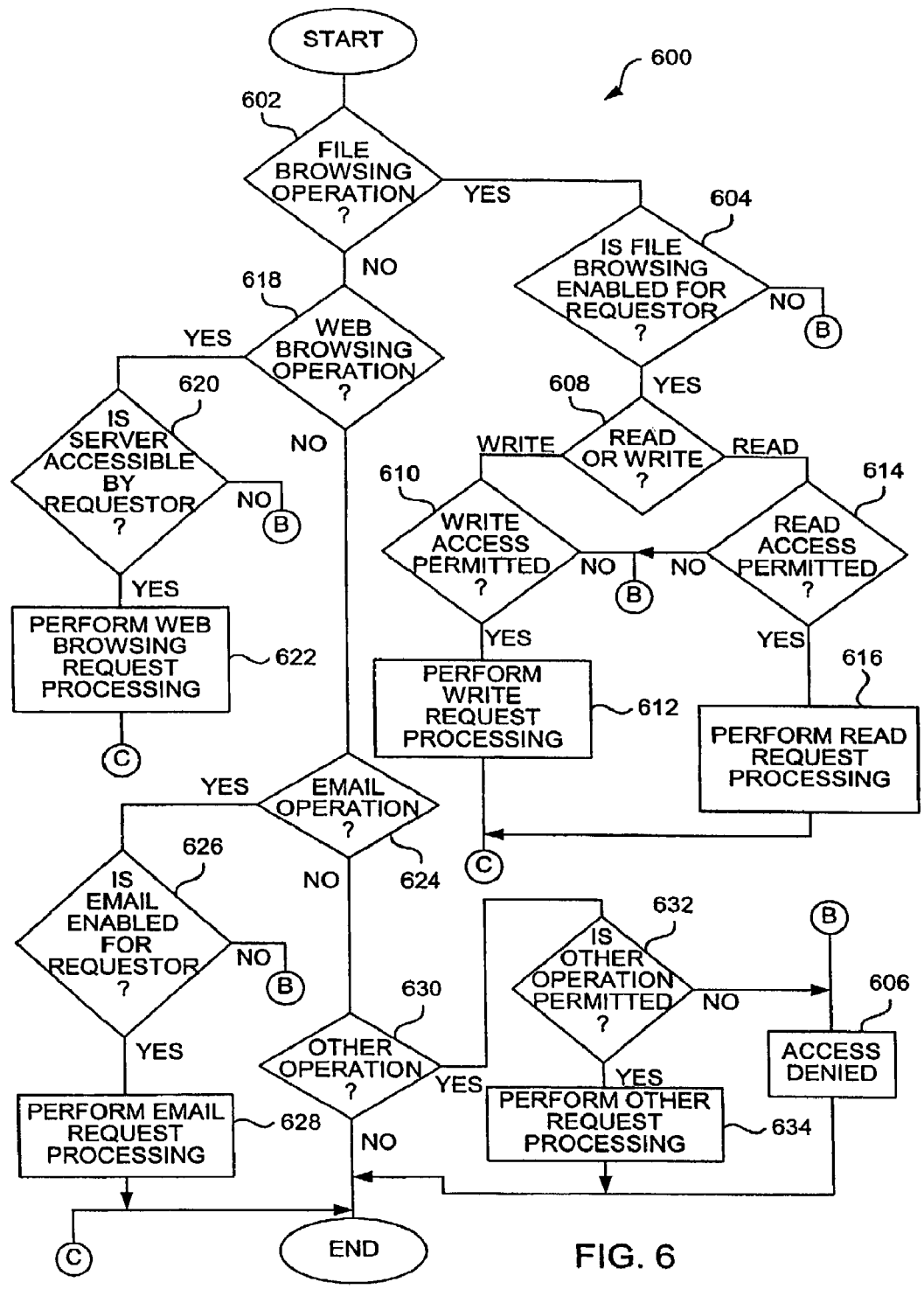
FIG. 6 is a flow diagram of operational privilege processing according to one embodiment of the invention.

FIG. 6 is a flow diagram of operational privilege processing 600 according to one embodiment of the invention. The operational privilege processing 600 is, for example, performed by the decision 508 illustrated in FIG. 5. It should also be noted that the operational privilege processing 600 performs the requested operation when such operation is determined to be permitted, and thus can be associated with the operations 320 and 324 of FIG. 3.

The operational privilege processing 600 begins with a decision 602 that determines whether a file browsing operation has been requested. When the decision 602 determines that a file browsing operation has been requested, then a decision 604 determines whether file browsing is enabled for the requestor. When the decision 604 determines that file browsing is not enabled for the requestor, then access is denied 606 and thus the operational privilege processing 600 ends. Alternatively, when the decision 604 determines that file browsing is enabled for the requestor, then a decision 608 determines whether a read or write operation is being requested. When the decision 608 determines that a write operation is requested, a decision 610 determines whether write access is permitted. In one embodiment, the decision 610 determines whether write access is permitted by the particular requestor making the request. When the decision 610 determines that write access is not permitted, then access is denied 606 and thus the operational privilege processing 600 ends. Alternatively, when the decision 610 determines that write access is permitted, then write request processing is performed 612 to carry out the received request. Following the operation 612, the operational privilege processing 600 ends with the requested operation having been performed.

On the other hand, when the decision 608 determines that a read operation is being requested, a decision 614 determines whether read access is permitted. In one embodiment, the decision 614 determines whether read access is permitted by the particular requestor making the request. When the decision 614 determines that read access is not permitted, then access is denied 606. Alternatively, when the decision 614 determines that read access is permitted, then read request processing is performed 616 to carry out the requested operation. Following the operation 616, the operational privilege processing 600 is complete and ends with the requested operation having been performed.

On the other hand, when the decision 602 determines that the requested operation is not a file browsing operation, a decision 618 determines whether the requested operation is a web browsing operation. When the decision 618 determines that the requested operation is a web browsing operation, a decision 620 determines whether the server associated with the web browsing operation is accessible to the requestor. When the decision 620 determines that the server is not accessible to the requestor, then access is denied 606. In one embodiment, the intermediary server can maintain a list of servers that are accessible by particular requestors. This enables the intermediary server to control the resources that particular requestors are able to browse by server names. For example, although a private network may include numerous servers, requestors are able to be individually restricted to accessing only certain servers. Alternatively, when the decision 620 determines that the server associated with the web browsing operation is accessible to the requestor, then the web browsing request processing is performed 622. In other words, the requested web browsing operation is performed 622 because the requestor was entitled to access the particular server. Following the operation 622, the operational privilege processing 600 ends with the requested operation having been performed.

On the other hand, when the decision 618 determines that the requested operation is not a web browsing operation, then a decision 624 determines whether the requested operation is an email operation. When the decision 624 determines that the requested operation is an email operation, then a decision 626 determines whether email (electronic mail) is enabled for the requestor. When the decision 626 determines that email is not enabled for the requestor, then access is denied 606. Here, the intermediary server is able to control access to email operations by particular requestors. Alternatively, when the decision 626 determines that email is enabled for the requestor, the email request processing is performed 628. In other words, the requested email operation is performed because the requestor had suitable privileges to perform the operation. Following the operation 628, the operational privilege processing 600 ends with the requested operation having been performed.

Still further, when the decision 624 determines that the requested operation is not an email operation, then a decision 630 determines whether the requested operation is some other operation that is permitted by the intermediary server. Here, the other operation can be any suitable operation that is facilitated by the intermediary server. In effect, the other operation can represent a generic operation that is available on the intermediary server. The other operation can also refer to a local operation being performed by the intermediary server without access to a private network. Examples of local operations can vary widely but can include: adding bookmarks, adding, editing or deleting local records, altering file shares, etc. However, the other operation could also be an operation performed within the private network. When the decision 630 determines that the requested operation is one of the other operations, then a decision 632 determines whether the other operation is permitted. When the decision 632 determines that the requested operation is not one of the other operations that are permitted, then access is denied 606. Alternatively, when the decision 632 determines that the other operation is permitted, then the other request processing is performed 634. Following the operation 634, the operational privilege processing 600 is complete and ends with the other type of operation having been performed.

On the other hand, when the decision 630 determines that the requested operation is not one of the other operations that are permitted (by the requestor), then the operational privilege processing 600 ends without having performed the requested operation. Here, since the requested operation was unsupported by the operational privilege processing 600, the requested operation is not processed (i.e., it is blocked) at the intermediary server.

FIG. 7 is a flow diagram of detailed external authentication processing 700 according to one embodiment of the invention. The detailed external authentication processing 700 is, for example, detailed processing associated with the decision 420 illustrated in FIG. 4. The detailed external authentication processing 700 supports a variety of different types of external authentication systems, including: Network Information System (NIS), Remote Authentication Dial-In User Service (RADIUS), Lightweight Directory Access Protocol (LDAP), and NT domain. Hence, the external authentication performed for the intermediary server can use any of a variety of native authentication approaches that a private network might provide.

The detailed external authentication processing 700 begins with a decision 702 that determines whether the external authentication server (EAS) is NIS. When the external authentication server is NIS, then a NIS record is read 704. Then, the password provided with the login request is hashed 706. The hashed password is compared 708 with that provided within the MS record. A decision 710 then determines whether the hashed passwords match. When the passwords do match, the authentication succeeds 712. When the passwords do not match, the authentication fails 714.

On the other hand, when the decision 702 determines that the external authentication server is not NIS, a decision 716 determines whether the external authentication server is RADIUS. When the external authentication server is RADIUS, then the username and password provided with the login request are encrypted 718 using a RADIUS shared secret. The RADIUS shared secret is typically a shared key. Then, the encrypted value is sent 720 to the RADIUS server for authentication. A decision 722 then determines whether a response from the RADIUS server has been received. The response, when received, indicates 724 success or failure of the authentication.

On the other hand, when the decision 716 determines that the external authentication server is not RADIUS, then a decision 726 determines whether the external authentication server is LDAP. When the decision 726 determines that the external authentication server is LDAP, the username and password provided with the login request are sent 728 to the LDAP server for authentication. A decision 730 then determines whether a response from the LDAP server has been received. The response, when received, indicates 732 success or failure of the authentication.

On the other hand, when the decision 726 determines that the external authentication server is not LDAP, a decision 734 determines whether the external authentication server is NT domain (NT domain server). When the decision 734 determines that the external authentication server is NT domain, a random number is obtained 736 from the NT domain server. Then the password provided with the login request is hashed 738 with the random number. Next, the hashed value is sent 740 to the NT domain server for authentication. A decision 742 then determines whether a response from the NT domain server has been received. The response indicates 744 success or failure of the authentication.

Figure 8A:
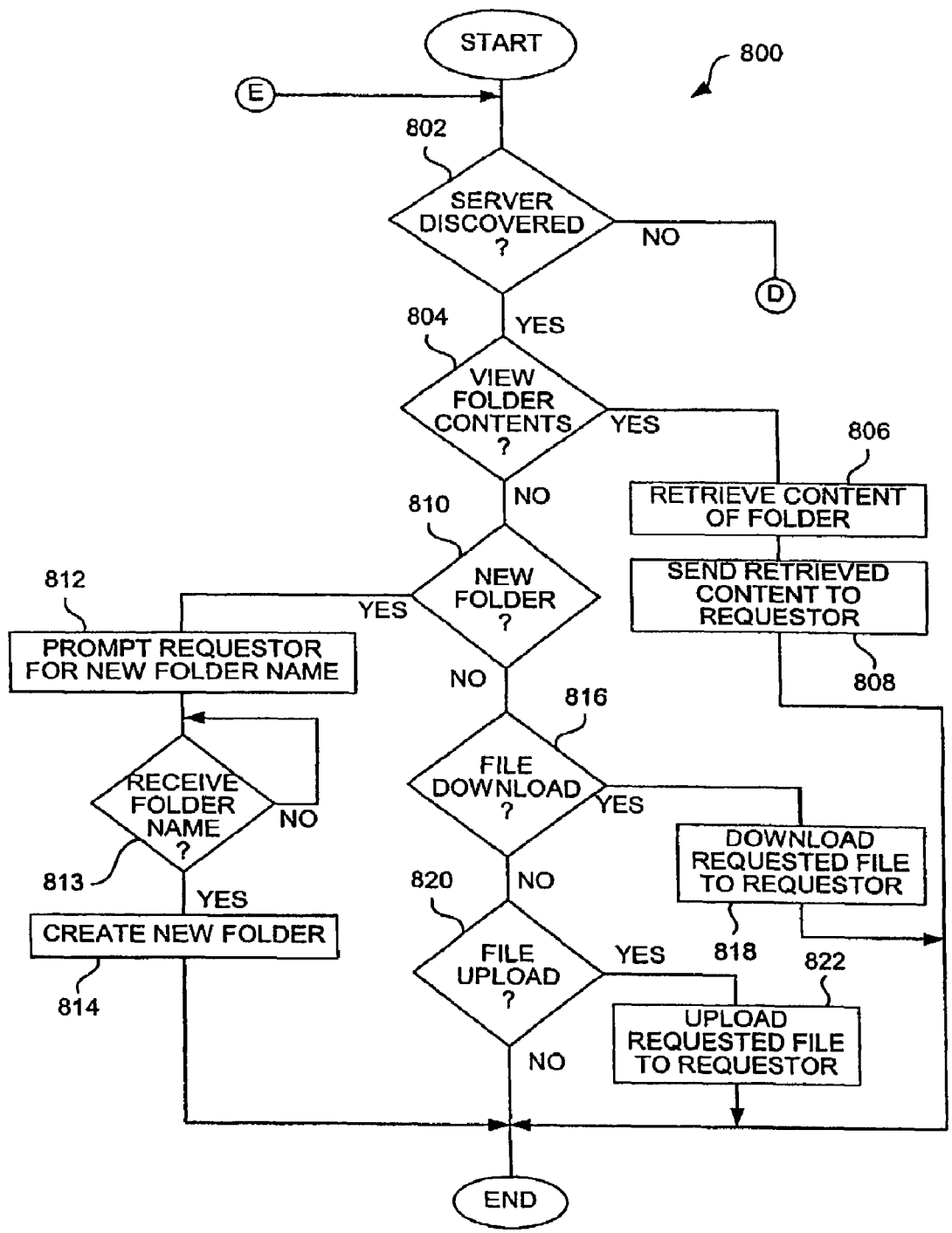
FIGS. 8A and 8B are flow diagrams of file access request processing according to one embodiment of the invention.
Figure 8B:
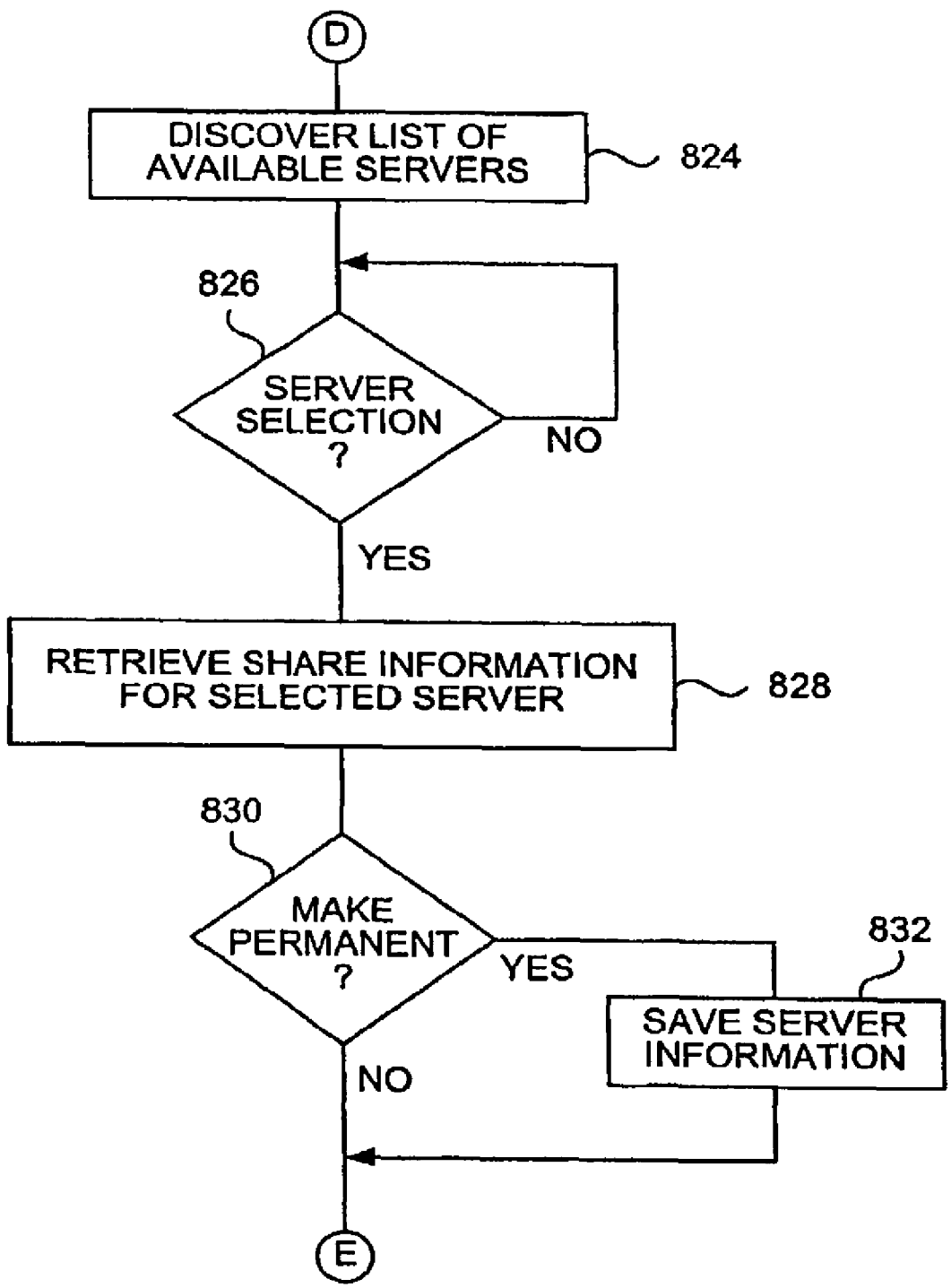

FIGS. 8A and 8B are flow diagrams of file access request processing 800 according to one embodiment of the invention. The file access request processing 800 is, for example, the processing performed when a web browsing operation has been requested by a requestor. In other words, the file access request processing 800 can, for example, be the processing performed by one embodiment of the block 622 of FIG. 6.

The file access request processing 800 begins with a decision 802 that determines whether a server has been discovered. When the decision 802 determines that a server has already been discovered, then a decision 804 determines whether the file access request seeks to view folder contents. When the decision 804 determines that the file access request does desire to view folder contents, then the content of the folder is retrieved 806. The retrieved content is then sent 808 to the requestor.

On the other hand, when the decision 804 determines that the file access request does not seek to view folder contents, a decision 810 determines whether the file access request is requesting a new folder. When the decision 810 determines that the file access request is seeking to request a new folder, then the requestor is prompted 812 for a new folder name. A decision 813 then determines whether a folder name has been received. When the decision 813 determines that a folder name has not yet been received, the file access request processing 800 waits for the folder name. Once the decision 813 determines that the folder name has been received, the new folder is created 814.

Alternatively, when the decision 810 determines that the file access request does not desire to create a new folder, then a decision 816 determines whether the file access request desires to download a file. When the decision 816 determines that the file access request desires to download a file, then the requested file is downloaded 818 to the requestor. On the other hand, when the decision 816 determines that the file access request does not desire to download a file, then a decision 820 determines whether the file access request desires to upload a file. When the decision 820 determines that the file access request does desire to upload a file, then the requested file is uploaded 822 to the requestor. Alternatively, when the decision 820 determines that the file access request does not desire to upload a file, then additional types of file access requests could be processed, although none are shown in FIG. 8A. Accordingly, following the decision 820 when the file access request does not desire to upload a file (and no additional types of file access requests are supported), then the file access request processing 800 is complete and ends with no file access operation having been performed. Following the blocks 808, 814, 818 and 822, the file access request processing 800 is also complete and ends but does so with the requested file access having been performed.

Furthermore, when the decision 802 determines that a server has not already been discovered, then the file access request processing 800 performs the processing shown in FIG. 8B. In this case, a list of available servers is initially discovered 824. Then, a decision 826 awaits the selection of one of the available servers by the requestor. Once the decision 826 determines that a server selection has been received, then share information for the selected server is retrieved 828. In one embodiment, the share information identifies those of the folders stored on the selected server that are able to be shared with third parties, such as remote requestors. A decision 830 then determines whether the information about the server should be made permanent. When the decision 830 determines that the information about the server should be made permanent, then the server information is saved 832. By saving the server information, the server is made an "available server" such that discovery of the availability of the server is not needed with subsequent logins to the system. On the other hand, when the decision 830 determines that the information about the server should not be made permanent, then the block 832 is bypassed. In any case, following the block 830 when the server information is not to be made permanent, as well as following the block 832 when the server information is to be made permanent, the processing to discover a server is complete and thus the file access request processing 800 returns to repeat the decision 802 and subsequent operations.

Figure 9A:
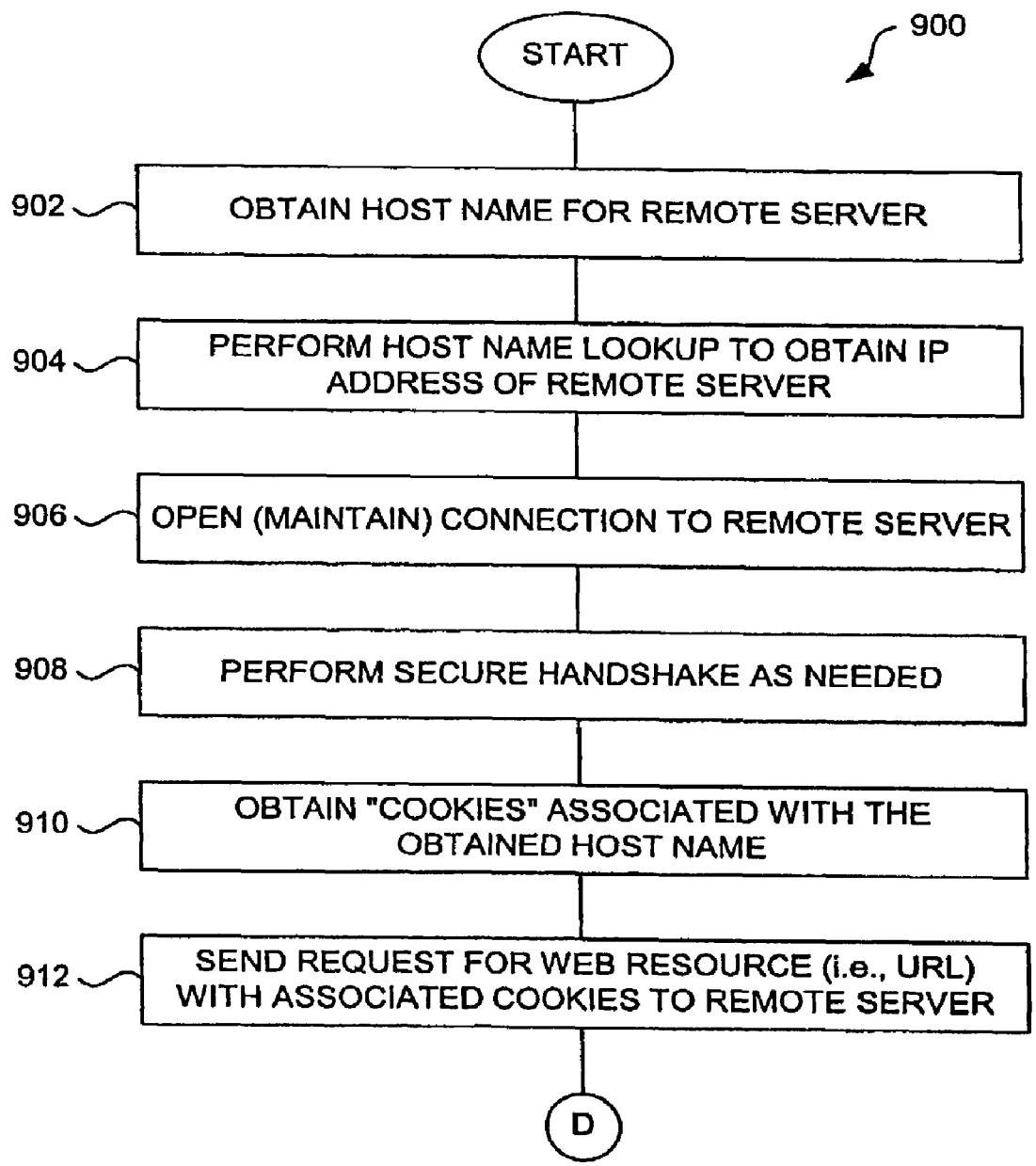
FIGS. 9A-9C are flow diagrams of web resource request processing according to one embodiment of the invention.
Figure 9B:
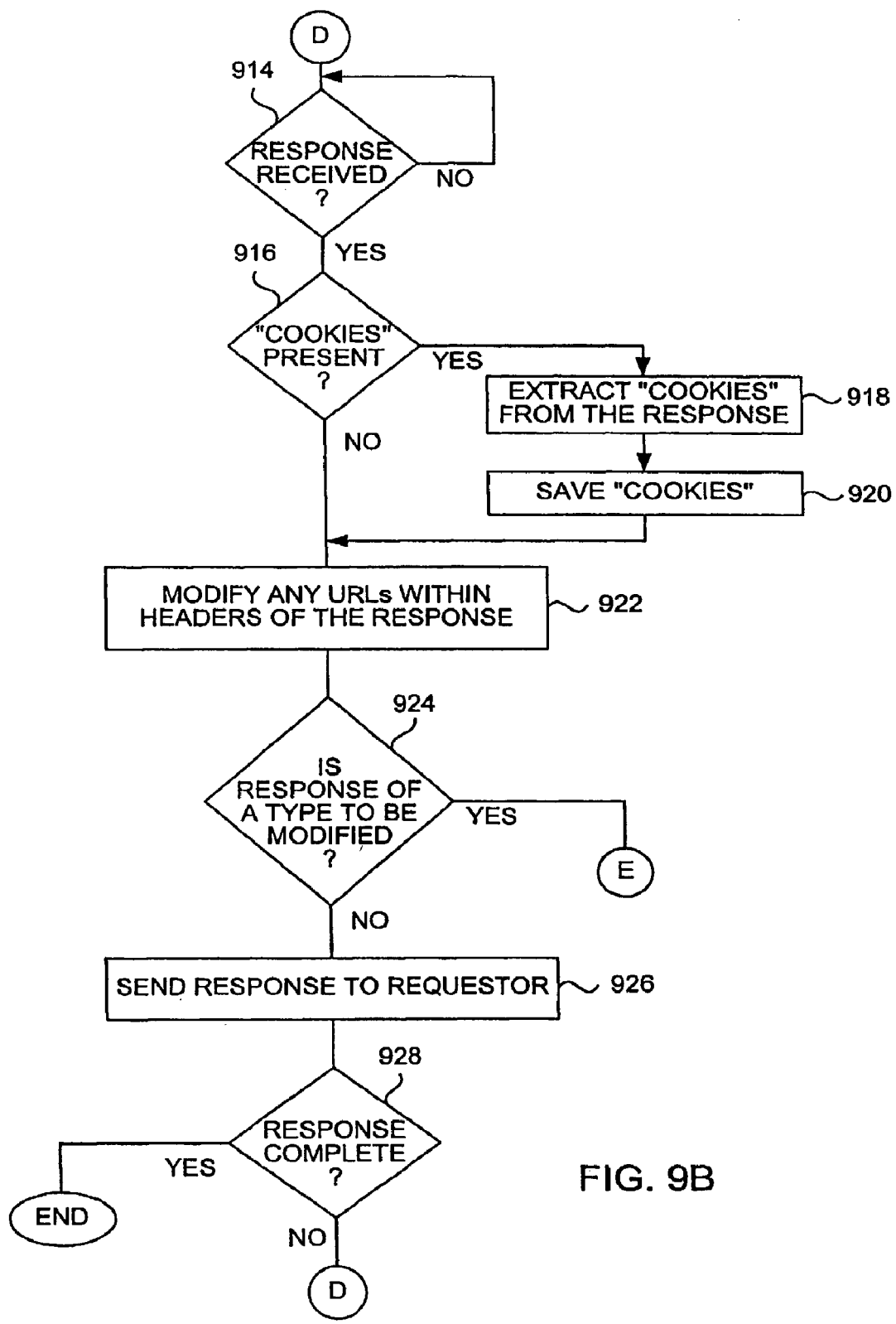
Figure 9C:
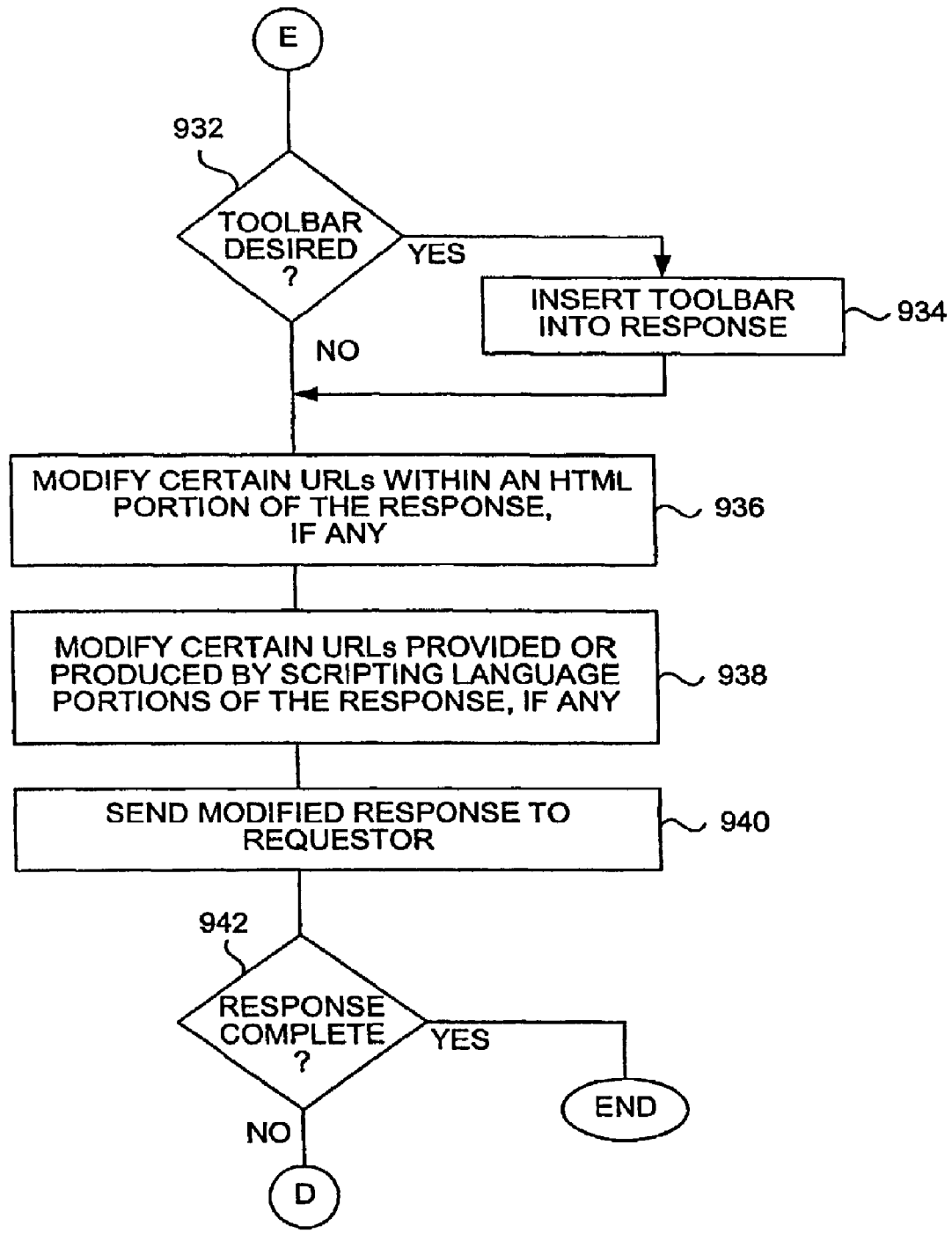

FIGS. 9A-9C are flow diagrams of web resource request processing 900 according to one embodiment of the invention. The web resource request processing 900 is, for example, performed by an intermediary server, such as the intermediary server 108 illustrated in FIG. 1A or the intermediary server 158 illustrated in FIG. 1B. The web resource request processing 900 is performed to process a web resource request.

Initially, the host name for the appropriate remote server is obtained 902. In one embodiment, the host name can be obtained from storage. Here, the storage can, for example, be the data storage device 214 illustrated in FIG. 2A. In another embodiment, the host name can be obtained from the URL associated with the web resource request. After the host name for the appropriate remote server is obtained 902, a host name lookup is performed 904 to obtain an IP address of the appropriate remote server. A connection is then opened 906 (or maintained if already opened) to the remote server. Next, a secure handshake is performed 908 between the intermediary server and the remote server as needed. Any "cookies" associated with the obtained host name are then obtained 910. Following the operation 910, the pre-processing of the web resource request at the intermediary server is complete and the request is now able to be forwarded to the remote server. At this point, the request for the web resource with associated "cookies" is sent 912 to the remote server.

A decision 914 then determines whether a response has been received. When the decision 914 determines that a response has not yet been received, the web resource request processing 900 awaits such a response. Once the decision 914 determines that a response has been received, then a decision 916 determines whether "cookies" are present in the response. When the decision 916 determines that "cookies" are present in the response, then the "cookies" are extracted 918 from the response. The extracted "cookies" are then saved 920. Typically, the "cookies" are stored in central storage provided within the intermediary server or other storage associated or coupled to the intermediary server. Following the operation 920, as well as following the decision 916 when it is determined that "cookies" are not present in the response, URLs within headers of the response are modified 922.

A decision 924 then determines whether the response is of a type that is to be modified. Here, in general, a response can be of a variety of forms such as HTML, graphics, pdf, MPEG, or other formats. When the decision 924 determines that the response is of a type that cannot be modified (e.g., graphics), then the response can be immediately sent (or forwarded) 926 to the requestor. Then, a decision 928 determines whether the response is completed. When the decision 928 determines that the response is completed, then the web resource request processing 900 returns to repeat the decision 914 and subsequent operations so that additional web resource requests can be processed. Alternatively, when the decision 928 determines that so far only a portion of the response has been sent to the requestor, the web resource request processing 900 returns to repeat the decision 914 and subsequent operations or the like so that subsequent portions of the response can be similarly processed.

On the other hand, when the decision 924 determines that the response is of a type that can be modified (e.g., HTML), then the response is processed to modify the response before returning it to the requestor. The processing illustrated in FIG. 9C represents one embodiment of processing that can be performed to modify the response. In particular, a decision 932 determines whether a toolbar is desired. The intermediary server can be configured to always, sometimes or never insert the toolbar. The toolbar can be standardized or customizable by the intermediary server. When the decision 932 determines that a toolbar is desired, the toolbar HTML is inserted into the response. The toolbar that is produced by the toolbar HTML can provide controls or content that are added to the resulting response so as to facilitate features or functionality provided by the intermediary server.

Next, certain URLs within an HTML portion of the response can be modified 936. In one embodiment, the modifications to the certain URLs can be achieved by modifying the host name portion of URLs within certain tags of the resulting HTML. In another embodiment, the modifications to the certain URLs can be achieved by adding suffixes to the certain URLs. The suffixes thus serve to allow the URLs to carry additional information. Further, certain URLs provided or produced by scripting language portions within the resulting HTML can be modified 938. Examples of scripting languages include JavaScript and VBscript. In one embodiment, a host name portion of the certain URLs provided or produced by scripting language portions within the resulting HTML are modified 938. In another embodiment, the certain URLs provided or produced by scripting language portions are modified 938 to include suffixes which carry supplemental information. Additional details on modifying scripting language portions is provided below with reference to FIGS. 13A and 13B. Thereafter, the modified response is sent 940 to the requestor.

A decision 942 then determines whether the request has been completed. When the decision 942 determines that the request has been completed, then the web resource request processing 900 is complete and ends. On the other hand, when the decision 942 determines that the request is not yet completed, then the web resource request processing 900 returns to repeat the decision 914 and subsequent operations so that remaining portions of the response can be similarly processed upon being received. The web resource request processing 900 can thus operate to process a single response to a resource request in multiple pieces or blocks of data. In such a case, the web resource request processing 900 can process a response from a remote server as it arrives so that responsiveness to the requestor is not hindered. In this regard, the web resource request processing 900 causes the operations 914-942 to be repeated for each piece or block of data associated with a response.

Figure 10:
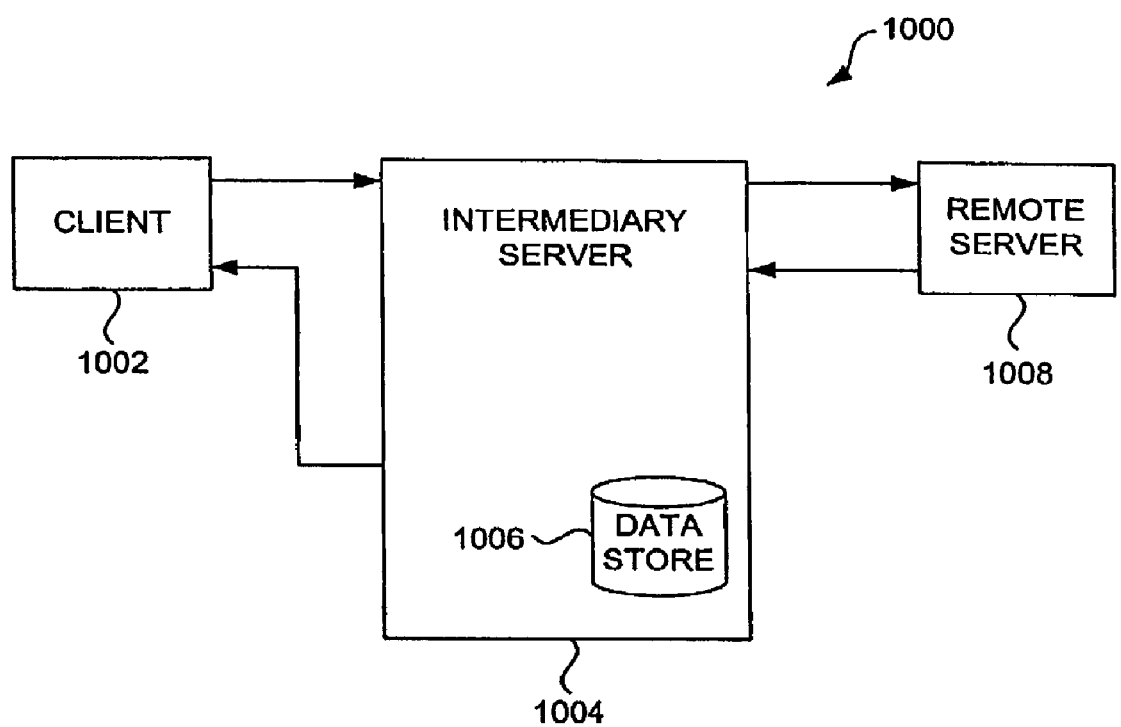
FIG. 10 illustrates a diagram of an information retrieval system according to one embodiment of the invention.

FIG. 10 illustrates a diagram of an information retrieval system 1000 according to one embodiment of the invention. The information retrieval system 1000 is generally similar to the information retrieval system 100 of FIG. 1A or the information retrieval system 150 of FIG. 1B. The operation of the information retrieval system 1000 is discussed below with reference to a representative example which illustrates its operation according to one embodiment. The information retrieval system 1000 includes a client 1002, an intermediary server 1004 with a data store 1006, and a remote server 1008. It is assumed that the request processing 300 of FIG. 3 has already been performed and that the requestor is permitted to access the requested resource in the manner sought.

The representative example pertains to a secure request which can be initiated by the user selecting a hyperlink in a displayed webpage in the content of a web browsing request. The selected hyperlink is assumed to be https://secure.danastreet.comlquote/msft:danainfo: host=www.xyz.com where "https" is the protocol which uses Secure Socket Layer (SSL), is secure.danastreet.com" is the host name with "danastreet.com" being a domain and "secure" being a subdomain, "/quote/msft" being a path to the particular resource being requested by selection of the hyperlink, "danainfo" is a keyword, and "www.xyz.com" is the host where the requested resource resides. Hence, the domain name lookup of the host name I&secure.danastreet.com" is resolved to the IP address of danastreet.com, which is the intermediary server 1004 for this example. The request is then sent from the client 1002 to the intermediary server 1004. The request is, for example, as follows:

```
GET:    /quote/msft:danainfo:host=www.xyz.com HTTP/1.0
        Host: secure.danastreet.com
        Cookie: DSID = 123xyzzbc
```

Other information can also be included within the request such as additional cookies, encoding-accepted, etc. The cookie is, in this example, a session cookie (session identifier) and is used in determining whether the client 1002 is authorized for use with the intermediary server 1004.

In the case of a secure request, the host name within the request is not able to directly identify the remote server 1008 where the request is eventually to be delivered. However, the host name for the remote server 1008 is obtained from information provided with the request. More particularly, the information (i.e., host variable) is provided as a suffix with the request. In this example, the suffix includes the information that the host name of the remote server 1008 is "www.xyz.com". Once the appropriate host name has been obtained, a domain name lookup on the host name ("www.xyz.com") is performed. Next, a connection from the intermediary server 1004 and the remote server 1008 is opened (or maintained if already opened), and secure handshaking is optionally performed. Any cookies in the data store 1006 associated with the host name and the requestor can then be obtained. Next, a request by the intermediary server 1004 is sent to the remote server 1008. The request is, for example, as follows:

```
GET:    /quote/msft HTTP/1 .0
        Host: www.xyz.com
        Cookie: xyzUserID = sam
```

Other information can also be included within the request. Note that the cookie provided with the original request pertained to the intermediary server 1004 and thus is not forwarded with the request to the remote server 1008.

The remote server 1008 receives the request and returns a response header and some or all of the content of the requested resource. An exemplary response can have the following format:

```
HTTP/1.0 200 OK
Set-cookie: xyzuserID = Samual, expires = 01-Jul-2002
Content-type: text/html
Content-length: 2000
Location: https://www.xyz.com/quote/msft
<HTML>
**
</HTML>
```

Since the response included a "cookie" to be set, the set-cookie command is removed from the response and then saved in the data store 1006. Next, to the extent they are present, the URLs within the headers are modified to point to the intermediary server 1004. In this example, the location header includes a full path (including host name), namely, https://www.xyz.com/quote/msft, which is thus modified to https://secure.danastreet.com/quote/msft:danainfo: host=www.xyz.com,SSL. In this example, not only are the host names modified but variables are also added to the end (i.e., suffix) of the URL. The variable information added is an indication of the host server having the requested resource and an SSL indicator. With this example, the relative URLs need to be modified to include the variable information ("danainfo:host=www.xyz.com") at the end of the relative URLs. The host names for the relative URLs are properly provided by the browser application operating on the client 1002 which causes the current host name ("secure.danastreet.com") to be used for such paths. If desired, a toolbar can be inserted into the HTML data to facilitate operations or functions supported by the intermediary server 1004. Still further, the URLs within certain tags within the resulting HTML or those produced by scripting languages are modified to point to the intermediary server 1004.

For example, if the HTML data included the following hyperlink:

<a ref=https://www.xyz.com/quote/msft> then the hyperlink would be modified to the following:

---
<a ref=https:Hsecure.danastreet.com
/quote/msft:danainfo:host=www.xyz.com,SSL>.
---

Also, if the HTML data included the following relative hyperlink:

<a ref=a.html> then the hyperlink would be modified to the following:

<a ref=a.html:danainfo:host=www.xyz.com,SSL>.

It should be noted that the variable information provided at the end (i.e., suffix) of the URLs need not be at the actual end. Here, suffix is used to generally indicate to the right of the domain name. Indeed, the variable information can be placed in a variety of different locations in a URL (even to the left of the domain name). For example, if the original hyperlink itself has variables such as following the characters "?" or "#", then the variable information ("danainfo: host=www.xyz.com") can, in one example, be placed before the character "?" or "#" indicating the original variables. For example, if the HTML data included the following hyperlink:

<a ref=https://www.xyz.com/quote/msft?color=red> then the hyperlink would be modified to the following:

---
<a ref=https:Hsecure.danastreet.com
/quote/msft:d an ainfo: host=www.xyz.com?color=red>.
---

Also, if the HTML data included the following relative hyperlink:

<a ref=a.html?x=1234> then the hyperlink would be modified to the following:

<a ref=a.html:danainfo: host=www.xyz.com?x=1234>.

As still another example, if the HTML data included the following relative hyperlink:

<a ref=a.html, port=1234> then the hyperlink would be modified to the following:

<a ref=a.html:danainfo:host=www.xyz.com, port=1234>.

Figure 11:
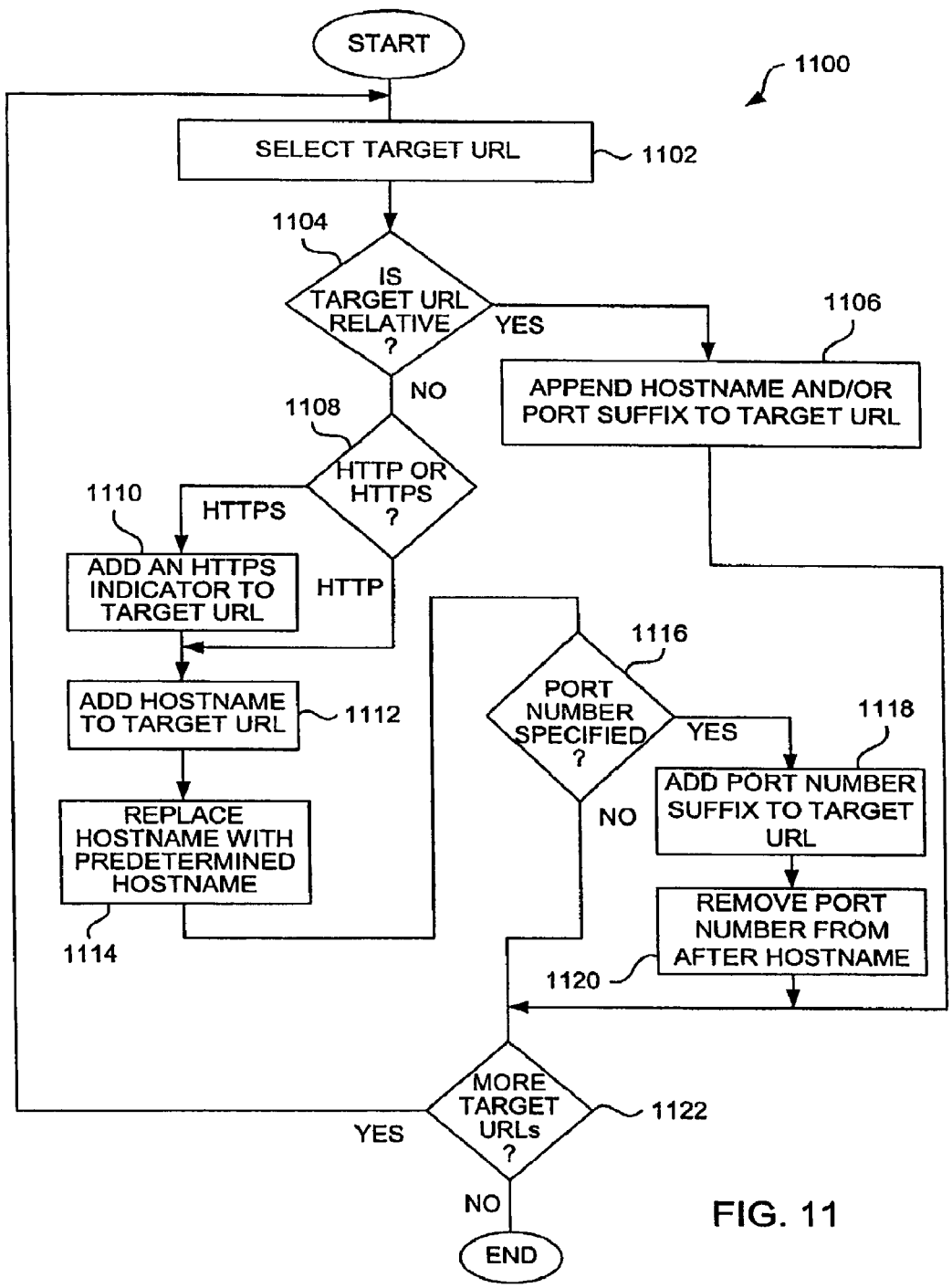
FIG. 11 is a flow diagram of URL modification processing according to one embodiment of the invention.

FIG. 11 is a flow diagram of URL modification processing 1100 according to one embodiment of the invention. The URL modification processing 1100 is, for example, processing performed by operation 936 of FIG. 9C. The URL modification processing 1100 can, for example, be performed by the content transformer 216 illustrated in FIG. 2A or the content transformer 278 illustrated in FIG. 2B.

The URL modification processing 1100 begins by selecting 1102 a target URL within an HTML portion of the response (e.g., webpage). Typically, one or more target URLs are previously identified by scanning the HTML data. Then, a decision 1104 determines whether the target URL is a relative URL. A relative URL inherits the characteristics of its source URL. The source URL is the URL associated with the webpage (including the resulting HTML) that includes the target URL. When the decision 1104 determines that the target URL is a relative URL, then the hostname and/or port suffix from the source URL are appended 1106 to the target URL.

Alternatively, when the decision 1104 determines that the target URL is not a relative URL, then a decision 1108 determines whether the target URL is associated with a secure request (e.g., HTTPS). When the decision 1108 determines that the request for the target URL is a secure request, then a secure indicator (e.g., HTTPS) is added 1110 to the target URL. On the other hand, if the decision 1108 determines that the target URL is not associated with a secure request, the operation 1110 is bypassed.

Following the operation 1110 as well as directly following the decision 1108 when the target URL is not associated with a secure request, then the host name provided with the target URL is added 1112 elsewhere to the target URL. For example, the host name provided with the target URL can be appended to the target URL. Then, the original host name provided with the target URL is replaced 1114 with a predetermined host name. In other words, the host name originally provided for the target URL is effectively rewritten such that the original host name is replaced with the predetermined host name, but the original host name remains part of the target URL. For example, the predetermined host name is the host name for the appropriate intermediary server.

Next, a decision 1116 determines whether a port number is specified in the target URL. When the decision 1116 determines that a port number is specified in the target URL, then a port number suffix is added 1118 to the target URL. The port number originally specified in the target URL following the host name is removed 1120.

Following the operation 1120, the URL modification processing 1100 performs a decision 1122. Additionally, when the decision 1116 determines that a port number is not specified in the target URL, no port number processing is needed so the decision 1122 is then performed. The decision 1122 determines whether more target URLs are to be processed. As previously noted, these target URLs have been previously identified by scanning the resulting HTML data. When the decision 1122 determines that there are more target URLs, then the URL modification processing 1100 returns to repeat the operation 1102 and subsequent operations so that additional target URLs can be processed. Alternatively, when the decision 1122 determines that there are no more target URLs, then the URL modification processing 1100 is complete and ends.

Figure 12:
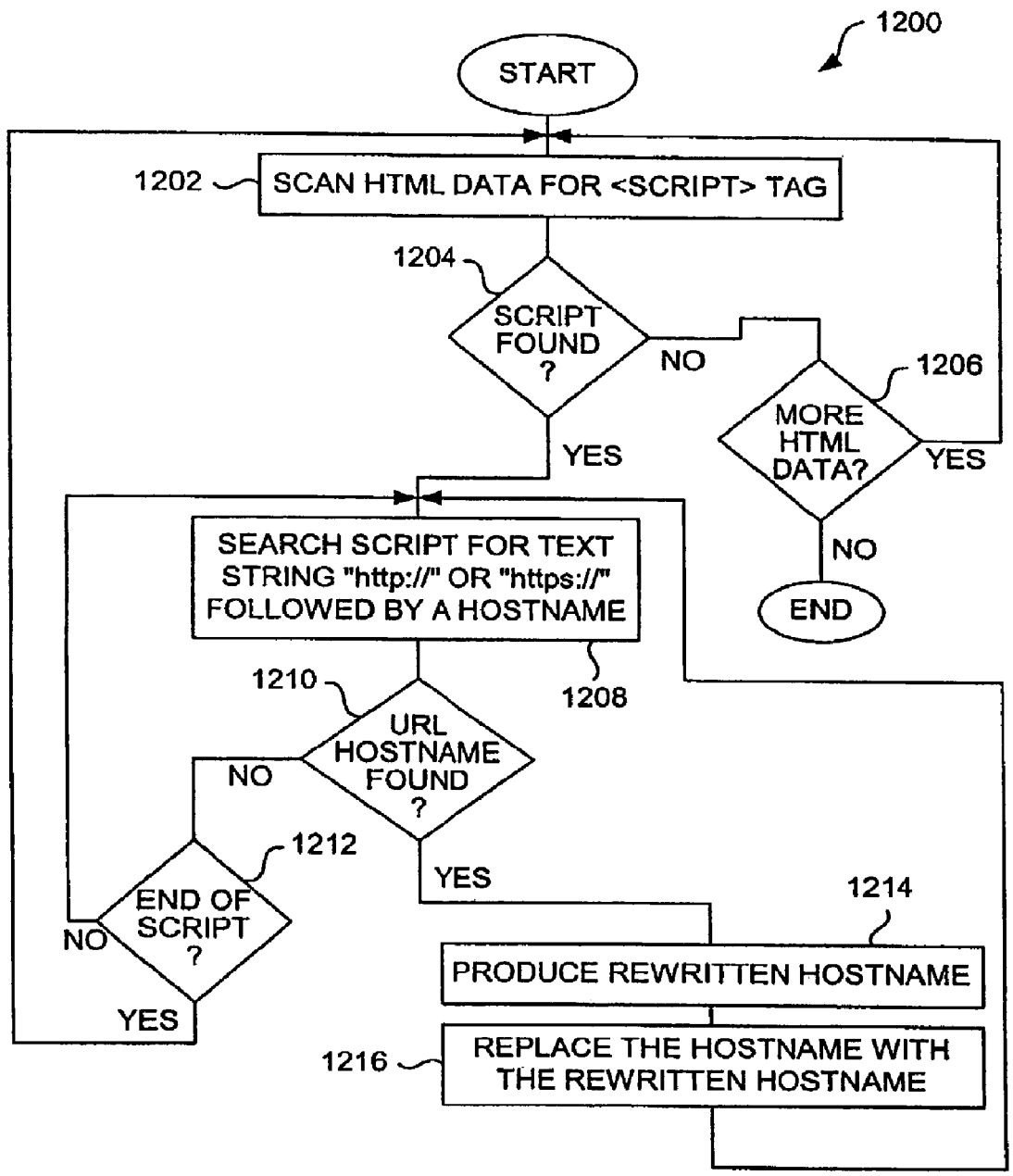
FIG. 12 is a flow diagram of script modification processing according to one embodiment of the invention.

FIG. 12 is a flow diagram of a script modification processing 1200 according to one embodiment of the invention. The script modification processing 1200 is, for example, performed by operation 938 illustrated in FIG. 9C. In general, the script modification processing 1200 operates to modify script portions within the resulting HTML.

The script modification processing 1200 initially scans 1202 the HTML data (e.g., of the resulting HTML) for a <script> tag. A decision 1204 then determines whether a script has been found. When the decision 1204 determines that a script has not been found, then a decision 1206 determines whether there is more HTML data to be scanned. When the decision 1206 determines that there is more HTML data to be scanned, then the script modification processing 1200 returns to repeat the operation 1202 and subsequent operations. Alternatively, when the decision 1206 determines that there is no more HTML data to be scanned, the script modification processing 1200 is complete and ends.

On the other hand, when the decision 1204 determines that a script has been found, then the script is searched 1208 to locate text strings "http://" or "https://" followed by a host name. A decision 1210 then determines whether a URL host name has been found by the searching 1208 of the script. When the decision 1210 determines that a URL host name has not been found, then a decision 1212 determines whether the end of the script has been reached. When the decision 1212 determines that the end of the script has not yet been reached, then the script modification processing 1200 returns to repeat the operation 1208 and subsequent operations. Alternatively, when the decision 1212 determines that the end of the script has been reached, then the script modification processing 1200 returns to repeat the operation 1202 and subsequent operations so that additional scripts can be found and processed.

On the other hand, when the decision 1210 determines that a URL host name has been found, then a rewritten host name is produced 1214. The host name provided within the script is then replaced 1216 with the rewritten host name. Following the operation 1216, the script modification processing 1200 returns to repeat the operation 1208 and subsequent operations so that additional host names within the script can be similarly processed.

Figure 13A:
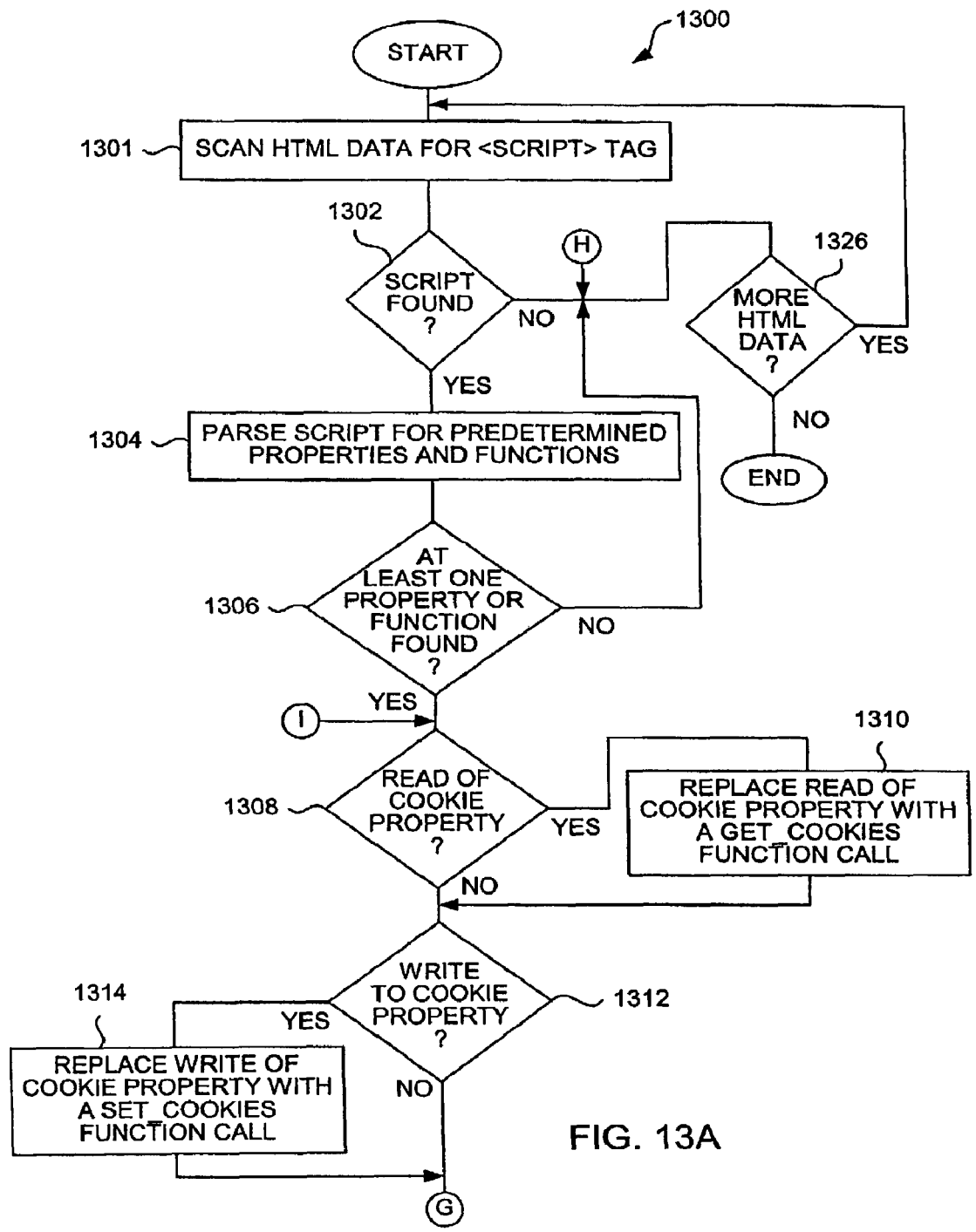
FIGS. 13A and 13B are flow diagrams of script modification processing according to another embodiment of the invention.
Figure 13B:
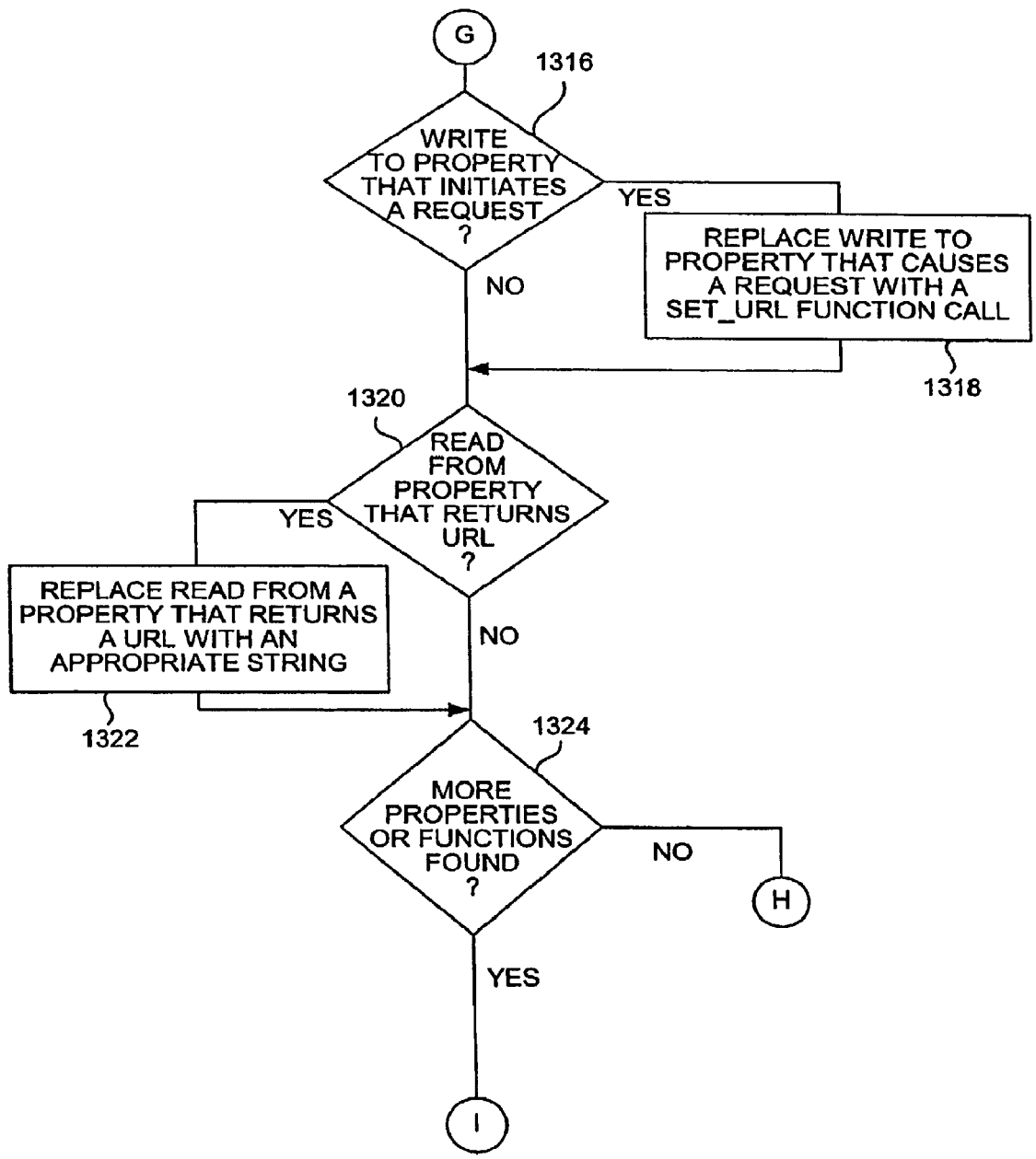

FIGS. 13A and 13B are flow diagrams of a script modification processing 1300 according to another embodiment of the invention. The script modification processing 1300 is, for example, performed by operation 938 illustrated in FIG. 9C. In general, the script modification processing 1300 operates to modify script portions within the resulting HTML.

The script modification processing 1300 initially scans 1301 the HTML data (e.g., of the resulting HTML) for a <script> tag. A decision 1302 then determines whether a script has been found. When the decision 1302 determines that a script has been found, then the script is parsed 1304 to determine or locate predetermined properties and functions associated with the script. A decision 1306 then determines whether at least one property or function has been found in the script. When the decision 1306 determines that at least one property or function has been found, then the script modification processing 1300 continues such that the script is modified with respect to the properties or functions found within the script so that the script operates as intended even though the intermediary server is interposed between client devices and remote servers.

In particular, for each property or function found within the script, the processing is as follows. A decision 1308 determines whether a selected property or function found within the script pertains to a read of a cookie property. When the decision 1308 determines that the identified property or function does pertain to a read of a cookie property, then the read of the cookie property is replaced 1310 with a get cookies function call. Alternatively, when the decision 1308 determines that the identified property or function is not a read of a cookie property, as well as following the operation 1310, a decision 1312 determines whether the identified property or function pertains to a write to a cookie property. When the decision 1312 determines that the identified property or function does pertain to a write to a cookie property, the write to the cookie property is replaced 1314 with a set_cookies functions call.

On the other hand, when the decision 1312 determines that the identified property or function is not associated with a write to a cookie property, as well as following the operation 1314, a decision 1316 determines whether the identified property or function pertains to a write to a property that initiates a request. When the decision 1316 determines that the identified property or function does pertain to a write to a property that initiates a request, then the write to the property that initiates (causes) a request is replaced 1318 with a set URL function call. Alternatively, when the decision 1316 determines that the identified property or function does not pertain to a write to a property that initiates a request, as well as following the operation 1318, a decision 1320 determines whether the identified property or function pertains to a read from a property that returns a URL. When the decision 1320 determines that the identified property or function does pertain to a read from a property that returns a URL, then the read from a property that returns a URL is replaced 1322 with an appropriate string.

Furthermore, following the decision 1320 when the identified property or function does not pertain to a read from a property that returns a URL, as well as following the operation 1322, a decision 1324 determines whether more properties or functions were found in the script that still need to be processed. When additional properties or functions have been found and need processing, the script modification processing 1300 returns to repeat the decision 1308 and subsequent operations so that the additional properties or functions can be similarly processed. On the other hand, when the decision 1324 determines that all the properties or functions that have been found within the script have been processed, then the script modification processing 1300 performs a decision 1326. The decision 1326 is also performed when the decision 1302 determines that a script has not been found. The decision 1326 determines whether there is more HTML data to be scanned. When the decision 1326 determines that there is more HTML data to be scanned, then the script modification processing 1300 returns to repeat the operation 1301 and subsequent operations. Alternatively, when the decision 1326 determines that there is no more HTML data to be scanned, the script modification processing 1300 is complete and ends.

Representative examples of a get cookies function, a set_cookies function, a set URL function, and string substitution are provided below. These examples are provided to assist understanding and thus should not be deemed restrictions on any aspect of the invention. The following examples use JavaScript as the scripting language.

A first example with respect to the get cookies function and operation 1310 is as follows. In this example, the script includes a script instruction var c=document. cookie;

which assigns the cookies associated with the document (page) to the variable c. This script instruction would be replaced with var c=get cookies ("othercookie=abc");

which assigns the cookies present on the intermediary server for the particular domain of the document (page) and the particular user (e.g., "othercookie=abc"). In addition, the get cookies function takes the cookies from the intermediary server as its argument and adds to it other cookies that are set by the script.

A second example with respect to the set_cookies function and operation 1314 is as follows. In this example, the script includes a script instruction document.cookie="selection=ijk; expires= . . . ";

which stores the cookies associated with the document (page) in the browser. This script instruction (statement) is replaced with document.cookie=set cookie ("<domain>", "selection=ijk; expires= . . . ";);

which stores the cookies associated with the document (page) in the browser and also to the intermediary server. The set cookie function includes two arguments. The first argument identifies the domain of the page having the script. The second argument is the value that was originally being assigned to the document.cookie property. The set cookie function combines these two arguments and sets a cookie called servercookieX with no expiration, where X represents a distinguishing numeric value. The browser will cause this cookie to be sent to the intermediary server. The intermediary server can then incorporate the cookie into the cookie storage for the user. The cookie can also be used to expire an existing cookie in storage for the user. Once the cookie is stored at the intermediary server, the next page that the intermediary server returns will cause the servercookieX to expire because it is no longer needed. Any calls to the set cookie function will also append any cookie values provided within the servercookieX.

To further illustrate, consider the following example where a page from www.xyz.com has the following script:

```
document.cookie = "a=b";
var x = document.cookie;.
```

Assume also the www.xyz.com server has previously returned a cookie to the intermediary server that has a name "id1" with a value "sam". The code above will be transformed into:

```
document.cookie = set cookie ("www.xyz.com", "a=b");
var x = get cookie ("id 1=sam");.
```

The first line will cause a cookie "servercookie0" to be set that has the value "a=b−domain=www.xyz.com", hence the whole cookie will be:
    servercookie0=a=b−domain=www.xyz.com.
Note that the domain part of the servercookie0 is used purely by the intermediary server so that it knows which domain is setting the cookie. The second line calls the get cookies function which takes its first argument (filled in by the intermediary server while the script was rewritten) and examines all servercookie0's cookies at the browser. It concatenates the first argument together with any servercookieX cookies, and returns the result:
    id 1=sam; a=b.
Note, this is the same result that would have been returned from the original page had it not been rewritten.

A third example with respect to the set URL function and operation 1318 is as follows. The set_URL function operates to modify properties that cause a request. In this example, the script includes a script instruction
    document. location="http://www.xyz.com/foo.htmi";
which directs the browser to a new page. Such a script instruction can be replaced with

```
document. location = set URL
    "", "http://www.xyz.com/foo.html");.
```

The set_URL function call takes two arguments. The first argument is filled in by the intermediary server while the script is being rewritten and contains any parameters that would normally be provided in a suffix (e.g., "danainfo:") to follow a URL. It is not always needed, as will be explained below. The second argument is the URL, though it could actually be a script expression (e.g., function call) that assembles or returns a URL.

The set URL function examines the URL being set and rewrites it to be of a form that will direct the browser to the intermediary server. As noted above, the modification to URLs can be achieved with various techniques.

If the page is using the host name modification technique, then relative URLs do not need to be modified since the host name encodes the necessary information. If the URL is a full URL, then the set URL function has all of the information it needs to convert the URL. For example, a suffix (e.g., ":danaInfo:host=xxx") can be appended to the URL. Thus, if the page that the script appears on is using the host name modification technique, the first argument is not needed by the set URL function.

Alternatively, if the page upon which the script is present is using the URL suffix technique, then a relative URL that is passed to the set URL function needs to have the same suffix applied to it. In this case, the intermediary server will insert, as the first argument to the set URL function, any arguments that need to be passed in the suffix. For example, if the URL of the page is:
    https://secure.danastreet.com/quote/msft:danaInfo: host=www.xyz.com
and a script instruction on the page includes:
    document. location="/quote/ibm";
then the rewritten script instruction would look like:
    document. location=set URL("Host=www.xyz.com", "/quote/ibm");
and the returned result from the set URL function would be:
    /quote/ibm:danaInfo:host=www.xyz.com
which would result in a request from the browser for:
    https://secure.danastreet.com/quote/ibm:danaInfo: host=www.xyz.com.
Alternatively, if the script instruction were instead:
    document. location="https://www.abc.com/info/msft";
then the rewritten script instruction would look like:
    document.location=set URL("Host=www.xyz.com", "https://www.abc.com/info/msft");
and the returned result from the set URL function would be:
    https://secure.danastreet.com/info/msft:danaInfo: host=www.abc.com.
Note that, in this case, the first argument to the set URL function is not needed because the second argument is a full URL and contains all of the information necessary to construct the final URL.

It should be noted that there are many functions or properties that, when written to, can cause the browser to fetch a URL. Some examples include:

```
window. open ('url', ...)
form.action ='url';
document.location ='url';
document. location. replace('url');
image.src ='url';.
```

A fourth example with respect to the string substitution and operation 1322 is as follows. The string substitution operates to modify properties that return a URL. Here, script instructions that read from a property that return a URL are replaced with a constant string. In this example, if the script includes
    var url=document. location;
such would be replaced by:
    var url="http://www.yahoo.com/foo.htmi".
This operation serves to ensure that any script examining its environment would not be confused by the fact that the actual URL of the page is different from what it expects. Note that there is more than one property that may need to be modified. Some examples of properties that can be so modified include:

| | |
|---|---|
| document.location | (returns full URL) |
| document.domain | (returns just the hostname part of URL). |

Figure 14:
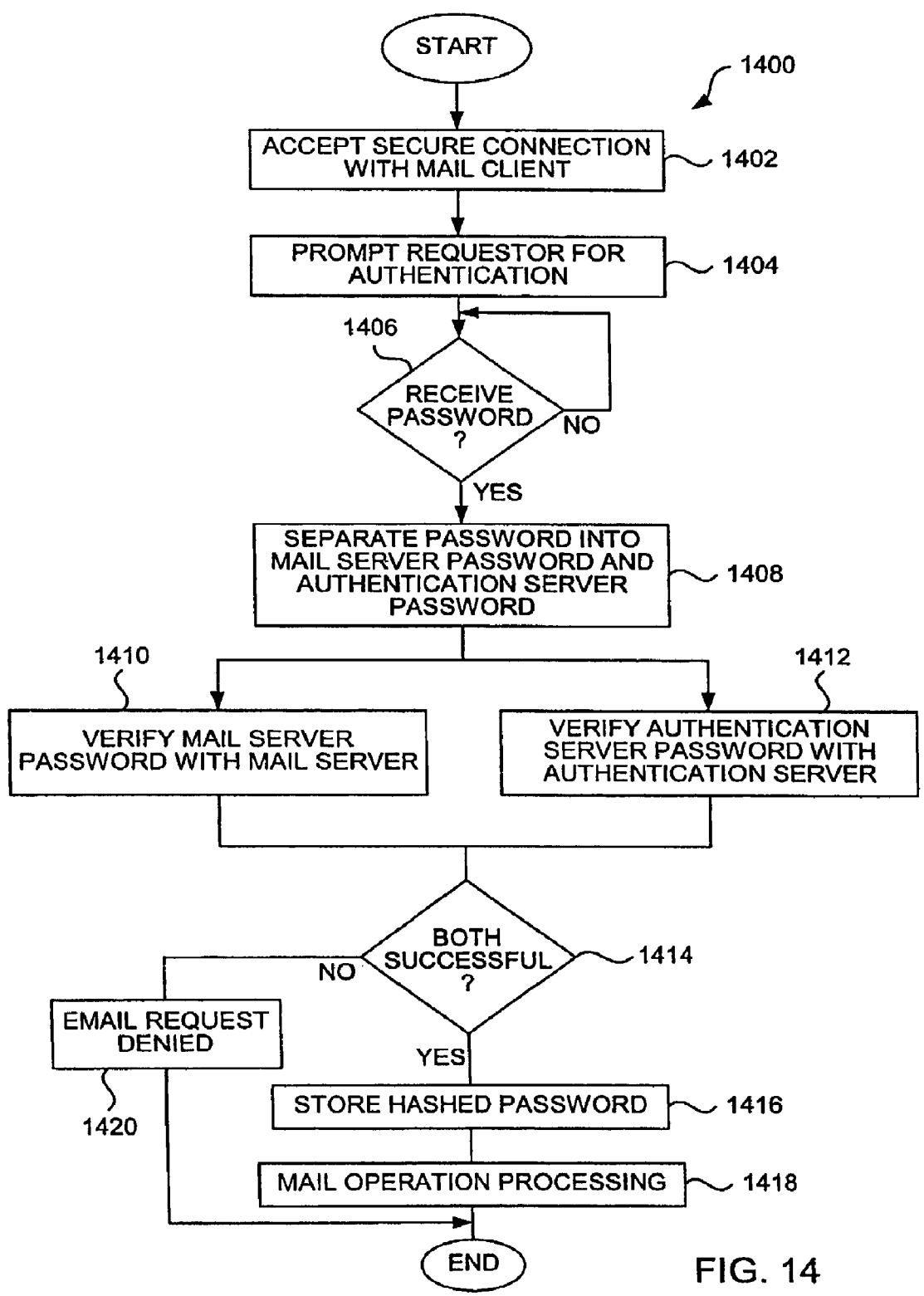
FIG. 14 is a flow diagram of email request processing according to one embodiment of the invention.

FIG. 14 is a flow diagram of email request processing 1400 according to one embodiment of the invention. The email request processing 1400 is, for example, suitable for use as the email request processing performed at block 628 of FIG. 6.

The email request processing 1400 initially accepts 1402 a secure connection with a mail client. Here, the secure connection between the mail client and the intermediary server that is being accepted 1402 can, for example, be made secure through use of a Secure Socket Layer (SSL). Next, the requestor is prompted 1404 for authentication. Typically, the requestor is prompted 1404 to enter at least a password that can be used to authenticate the requestor. A decision 1406 then determines whether a password has been received. Typically, but not necessarily, the password being received is encoded in some manner. For example, base-64 encoding is often utilized. When the decision 1406 determines that a password has been received, then the password can be separated 1408 into a mail server password and an authentication server password. As an example, the received password can include both the mail server password and the authentication server password separated by a password separator.

Next, the email server attempts to verify 1410 the mail server password. At about the same time, the authentication server password can attempt to be verified 1412 with the authentication server. Next, a decision 1414 determines whether both of the verifications of blocks 1410 and 1412 have been successful. When the decision 1414 determines that both of the verifications have been successful, then a hashed version of the password is stored 1416. Then, the mail operation processing 1418 associated with the email request is performed. On the other hand, when the decision 1414 determines that both of the verifications of blocks 1410 and 1412 are not successful, then the email request is denied 1420. Following the operations 1418 and 1420, the email request processing 1400 is complete and ends.

Figure 15:
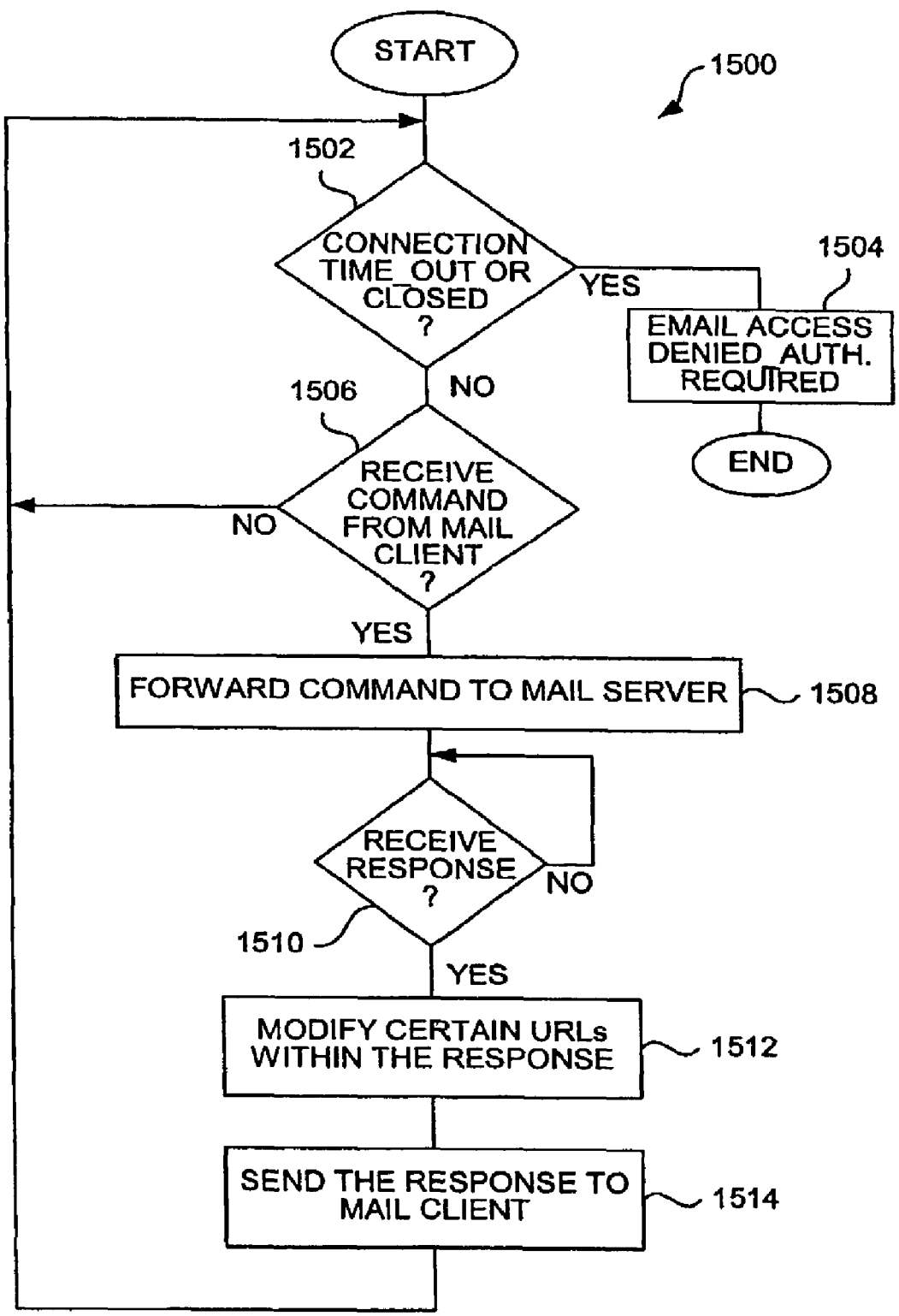
FIG. 15 is a flow diagram of mail operation processing according to one embodiment of the invention.

FIG. 15 is a flow diagram of mail operation processing 1500 according to one embodiment of the invention. The mail operation processing 1500 is, for example, one example of processing that can be performed by the block 1418 illustrated in FIG. 14.

The mail operation processing 1500 begins with a decision 1502 that determines whether the connection has timed-out or closed. Here, the connection refers to the secure connection between the mail client and the intermediary server. When the decision 1502 determines that a secure connection has timed-out or closed, then email access to the mail server is denied 1504. Hence, following the block 1504, the mail operation processing is complete and ends when the secure connection has timed-out or closed. However, the processing could continue to return a login page to the requestor to force the requestor to login and be authenticated in order to gain access to the mail server.

On the other hand, when the decision 1502 determines that an existing connection has not timed-out or closed, then a decision 1506 determines whether a command from a mail client has been received. When the decision 1506 determines that a command from a mail client has not been received, then the mail operation processing 1500 returns to repeat the decision 1502 and subsequent operations until a command from the mail client has been received or until the connection has timed-out or otherwise closed.

Once the decision 1506 determines that a command from a mail client has been received, then the command is forwarded 1508 to the mail server. Next, a decision 1510 determines whether a response has been received from the mail server. When the decision 1510 determines that a response has not yet been received from the mail server, then the mail operation processing 1500 awaits such a response. Once the decision 1510 determines that a response has been received, then certain Universal Resource Locators (URLs) within the response are modified 1512. For example, as part of the content transformation, links or URLs are able to be modified to redirect the links through the intermediary server. Next, the response is sent 1514 to the mail client. Here, the response is sent to the mail client using the connection that exists between the mail client and the intermediary server. Following the block 1514, the mail operation processing 1500 returns to repeat the decision 1502 and subsequent operations so that additional commands can be processed with respect to the mail server.

Figure 16:
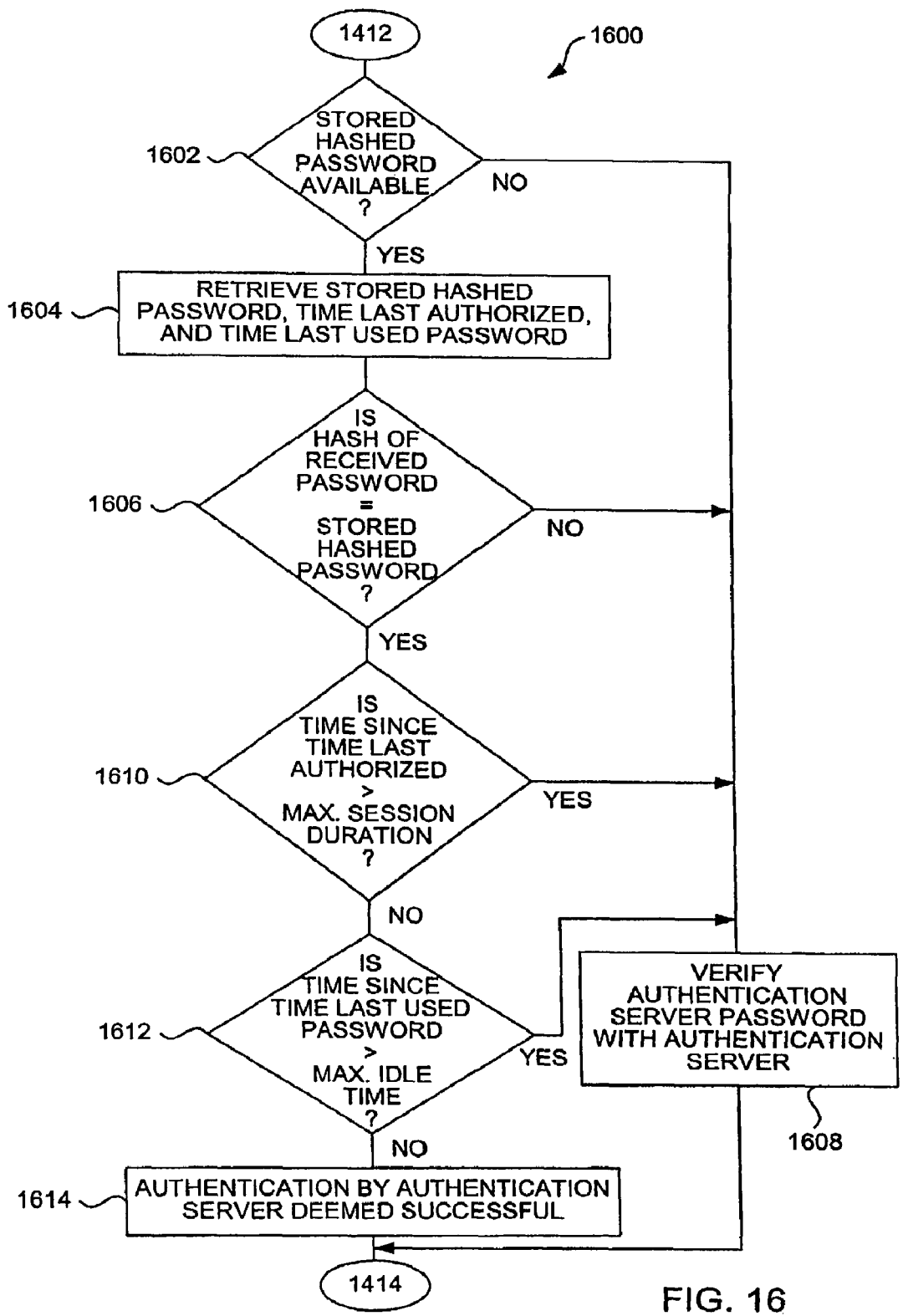
FIG. 16 is a flow diagram of authentication processing according to one embodiment of the invention.

FIG. 16 is a flow diagram of authentication processing 1600 according to one embodiment of the invention. The authentication processing 1600 represents one embodiment of the block 1412 illustrated in FIG. 14. In this embodiment, the intermediary server is able to bypass or avoid actual verification of a password with the authentication server when certain conditions are met. By doing so, the authentication can, in many cases, be performed very quickly and without the need to burden or annoy requestors.

The authentication processing 1600 begins with a decision 1602 that determines whether a stored hashed password is available. When a hashed password is previously stored (operation 1416 of FIG. 14), the hashed password can later be retrieved and used in this regard. Hence, when the decision 1602 determines that the stored hashed password is available, then the stored hashed password, a time last authorized and a time last used password are retrieved 1604. Typically, these values are stored in the data store associated with the intermediary server and are stored values that are particular to the requestor.

Next, a decision 1606 determines whether a hash of the received password equals the stored hashed password. When the decision 1606 determines that the hash of the received password is equal to the stored hashed password, then the requestor is, in effect, authenticated, because earlier in the session they entered the proper password that was then authenticated. Further, a decision 1610 determines whether the time since the time last authorized is greater than a maximum session duration. Here, the variable indicating the duration of time that has expired since the time last authorized is compared to the maximum session duration. Typically, the maximum session duration is set by the requestor or by the system administrator of the intermediary server.

In any case, when the decision 1610 determines that the time since the time last authorized does not exceed the maximum session duration, then a decision 1612 determines whether the time since the time last used password exceeds a maximum idle time. Here, the variable indicating the duration of time that has expired since the time last used password is compared to the maximum idle time. When the decision 1612 determines that the time since last used the password does not exceed the maximum idle time, then authentication 1614 by the authentication server is deemed successful without having to interact with the authentication server. Hence the authentication with respect to the authorization server is able to be bypassed when the hash of the received password equals the stored hash password, provided the time since last authorized does not exceed the maximum session duration, and further provided the time since last used the password does not exceed the maximum idle time.

On the other hand, the password is verified 1608 with the authentication server when the special conditions do not exist. For example, when the decision 1602 determines that the stored hash password is not available, then the verification 1608 with the authentication server is performed. Likewise, when the decision 1606 determines that the hash of the received password is not equal to the stored hash password, then the verification 1608 of the password with the authentication server also needs to be performed. Still further, when the decision 1610 determines that the time since last authorized exceeds the maximum session duration or when the decision 1612 determines that the time since last used the password exceeds the maximum idle time, then the password needs to be verified 1608 with the authentication server.

Following the operations 1608 and 1614, the authentication processing 1600 returns to perform other processing, namely, returns to the operation 1414 illustrated in FIG. 14. Hence, when the verification 1608 is able to be bypassed because the above-mentioned special conditions exist, the authorization processing is greatly simplified and often avoids the need to perform complicated authentication processing with respect to an authentication server or to prompt a requestor for authentication information.

Figure 17A:
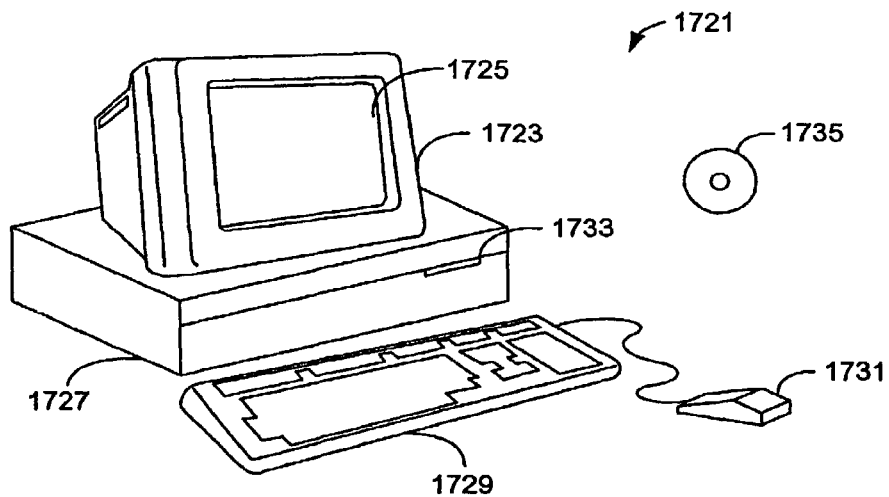
FIGS. 17A and 17B illustrate an example of a computer system that may be used in accordance with some embodiments of the invention.
Figure 17B:
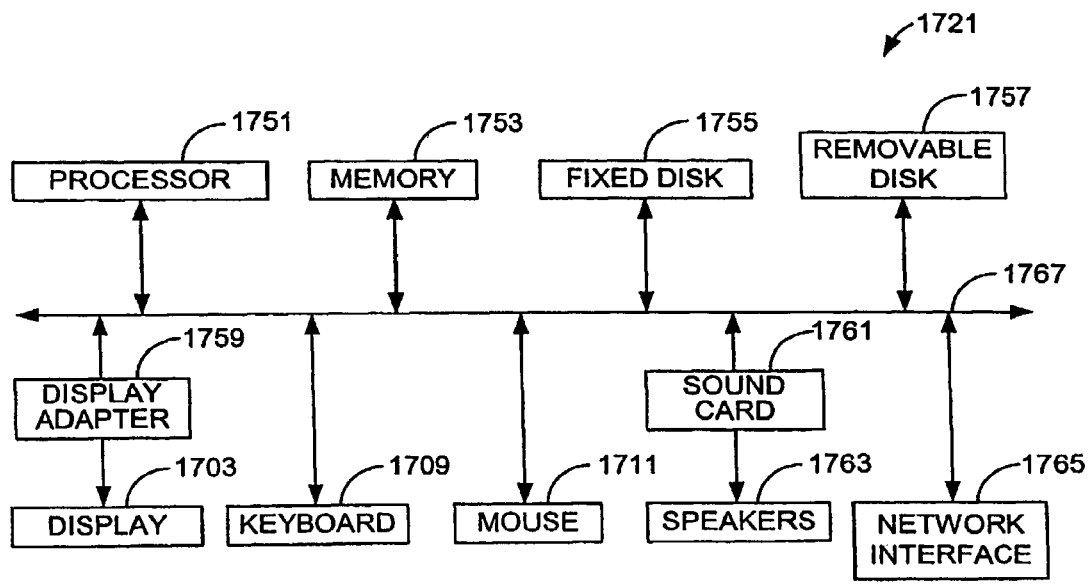

FIGS. 17A and 17B illustrate an example of a computer system that may be used in accordance with some embodiments of the invention. The computer system can, for example, correspond to any of the client machines, the intermediary server, or the remote or private servers. FIG. 17A shows a computer system 1721 that includes a display 1723, screen 1725, cabinet 1727, keyboard 1729, and mouse 1731. Mouse 1731 may have one or more buttons for interacting with a graphical user interface. The cabinet 1727 houses a removable medium (e.g., CD-ROM) drive 1733, system memory and a hard drive (see FIG. 17B) which may be utilized to store and retrieve software programs incorporating computer code that implements some embodiments of the invention, data for use with some embodiments of the invention, and the like. Although CD-ROM 1735 is shown as an exemplary computer readable storage medium, other computer readable storage media including floppy disk, tape, DVD, flash memory, system memory, and hard drive may be utilized. Additionally, a data signal embodied in a carrier wave (e.g., in a network including the Internet) may be the computer readable storage medium. In one implementation, an operating system for the computer system 1721 is provided in the system memory, the hard drive, the CD-ROM 1735 or other computer readable storage medium and serves to incorporate the computer code that implements some embodiments of the invention.

FIG. 17B shows a system block diagram of the computer system 1721 used to perform the processing of an embodiment of the invention. As in FIG. 17A, the computer system 1721 includes monitor 1723, keyboard 1729, and mouse 1731. The computer system 1721 further includes subsystems such as a central processor 1751, system memory 1753, fixed storage 1755 (e.g., hard drive), removable storage 1757 (e.g., compact disk), display adapter 1759, sound card 1761, speakers 1763, and network interface 1765. The central processor 1751 can, for example, execute computer program code (e.g., an operating system) to implement some embodiments of the invention. An operating system is normally, but necessarily, resident in the system memory 1753 during its execution. Other computer systems suitable for use with some embodiments of the invention may include additional or fewer subsystems. For example, another computer system could include more than one processor 1751 (i.e., a multi-processor system) or a cache memory.

The system bus architecture of computer system 1721 is represented by arrows 1767. However, these arrows are illustrative of any interconnection scheme serving to link the subsystems. For example, a local bus could be utilized to connect the central processor to the system memory and display adapter. The computer system 1721 shown in FIG. 17A is but an example of a computer system suitable for use with some embodiments of the invention. Other computer architectures having different configurations of subsystems may also be utilized.

Although the described embodiments refer to the use of a single intermediary server within an information retrieval system, it should be recognized that the information retrieval system can also include a plurality of intermediary servers. The various intermediary servers can individually receive requests from client machines and forward them to the appropriate servers and return responses back through the intermediary server to the client machine. By having multiple servers, not only can additional processing power be obtained, but load balancing, fault tolerance and localization issues can also be addressed.

Figure 18:
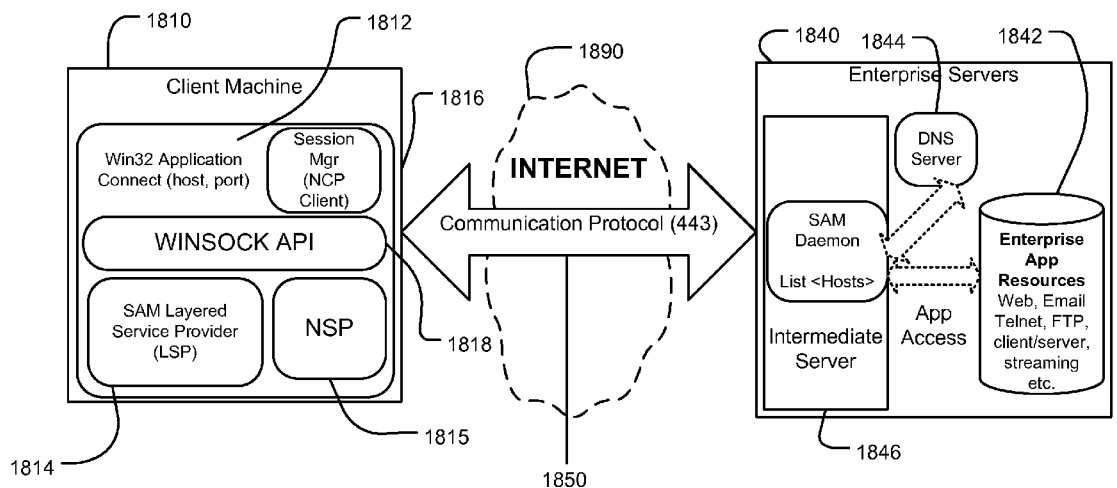
FIG. 18 is a block diagram of some embodiments of a secure application manager according to one embodiment of the invention.

FIG. 18 is a block diagram of some embodiments. Some embodiments include at least a client-side portion, some embodiments include at least a server-side portion, and some embodiments include at least one of each. FIG. 18 shows a client network 1810 which in this example includes a client machine, a remote network 1840 which in this example includes enterprise servers, and the Internet 1890 coupling the client network 1810 and the remote network 1840. The client machine includes 1810 includes a client application 1812 of client-server applications, such as a Win32 application; a layered service provider (LSP) 1814; a namespace provider (NSP) 1815; a session manager 1816; and a Winsock API 1818. The remote network 1840 includes server applications 1842 of client-server applications; DNS server 1844, and intermediate server 1846. The intermediate server 1846 includes a daemon 1848. The session manager 1816 and the daemon 1848 communicate over the Internet 1890 via a communication protocol 1850 (e.g., over port 443). The session manager 1816 can be called a communication protocol client. In many embodiments the intermediate server can be considered part of the remote network.

Some embodiments are called the secure application manager. Some embodiments of the secure application manager have separation at a network level between the client and the enterprise resources, and are therefore more secure.

Some embodiments of the secure application manager include client software, e.g. Win32 based software; that can transparently redirect remote access secure network connections on a per-application and/or per host basis securely through an intermediary server to enterprise client/server application resources. An administrator, for example, of the intermediate server, can configure some embodiments to secure some or all access into enterprise resources from specified client applications. Some examples of client-side applications are e-mail applications, contact management applications, or date book applications such as Outlook; client-side enterprise resource planning applications such as SAP R/3 client, client-side application service software such as Citrix ICA, browsers such as Internet Explorer, etc.

Some embodiments redirect the network connection request within a Windows socket layer, which can include one or more of: a Winsock dynamic link library, a Winsock 2 dynamic link library, an application programming interface, a layered service provider (LSP), a service provider interface for the layered service provider, a namespace provider (NSP), a namespace provider interface, a transport service provider interface, and the transport service provider.

Figure 19:
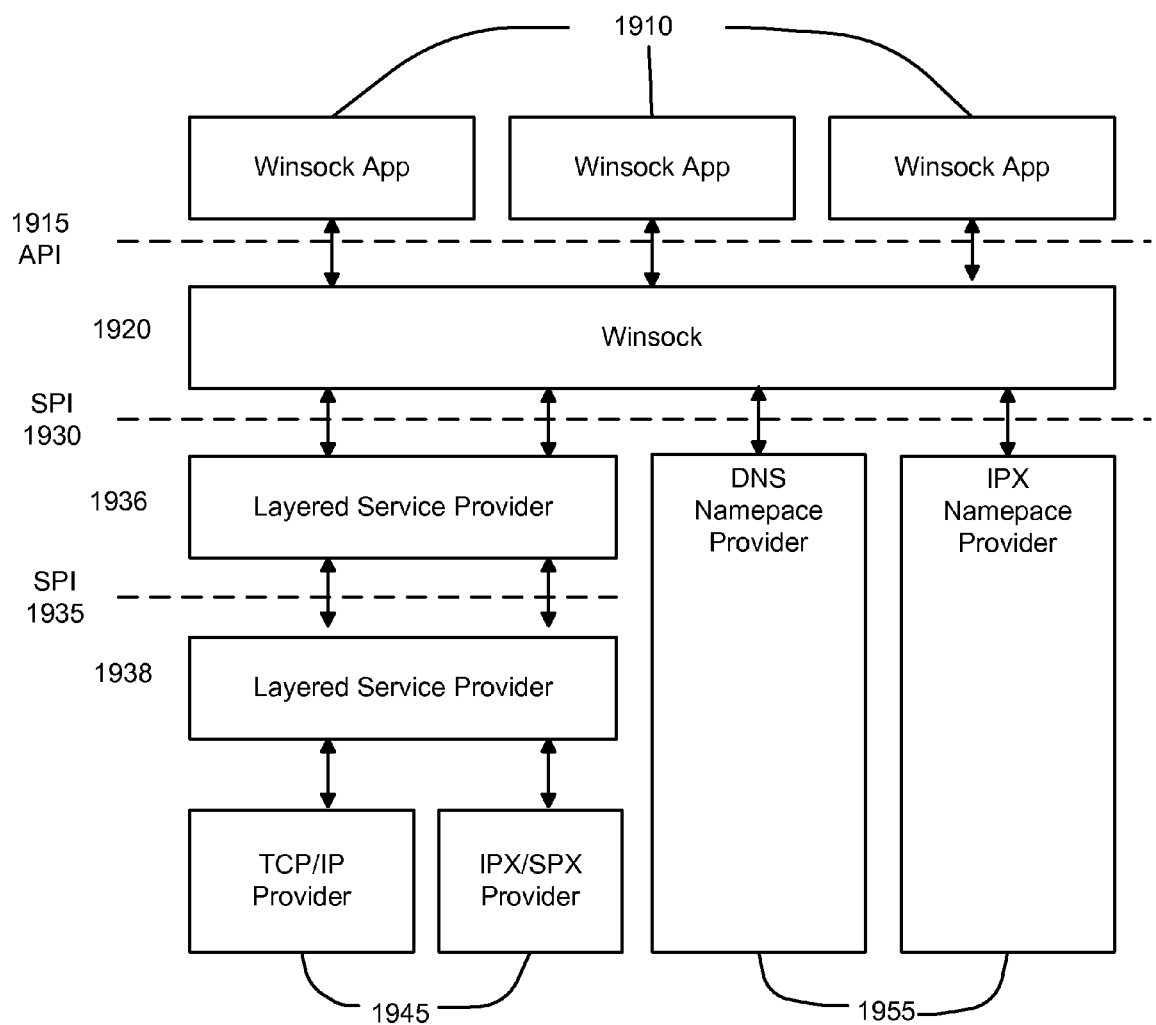
FIG. 19 shows a block diagram of Winsock applications and a Windows socket layer according to one embodiment of the invention.

FIG. 19 shows an embodiment including Winsock applications and a Windows socket layer. FIG. 19 shows Winsock applications 1910, a Winsock API 1915, a Winsock DLL 1920, a Winsock transport SPI and namespace SPI 1930, an LSP SPI 1935, LSP 1936 and 1938, transport service providers 1945 (TCP/IP transport service provider and IPX/SPX transport service provider shown), and namespace providers 1955 (DNS namespace provider and IPX namespace provider shown).

Figure 20:
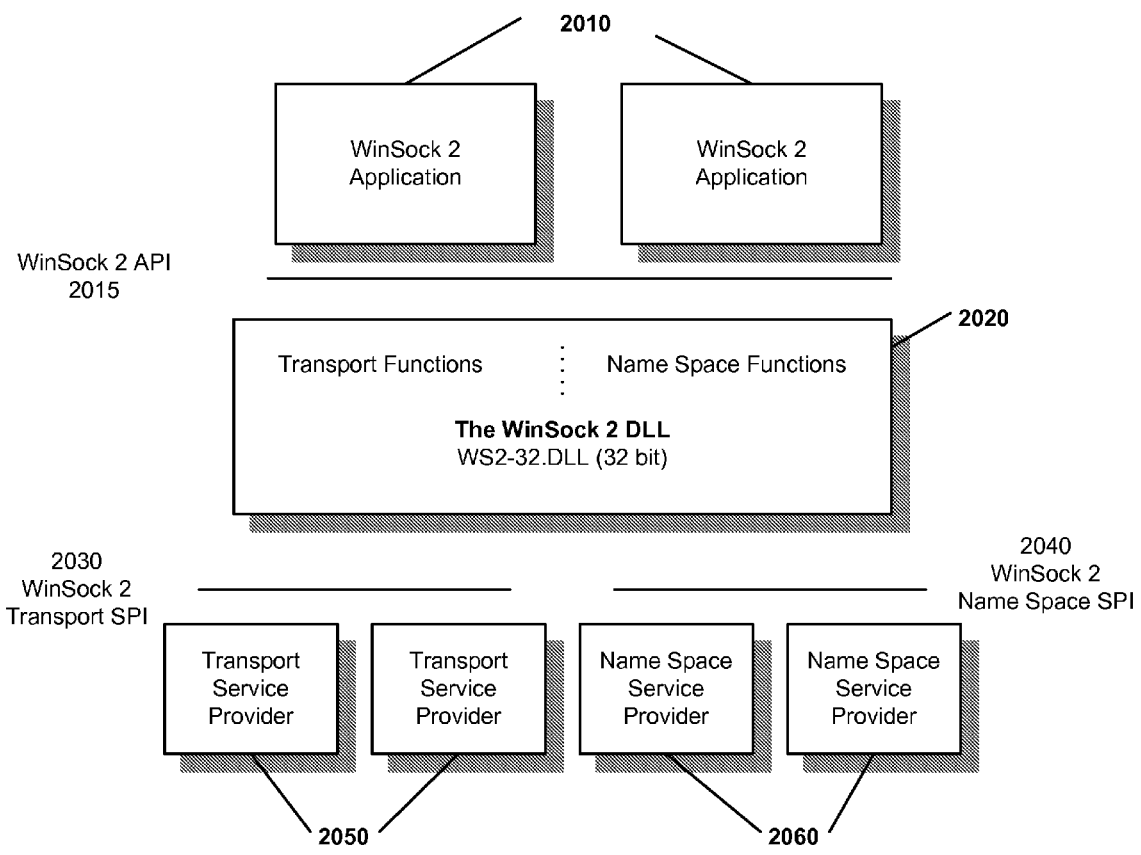
FIG. 20 shows another block diagram of Winsock applications and a Windows socket layer according to one embodiment of the invention.

FIG. 20 shows another embodiment including Winsock applications and a Windows socket layer. FIG. 20 shows Winsock 2 applications 2010, a Winsock 2 API 2015, a Winsock 2 DLL 2020, a Winsock 2 transport SPI 2030, a Winsock 2 namespace SPI 2040, transport service providers 2050, and namespace providers 2060.

The client software can be downloaded and launched (e.g., from an Active-X control that can exist on the intermediate server). The LSP and NSP can be installed into the system. The secure application manager proxy can be downloaded and launched (e.g., by the Active-X control).

In the early 1990s several software vendors collaborated and brought the first standardized TCP/IP connectivity to Windows, well known as Winsock. With the success of this software vendors found many applications for hooking into the network traffic stream and begin hooking, chaining, and replacing Winsock DLLs. This provided a solution for monitoring, modifying, or redirecting network traffic. However, the lack of a standard way to do this created many compatibility issues on Windows platforms.

In the mid 1990s the Winsock forum created the Winsock-2 specification. Some of the goals of this new API were: support for more Win32 I/O mechanisms such as overlapped and event based I/O, protocol Independence so that multiple vendors could plug in any type of network protocol to the Winsock API, and to standardize the mechanism for hooking Winsock calls (LSP).

Microsoft shipped the first Winsock-2 enabled OS in 1996 with Windows NT 4.0 and later with the release of Windows 98, released a Windows 95 update to upgrade the older systems to Winsock2.

The initial Winsock-2 and vendor LSP implementations were buggy and products based on these had limited success. Today in 2003 the Winsock-2 framework has stabilized and several products based on LSPs have proven the technology.

Winsock-2 standardizes not only the application programming interface (API) but the service provider interface (SPI) for both transport and namespace providers. In addition, the framework supports layering of transport providers, aka. LSPs. The actual Winsock DLL is implemented by Microsoft and any vendor is free to implement transport and namespace providers and install them into the system. Applications written to the legacy Winsock-1 API (e.g., winsock.dll, wsock32.dll, both known as a Winsock dynamic link library) are thunked to the new Winsock-2 API (ws2 32.dll, also called a Winsock dynamic link library).

A layered service provider (LSP) can be used in Windows, which provides LSP architecture that allows applications to roll out custom transport services over TCP/IP stack. If there is a LSP service installed on a client machine, then Win32 applications running on the client machine can automatically load the LSP service. The LSP service can then intercept some or all calls to Winsock calls and can add additional custom transport mechanisms. It can inspect, modify, and/or redirect network data and/or events from the Winsock API. By capturing network traffic at this level, the LSP can live in the context of the calling application and can have full access to its process information. There may be access application level data and not to TCP and/or IP level header information.

The LSP service can intercept traffic, such as some or all socket connect calls coming from a configured list of applications (for example, at the intermediate server), and securely transmit, such as over HTTPS using a communication protocol, for example a custom or standard protocol, through a session manager. Similarly, the NSP can handle DNS queries for a destination host name coming from a configured list of applications (for example, at the intermediate server), and securely transmit, such as over HTTPS using a communication protocol, for example a custom or standard protocol, through a session manager.

For handling session timeouts and/or simultaneously handling other access mechanisms, the LSP service can automatically choose to ignore (directly pass it to the Winsock API) the traffic intended for the host, which can be an IP address of the host where a client-side portion was downloaded from, which can be even when a browser is configured to be an application to be secured via the secure application manager.

Some embodiments include a dynamic link library such as a Win32 DLL that can export a function, WSPStartup( ). The installer can register the LSP and one or more protocol chains that describe the protocols to layer over and the order with respect to other LSPs. When an application loads the Winsock library, Winsock can call the LSP's WSPStartup( ) function. At this time, the LSP can return its SPI entry points to the Winsock catalog or the LSP positioned above in the chain. The LSP can load the next provider in the chain and perform the same entry point exchange. The chain can end at the transport service provider called the base transport provider. At this point, the calls can be dispatched to and from a TDI protocol driver in the kernel.

The LSP can be based on reference implementations supplied by Microsoft.

The LSP protocol chain install/uninstall code can be implemented in the same DLL using the self registering functions DllRegisterServer( ) and DlUnregisterServer( ) for easy integration into installers. Other embodiments can be implemented in multiple DLLs.

A namespace provider (NSP) can perform name resolution for a given name space. For the TCP/IP namespace the Microsoft implementation can perform DNS resolution. An NSP can include a dynamic link library such as a Win32 DLL that exports a function, NSPStartup( ). Similar to an LSP, the installer can register the NSP. Winsock can load the NSP as needed and exchange entry points. When NSPs are layered, e.g. multiple NSPs are installed sharing the same namespace, the behavior is undefined in Winsock-2.

The NSP can intercept DNS lookups to relay DNS requests to the secure remote network. The LSP can intercept the Winsock connect( ) call to redirect some or all outgoing TCP connections to the secure application manager proxy. The secure application manager can have multiple modes of operation. In one mode, such as an application proxy mode, the LSP loads into an administrator selected set of applications and redirects some or all connections within those applications to the intermediate server. In another mode, such as a destination proxy mode, the LSP loads into some or all processes and redirects based on an administrator selected list of destination hosts, address, and/or ports.

The NSP can be installed and co-exist with the Microsoft DNS provider. The secure application manager NSP can securely relay DNS requests across to the remote network. The Microsoft Winsock-2 implementation calls each provider in the order that they are enumerated in the registry. The first provider to return a non-empty result in a query ends the cycle and considers that to be the valid response. The NSP can be installed in the specified way using the Winsock-2 configuration API and can be re-ordered in the registry by swapping the names of the enumerated keys in the registry.

Microsoft can change the way this behaves. Another embodiment parses and spoofs DNS requests. However, parsing and spoofing the raw DNS traffic from the LSP adds difficulty to tracking which application is issuing the DNS request and impairs the ability to perform hostname lookups on a per-application basis.

The NSP entry points can be implemented in the same DLL as the LSP to keep the installation simple and lightweight. Other embodiments implement multiple DLLs.

The NSP install/uninstall code can be implemented in the same DLL using the self registering functions DllRegisterServer( ) and DllUnregisterServer( ) for easy integration into installers. Other embodiments implement multiple DLLs.

The secure application manager proxy can be a windowless Win32 application that can perform one or more of the following operations: manage connection to intermediate server, performs DNS requests for the NSP, manages port mapping for the LSP, retrieve secure application manager configuration data from intermediate server, and maintain redirect table.

A session manager (communication protocol client) can be, for example, a client such as a Win32 client (in some cases, ActiveX based) that can accept some or all traffic from the LSP service and/or can forward the traffic to the intermediate server using the communication protocol. The session manager listens on, for example, loopback addresses (127.0.0.1, 127.0.0.2. etc) for one, some, or all destination hosts secured via the LSP service.

The session manager can run in the system tray and can display a list of secured applications on the client applications. For each active application, the session manager can also display the status of the session, such as the number of bytes sent/received, similar to an already existing session manager.

The communication protocol can simulate TCP socket connections using HTTPS sessions. Each socket connection can be simulated using two half-duplex HTTPS sessions (upstream and downstream). The communication protocol can allow the session manager to secure some or all the traffic originating from client/server applications over SSL. By transmitting over HTTPS, the communication protocol can work through proxies and firewalls.

A single worker thread (in other embodiments, multiple threads or processes) can handle these tasks while a separate request thread (in other embodiments, the same thread or a different process) can handle incoming requests from the LSP and/or NSP. The request thread can minimize response times, avoiding unnecessary blocking in the client application that made the request. Some or all tasks performed by the worker thread can be asynchronous, making one thread for all tasks sufficient. If any performance issues arise due to a single thread processing the tasks, some tasks can be offloaded, such as to different worker threads.

The secure application manager can be launched from, for example, an Active-X control embedded in a web page on the intermediate server. The SSL session authentication can be handled by a browser such as Internet Explorer. When the secure application manager proxy is launched, it can attempt to establish a connection to the intermediate server. It can accomplish this with a name of the intermediate server host and the current session cookie. The Active-X control can write the host and cookie to a shared memory region using memory mapped files with, for example, the following names for the memory and mutex:

```
<name>:<communication protocol>:PageInformation:SharedMemory
<name>:<communication protocol>:PageInformation:Mutex
```

When this shared memory region is acquired, the data stored at the location is in a format, such as:

Data Format: <session cookie>+'\0'+<ivehostname>+'\0'

Data parameters can be passed into the communication protocol API for establishing a communication protocol session. In the event that the session times out, the communication protocol API can notify the secure application manager proxy which can query the user if the user wishes to re-connect or exit secure application manager, for example, via a pop up of a modal dialog box. If the user chooses to reconnect, the secure application manager proxy can open a new window, such as an Internet Explorer window, to the secure application manager page, which can force the login and re-launch of another instance of the secure application manager proxy. The new instance of the proxy can detect a previous instance and signal it, telling it to re-connect to the intermediate server. The new instance can exit after signaling the previous instance.

With an intermediate server session established, the secure application manager proxy can download the configuration data with a new communication protocol command. The data can come down to the secure application manager proxy in a form such as name=value pairs separate by a ';'. An example configuration string might look like:

"opmode=0; exitmode=0; apps=outlook.exe|Microsoft Outlook|28cb48bd8f, telnet.exe, netscp*; dests=10.10.3.0/8"

If the secure application manager can be configured to run in destination proxy mode, IP address/mask/port combinations can be placed into the redirect table for static redirects. Host names can be placed in a separate list and at run-time, the DNS lookup result can be placed into the redirect table for the purpose of redirecting based on the address associated with that hostname, and/or passing the hostname associated with the IP address to the communication protocol connection call.

The worker thread can receive DNS requests from the shared memory queue and pass the requests to the intermediate server. When the result arrives, it can be returned to the LSP response queue specified in the request. If the intermediate server fails to resolve the hostname, an empty result can be returned from the NSP which can allow the Microsoft DNS provider to perform the lookup.

A portmap request arrives from the LSP before it initiates the connection. The secure application manager proxy can find an available local address and port, such as a loopback address and port, to bind to and returns both back to the LSP while recording the association. The LSP then can initiate a connection to this loopback address and port. When the secure application manager proxy receives a connection indication it can initiate a connection to the intermediate server. When this connection is successfully made, the incoming connection from the loopback address can be accepted. Once the connections are made, a state machine based on, for example, the asynchronous 10 characteristics of the Winsock API and/or communication protocol API can handle the port mapped data.

The secure application manager can use a range of loopback addresses for port mapping, starting at 127.1.0.1 and ending at 127.1.255.254. There are many ways to choose a loopback address. In one embodiment, the secure application manager can first attempt to bind the starting address 127.1.0.1 and destination port. If this address is already in use, it can attempt to bind to the next address, 127.1.0.2. This can continue until it finds an available address to bind to. In the event that all 65 k addresses are in use on a given port, it can start over at 127.1.0.1 attempting to bind to alternate port numbers.

The user interface can be built as a separate Win32. This implementation can be broken out from the secure application manager proxy to free the user interface implementation from the constraints of the window-less secure application manager proxy. The Microsoft Foundation Classes can implement the user interface. It can launch as a hidden application with a system tray Icon. A selection (e.g., a right click of the icon) can pull up a menu. The user interface can be opened with a selection (e.g., double click on the icon, selecting open from the right hand click menu).

To give users a sense of which applications are and are not secured, a DLL, such as a separate DLL, can use Win32 status hooks to intercept the WM PAINT message for each process. The hook can provide a visual cue, such as by writing a status icon, e.g. to the upper right hand side of each window, to indicate if the application is securely connected to the intermediate server or not. The state information can come from reading a shared memory region created by the secure application manager proxy.

The LSP can be properly installed into the system to deal with locked files, versioning, and/or uninstallation.

The Active-X control can run within the browser which can be served up from the intermediate server. The control can download, uncompress, and/or run the programs and/or installations associated with secure application manager. It can be used with the network connect and secure application manager. The applications it launches can be scriptable; for example, VBscript can pass the program names to the control for download, uncompress, and/or launch.

The intermediate server daemon processes some or all the traffic received from the session manager. The daemon can in turn make socket connections to the destination hosts in the enterprise and can sends/receive data on behalf of the client application. The daemon can also contact the DNS server for the initial hostname resolution for the LSP/session manager running on the client.

The intermediate server secure application manager can have one or more functions.

1. All TCP based client/server applications can be supported, such as ones that do not contain server-initiated connections.

2. Some embodiments can support applications such as Outlook, Lotus Notes, and/or NetBIOS proxying (access to windows mapped network drives).

3. Some embodiments can be supported on Windows platforms and browsers such as Internet Explorer.

4. Some embodiments can work in all Internet access modes such as dialup, broadband and/or LAN scenarios from the client machine.

5. Some embodiments can work through client-side proxies and firewalls, such as devices that allow SSL traffic over port 443.

6. Some embodiments support third party end point security products. Some embodiments with application level access can be used from a secure client machine. Some embodiments work with personal firewalls such as Whole Security, Sygate, etc. before launching a network level access session.

The intermediate server can support integration with "Whole Security" vendor in the initial release. Specified registry settings can be checked on the client machine to make sure that some processes are running before launching the session.

Here is an example for supporting the "Whole Security"/ZoneAlarm integration:

1. Network client checks for the existing of the registry key
HKEY_LOCAL_MACHINE\SOFTWARE\Zone Labs
or
HKEY_CURRENT USER\Software\Zone Labs
2. Network client then checks for a running process that is tied to the ZoneAlarm exe.

Some embodiments implement integration generically enough such that an administrator can specify the vendor name and the associated registry keys/process name, and be supported by the secure application manager client.

One or more of the following can be administrator requirements.

1. The secure application manager can be a group-level feature. The administrator can restrict the users that will have access to the secure application manager, such as with intermediate server group based policies.

2. The administrator can configure the secure application manager feature in a mode such as application level access, access only to specified destination hosts, and/or access to specified destination hosts and ports.

2.A. For application level access, the administrator can specify a list of applications that need to be secured, e.g., sapR3.exe, outlook.exe, ie.exe, etc. NetBIOS proxying can be treated as a special application, such as with a keyword "netbios".

For one or more applications, an administrator can specify one or more of the following path of the executable (e.g., a complete path for the executable such as "% system Root\Program Files\SAP\sap r3.exe", a friendly description (e.g., SAP R/3 client, and/or a default of the executable name), an optional list of MD5 checksum values for the application executable that can be enforced by the secure application manager LSP for security reasons, and an optional list of destination hosts/ports that can be secured from the client applications.

2.B. For access only to the specified destination hosts, an administrator can specify a list of destination hosts that need to be secured. A secure application manager can automatically secure some or all the traffic intended for these destination hosts on some or all the TCP ports, UDP ports, and/or application version number.

A destination host could be represented as one or more of: a single IP address or IP address range; a destination hostname or a list of host names. Host names can use wildcard expressions such as * and ?, where * represents a pattern for any number of characters and ? represents a pattern for a single character. If IP addresses are specified and there is a reference from an application to a hostname, then the secure application manager can check the IP address to the list of hosts in the IP address range. The secure application manager can support at least one-way DNS lookup support for hostnames.

The destination host can be a hostname or an IP address. For hostnames, wildcards can be supported. The destination host can specified with a mask to represent a subnet in the format 10.10.0.0/255.255.0.0

2.C. For access to specified destination hosts and ports, an administrator can specify the list of destinations hosts and the ports that need to be secured. The secure application manager can automatically secure the traffic intended for these destination hosts and the ports.

3. The administrator can choose to provide access to other intermediate server functionality such as web browsing, file, telnet/ssh etc for the same group. The secure application manager can be configured as an additional access mechanism for a sub-group.

4. The administrator can configure the secure application manager for a group. The configuration of Java versus secure application manager (e.g., ActiveX) version can be automatically performed based on the client operating system (e.g., non-windows vs. Windows) by looking in the user-agent string.

5. In some embodiments, the administrator can configure an "auto-launch" secure application manager client for the end users (such as session manager).

6. The administrator can select "automatic full clean-up (uninstall) of the secure application manager client" on, for example, a per-group basis. A default value for this can be "disabled" which can provide an option for the end user to uninstall all the components on the secure application manager session manager.

7. The administrator can specify integration with an end-point security product such as "whole security". When selected, the secure application manager client can first check for the existence of the specified software package and make sure it is running before launching the secure application manager session. If a user's machine does not have the specified software or it is not running, then user can be returned an error with a proper description without launching the session.

For the purpose of making DNS and/or portmap requests from each instance of the LSP to the secure application manager proxy, some form of interprocess communication can be necessary. Windows has many interprocess communication types with dependencies. Interprocess communication which depends on the network can cause a re-entry into the LSP and create infinite loops. Interprocess communication which depends on Windows messages can be prone to errors and deadlocks from within an LSP with little control over the thread and process it is running in. Remaining choices are not implemented across many Microsoft platforms.

As an interprocess communication mechanism, memory mapped files can have no dependencies, exist across many platforms, and be relatively efficient.

To perform a synchronous call across processes from the LSP to the secure application manager proxy, multiple queues (e.g., two queues) and a Win32 Named Mutex can be used. The message queue can be implemented over a contiguous block of memory (memory mapped file) and can support variable sized messages. This queue can deal with data wrapping around from the head to the tail. A queue can have one sender and one receiver; two such queues can be used for a request/response sequence, such as an instance of the request queue on a system with a known name, and an instance of a response queue per LSP process with a unique name. The Named Mutex can handle synchronization of access to the memory. To make the request/response sequence synchronous, the requesting thread can wait for a signal from the response queue mutex when the response data is queued.

Figure 21:
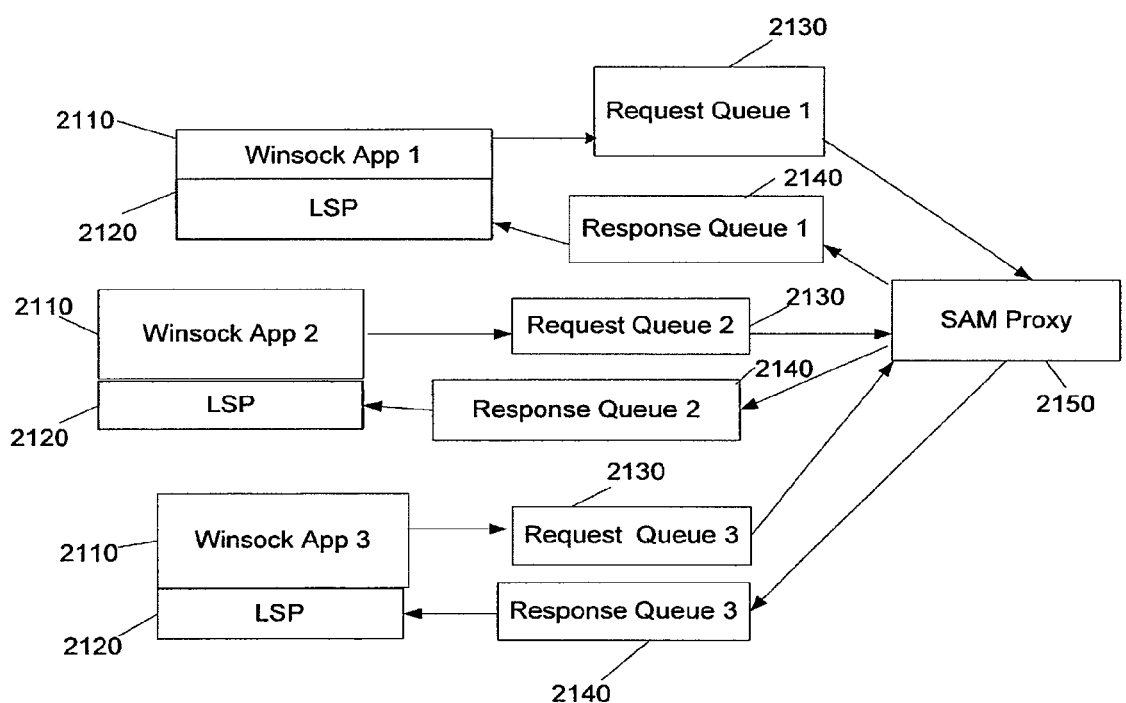
FIG. 21 shows a block diagram of queues between the secure application manager proxy and Winsock applications according to one embodiment of the invention.

FIG. 21 shows multiple queues. FIG. 21 shows Winsock applications 2110 and LSPs 2120, request queues 2130, response queues 2140, and secure application manager proxy 2150.

The memory mapped file regions and/or named mutexes can each require a known name for access. Since a process running under the same account (or across the entire system on e.g. Win 9x) can access this memory if the name is known, an extra step can be designed in to make it more difficult to access this memory. Known memory and mutex names that the secure application manager exposes can be used to store the real memory and mutexes names in encrypted format. The real memory and mutex names can be based on random names generated at run-time, such as with the strings ':Shared Memory' and ':Mutex' to denote their respective functions.

The known shared memory regions names can be defined as follows:

```
<name>:AppProxy:StartupRequestQueue
<name>:AppProxy:DnsRequestQueue
<name>:AppProxy:PortmapRequestQueue
<name>:AppProxy:Statistics
<name>:AppProxy:AppTable
<name>:AppProxy:FlowTable
<name>:<communication protocol>:PageInformation
```

The names of the StartupResponsetQueue, DnsResponseQueue and PortmapResponseQueue can be random strings that can be generated at runtime and can be passed along with the request.

Once the secure application manager proxy reads the session cookie from the <communication protocol>: PageInformation region, it can erase the cookie so it is not always 'hanging out' in memory.

The following pseudo-code shows one way of how the secure application manager proxy can read the session cookie from shared memory.

```
EnterReadLock( "<name>:<communication protocol>:PageInformation:Mutex")
OpenSharedMemory( "<name>:<communication protocol>:PageInformation:SharedMemory" )
EncryptedMemoryName = ReadEncryptedMemoryName( )
CloseSharedMemory( "<name>:communication protocol>:PageInformation:SharedMemory" )
LeaveReadLock( "<name>:<communication protocol>:PageInformation:Mutex" )
DecryptedMemoryName = Decrypt ( EncryptedMemoryName )
EnterWriteLock ( DecryptedMemoryName + ":Mutex" )
OpenSharedMemory( DecryptedMemoryName + ":SharedMemory" )
SessionCookie = ReadSessionCookie( )
ClearSessionCookie
CloseSharedMemory(DecryptedMemoryName + ":SharedMemory" )
LeaveWriteLock( DecryptedMemoryName + ":Mutex" )
```

The LSP can be installed onto the system like a normal client application. If the LSP is installed from the Active-X download area, these files could be wiped out by Internet Explorer, leaving a broken network configuration. Locked Files and Copy/Delete on reboot scenarios can be dealt with like other client software installations. One embodiment's install packaging tool compresses the LSP related files into a self-extracting exe. This exe along with the two others can be cab'ed for use with the Active-X downloader.

Figure 22:
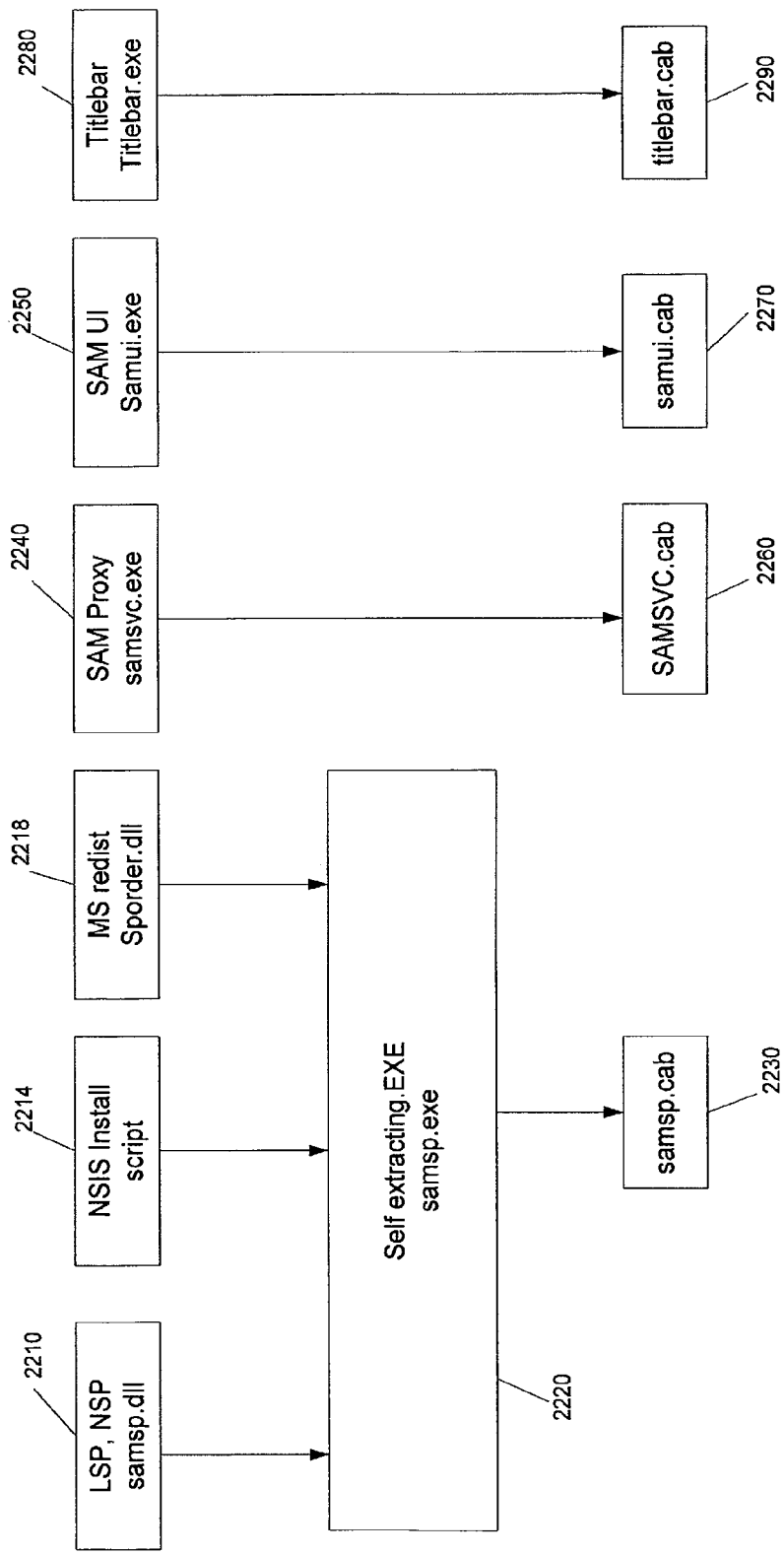
FIG. 22 shows a block diagram of installation packaging according to one embodiment of the invention.

FIG. 22 shows an example of installation packaging. LSP, NSP, and samsp.dll 2210, install script 2214, and MS redist Sporder.dll 2218, are compressed into self-extracting .EXE samsp.exe 2220, which is cab'ed into samsp.cab 2230. SAMP Proxy samsvc.exe 2240 is cab'ed into samsvc.cab 2260. SAM UI Samui.exe 2250 is cab'ed into samui.cab 2270. Titlebar Titlebar.exe 2280 is cab'ed into titlebar.cab 2290.

The following is one example of the operation of the secure application manager. Various embodiments can add, subtract, rearrange, and/or modify portions of the operation.

1. User selects the secure application manager on the intermediate server generated web page
   a. Active-X control downloads and installs LSP, NSP
   b. Active-X control downloads and launches secure application manager proxy
   c. Secure application manager proxy retrieves configuration data from intermediate server
   d. If operating in destination mode, address/mask/port combinations can be written to the redirect table
2. User launches new application, LSP, NSP load with process
   a. Application issues StartupRequest from LSP to secure application manager proxy to determine operating mode and/or if this app should proxied or not.
   b. If operating mode is application proxy and this application is not in list, LSP can step out of process, NSP can ignore DNS requests
   c. Secure application manager user interface extracts icon from application exe and adds to list in system tray
3. Application issues DNS lookup
   a. NSP issues DNS request to secure application manager proxy
   b. Secure application manager proxy issues DNS request to intermediate server
      i. If this is the intermediate server hostname issue local DNS lookup, record address(es)
   c. DNS response return along same path if any
4. Application issues connect to the IP address
   a. LSP issues portmap request to secure application manager proxy
   b. If this application, associated destination hostname, destination address/port are in the redirect table, then establish port map, and return local address/port to LSP
   c. LSP issues connection to address/port specified by secure application manager proxy
5. Client application shutdowns connection and/or closes socket
   a. Secure application manager proxy receives Winsock close notification
   b. Secure application manager proxy closes communication protocol connection
   c. Secure application manager proxy closes local portmap socket
6. Server closes connection
   a. Secure application manager proxy receives communication protocol close notification
   b. Secure application manager proxy closes local portmap connection and socket
   c. Application gets normal Winsock close notification
7. Application exits
   a. LSP Issues ApplicationCleanup message to secure application manager proxy to remove current application from active list.

The user interface can include components such as the System Tray Icon Application and the Win32 Hook for displaying secure application manager status, such as in the title bar of each application.

Some embodiments feature one or more of the following in the end user's user interface 1. End users can have the "Secure Client Applications" access mechanism in the intermediate server, only if they are allowed to, based on the intermediate server group based policies. The secure client applications access mechanism can launch a secure application manager (such as with ActiveX) based session or a Java session manager, depending on the administrator configuration for the subgroup. Some embodiments permit the end user to the select, such as between Java v/s ActiveX based secure application access mechanisms, and others choose automatically without user selection.
2. Users can select other intermediate server access mechanisms such as web browsing, file browsing, telnet/ssh, etc., along with the secure application manager if these are enabled for the user's sub-group in the intermediate server. A secure application manager access mechanism can be an additional access mechanism on the intermediate server.
3. The secure application manager client download can be of any size. Some embodiments take about 30 seconds or less over a dialup connection (such as 56 Kbps). Some embodiment of the secure application session manager start in 1 minute or less before the user can start accessing enterprise applications.
4. The installation of secure application manager client can require some admin privileges to install the components. If the user does not have the correct privileges, the user can be informed of the privileges problem. The user can be prompted to supply the correct administrator credentials to install the secure application manager client components.
5. The secure application manager session manager can display statistics such as a list of client applications secured by the secure application manager, and/or status for one or more of the client applications secured by the secure application manager. The list of client applications secured by the secure application manager can be an administrator configured list of applications that need to be secured. The icons associated with these client applications can be displayed. These applications/icons can be selected (e.g., clicked) to launch a secured version of the client application. For one or more of the client applications secured by the secure application manager, the session manager can provide a status, such as active (e.g., user launched the application) with optionally the number of sent/received bytes for this application, inactive (e.g., application not yet launched), and error (e.g., error with the session).
6. The secure application manager session manager can run as a background application under the same account privileges as the user that launched the secure application manager. User can select (e.g., click) the system tray icon to view the status of the secure application manager session.
7. Session managers (e.g., client/server, secure application manager session manager, and/or network connect) can run as a background application.
8. In the client, the secure application manager session on the session manager can gracefully close (disconnect and/or terminate). Upon closing the session manager, the secure application manager session manager can automatically recover the machine to a clean state. In some cases the machine can be recovered to a clean state after the session manager exits, in other cases it is recovered to a clean state after the next time the machine is rebooted.
9. The session manager window can have an option to open an intermediate server window.
10. When a user session times out, the intermediate server user experience can be similar to Java session manager functionality. The secure application manager session manager can display a status such as "error" and there can be an option to restart the session. Selecting (e.g., clicking) restart session can, for example, open up a new browser for the user to re-enter credentials. Once the user logs into the intermediate server, the secure application manager session can be re-launched. In some embodiments, the session manager can prompt the user to re-type the credentials on the client side by opening up the login web page to the intermediate server. The user can continue the existing application sessions without closing them.

11. Errors during the secure application manager client installation, session startup/recovery, and/or session failure can be reported in a log, such as Windows Event Log(Application Log) and/or in a custom user interface log of the session manager.

Modules can log messages to a text file which can reside in the same directory as the LSP (e.g., %Program Files%\name\Application Proxy\samlog.txt). This log can be read and display, e.g., upon demand from the system tray application. Upon uninstallation, this log file can be deleted.

An LSP can be upgraded in many ways. A current LSP can be locked into memory and it can be impossible to overwrite it with a new version without a reboot. To avoid this reboot, if the installer encounters a locked file, it can install a copy with a number appended to the end. For example if samsp.dll was locked, the install can write samsp1.dll to the installation directory and update the Winsock catalog accordingly. The old dll can be flagged for a delete on reboot. Multiple different versions of the LSP can be running at the same time inside different applications.

Interprocess communication message communication and shared memory table headers can contain version numbers for backwards compatibility between modules. Downloaded, installed, and/or running modules can have version number embedded in the binary file to determine when upgrades are needed.

Much Windows desktop software is not known to be a secure environment, so the majority of the security enforcement can be performed on the intermediate server. Efforts can be made on the client side to prevent users from tunneling un-authorized applications into the secure environment. A couple examples of this are optional checksum lists for applications and/or encrypting shared memory names to prevent malicious users from intercepting the portmap request protocol.

Standard Win32 localization techniques can be used in the user interface (e.g., Unicode).

Because the connection can be initiated with a browser such as Internet Explorer, some embodiments are careful not to attempt to redirect Internet Explorer traffic destined for the intermediate server host through the proxy. When the secure application manager proxy is launched, it can retrieve the intermediate server hostname and/or address, e.g. from the Active-X control. When an application issues a DNS request to the intermediate server hostname, a local DNS lookup can be performed, and the result returned to the application. The secure application manager proxy can then record the resulting address(es). When the application issues a connection to one of these addresses, some embodiments do not redirect this connection.

In order for the LSP to take affect and attach to a process, a new instance of an application can be launched after the LSP is installed into the protocol catalog. The intermediate server UI can warn the user of this. Some applications such as Internet Explorer may not always create a new process when a window is opened. An application launch icon can be placed in the system tray application to launch Internet Explorer and ensure a new process is created If the LSP was previously installed on the system, then an application may not have to be restarted.

Some embodiments rely on an Active-X control which may function only with Internet Explorer based browsers. Other embodiments support other browsers with e.g. a stand-along installation package. Some embodiments use Java or Netscape plug-ins to launch the modules.

Some embodiments support securing UDP and/or RAW IP traffic. When the secure application manager is running in application proxy mode, some or all non-TCP traffic can be rejected by the LSP.

Most networked file systems are implemented with a file system driver in the kernel and use the kernel based TDI interface for redirecting file system request to the network. This means that the LSP may not see this traffic.

Microsoft has provided a Winsock-2 Transport Provider for NetBIOS. If an application were to use this transport provider, the LSP could see the NetBIOS traffic. However, Windows Explorer does not use this transport provider for its NetBIOS usage.

Many embodiments have an LSP that interoperate with other LSP based products. Any TCP based client server application will work with some embodiments of the secure application manager.

Port mapping the connections through loopback addresses is done by some embodiments for proxying the traffic. Network data makes an extra round trip from the from user space to the kernel and back. Certain Windows services bind to loopback addresses and ports in the kernel for which Winsock has no knowledge of. The secure application manager proxy can think it successfully bound to a loopback address and port yet never receive any connections or data because a kernel service intercepted the request. One example of this is Microsoft remote desktop protocol takes over and controls 127.0.0.1:3389 without notifying Winsock.

Some embodiments create an interprocess communication interface between the LSP and the secure application manager proxy for performing socket I/O. This can be implemented with a Winsock-2 Transport Provider copies data and events across to another process via interprocess communication. The LSP can then act as a switch redirecting applications secured by secure application manager to the new Transport Provider.

The secure application manager can support web browsers such as Internet Explorer, Netscape, Opera, etc. Some embodiments use Java or Netscape plugging to launch native Win32 applications from a web-page.

A TDI hook driver can allow the capture and redirection of some or all NetBIOS traffic.

The communication protocol can support UDP based applications. The LSP and secure application manager proxy can e.g., use 'UDP Associate' command to setup UDP flows between the two.

The communication protocol protocols can support incoming TCP connections. The LSP and secure application manager proxy can use a 'bind' command to setup up an incoming connection from the proxy to the application.

SOCKS can support for UDP and incoming TCP connections. SOCKS can be supported in some embodiments.

Once the Active-X control is downloaded and installed onto the system for network connect or secure application manager, a web-site can script the control to download and run .exe's from their own server. Some controls deal with this issue by site locking the control, such as by restricting it to run from a specific host or domain(s).

Some embodiments have a handshake between the control and the intermediate server to validate that this is being scripted from a real intermediate server.

Some embodiments perform one or more of the following.

The following list elements can be modified, rearranged, added to, and/or removed.

1. A client can log into an intermediate server from a web browser. For this client, an intermediate server administrator can enable the intermediate server feature for accessing an application, such as an SAP client for the sake of illustration, using the intermediate server group based policies.

2. A selection from the client to start a session can launch the secure application manager session from the intermediate server menu.

3. A secure application manager client (which can be an ActiveX control) can be downloaded that installs an LSP service on the client machine. A new application that is launched on the client machine can be loaded with the LSP service. The secure application manager client can also run as a process in the system tray. As explained above, a session manager can secure some or all traffic intercepted by the LSP service for the configured applications. In addition the session manager can display the status of some or every active secure application manager session.

4. A user can launch a client application e.g., SAP client, to connect to an enterprise SAP application resource.

5. When the client tries to connect to a resource, such as sapservl.mycompany.com, the call is intercepted by the NSP service.

6. The NSP service can then forward the hostname to the intermediate server over the communication protocol.

7. The secure application manager daemon (protocol connector service) which can run in the intermediate server, resolves the hostname, sapsrvl.mycompany.com, in the intranet and returns the response back to the secure application manager client.

8. The secure application manager client based on a successful "resolved" response from the intermediate server, can automatically configure a port forwarding channel, for example by auto provisioning of an available loopback address such as 127.0.0.9.

9. The secure application manager client can then return the loopback address to the application.

Some embodiments support one or more of the following: static client/server applications; dynamic and/or multiple port TCP based client/server applications; specification of a list of destination host names, client port and/or server port for specific client/server applications; client/server port forwarding; integration with clients making superfluous specification of ports, destination host addresses etc.; one or more applications and/or destination hosts on a single port and/or multiple ports; client/server applications include server initiated connections (e.g., Active FTP) and/or client initiated applications; TCP and/or UDP based client/server applications; enterprise streaming resources such as Windows Media, Real, Quicktime, including live streaming; and enterprise real-time collaboration applications and/or e-Learning resources (such as Netmeeting, Sametime audio/video etc.).

The secure application manager can scale, for example supporting, for example, at least 500 or 1000 concurrent users.

Some embodiments have secure messaging, such as secure MAPI and/or Lotus notes.

Some embodiments secure client/server applications, such as static port client/server applications.

Some embodiments of the secure applications manager securing some or all client/server applications that use TCP, and some or all connections are initiated from the client.

Some embodiments have clustering support, such as handling session timeouts and/or simultaneously handling other intermediate server access mechanisms. LSP service can automatically choose to ignore the traffic intended for an intermediate server host (IP address of the host where secure application manager is downloaded from) even when IE is configured to be an application to be secured via the secure application manager.

Some embodiments have support for UDP based applications, and/or the use of a protocol such as SOCKSV5 instead of or in addition to the communication protocol.

Some embodiments have support for TCP based applications that can include server initiated connections, such as FTP. A protocol such as SOCKS V5 can be used instead of or in addition to the communication protocol.

Some embodiments have integration with third-party vendors, such as virus scanning and/or end point security products.

One example for the need for incoming TCP connections is to support FTP n active mode, which can be the default mode in most implementations. This can be referred to a client application on the client machine. When applications listens on a socket, it makes a call to the winsock API function listen( ). Inside the LSP, this call can be intercepted. A request is made to the local SAM proxy, referred to as a 'bind request'. A bind request includes an IP address and port that the client machine is bound to. The local SAM proxy in turn can make a bind request to the intermediate server which can allocate an IP address and port on the remote network, the port being the one specified by the client application on the local client machine. The intermediate server can listen for incoming connections on the newly allocate address/port. When a connection arrives, an incoming connection request is sent back to the local SAM proxy on the client machine, which in turns can forward the connection request to the actual address and port the client application was listening on. Incoming data from the remote network on this address/port (socket) can then be forwarded back to the client's client application and vice-versa. If the client application on the local client machine closes the TCP connection, the SAM proxy can send a connection close message to the intermediate server to tear down the connection.

If the client application on the remote network closes the TCP connection, the intermediate server can send a connection close message to the SAM proxy on the local machine, which can in turn tear down the TCP connection back to the server application on the local client machine.

If the client application on the client machine closes the socket it was listening on, the layered service provider can send a 'bind close' message to the secure application manager proxy which in turn can forward the request to the intermediate server to stop listening on that address and port.

UDP applications can be real-time multi-media applications such real-audio, cu-seeme, Voice over IP, etc. To support UDP in a generic manner, UDP traffic should be initiated from the client. Other embodiments support non-client initiated UDP traffic.

Inside the LSP, the WSPSend( ) and WSPSendTo( ) calls can be intercepted on UDP sockets. If this is the first UDP traffic seen on this address/port, a 'UDP Flow Request' can be sent from the client application to the local secure application manager proxy. The local secure application manager proxy in turn can make a 'UDP flow request' to the intermediate server. Once this is complete, the secure application manager proxy can allocate a local loopback address and UDP port for the client application. Inside the layered service provider, once the request has completed, the newly allocated address can be substituted in the destination parameter for the WSPSendTo( ) call (or send to( ) for winsock hook implementation); or during the WSPConnect( ) call for a connected UDP socket API usage (connect( ) in Winsock hook implementation).

The intermediate server can implement a UDP flow timer, if after a certain period of time, no UDP traffic is seen on the address and port, then it can tear down its 'UDP flow' client association. A UDP flow teardown message can then be sent back to the local secure application manager proxy on the client machine which tears down its local association. No notification may be sent back to the client application due the stateless nature of UDP. If the application send mores data to the UDP address and port after the timeout period has expired, a new UDP flow request can be initiated. The UDP timeout period can be reset when data is sent on the address and port.

Figure 23:
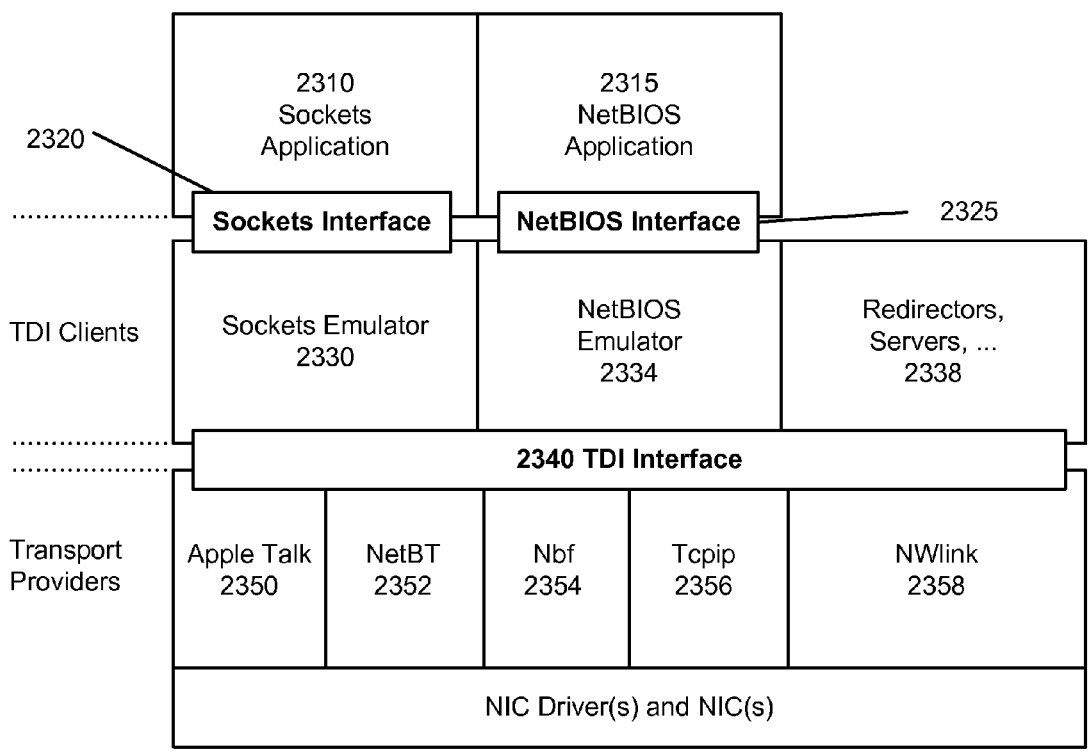
FIG. 23 shows a block diagram of applications and a transport driver interface on a client computer on a local network according to one embodiment of the invention.

FIG. 23 shows an example of applications and a transport driver interface on a client computer on a local network. FIG. 23 shows a sockets application 2310 and a NetBIOS application 2315. Transport driver interface clients include sockets emulator 2330, NetBIOS emulator 2334, and redirectors, servers, etc. 2338. Sockets interface 2320 is between the sockets application 2310 and the sockets emulator 2330. NetBIOS interface 2325 is between NetBIOS application 2315 and NetBIOS emulator 2334. Transport drivers (also called transport providers) include Appletalk transport driver 2350, NetBT transport driver 2352, Nbf transport driver 2354, TCP/IP transport driver 2356, and NWlink transport driver 2358. The transport driver interface 2340 is between the transport driver interface clients and the transport providers.

Some examples of kernel based TDI clients are NetBIOS, NFS, MS Remote Desktop Protocol, and Microsoft Internet Information Server. TDI clients may use Winsock for name resolution, in which case the Winsock-2 Namespace Provider can provide remote name service. Other network applications such as NetBIOS may perform additional functions such as broadcast discovery and/or name lookups generated in the kernel, in which case these events can be trapped in the kernel and/or perform custom handling. Some embodiments can have one or more modes of operation. One mode can be a generic mode, where name lookup results performed the Winsock Namespace provider can pass the results to the driver for filtering and re-direction. Another mode can have custom handlers specific to an application or protocol.

Figure 24:
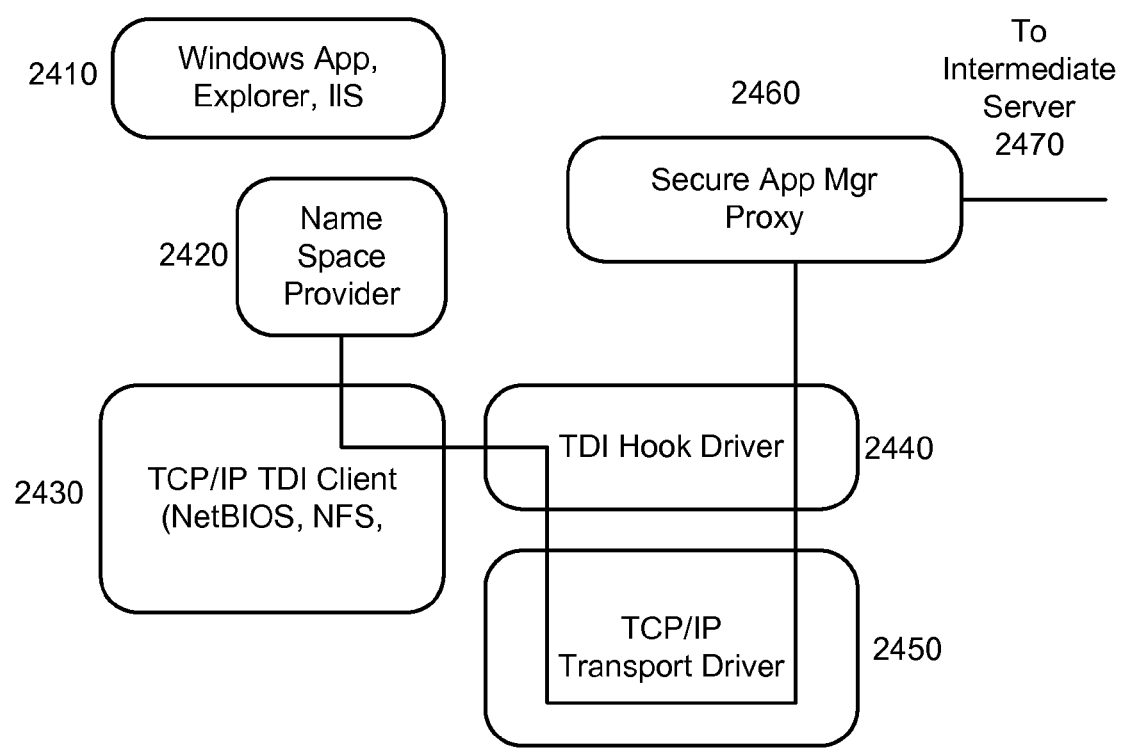
FIG. 24 shows a block diagram of a generic operating mode for redirecting file system network connection requests according to one embodiment of the invention.

FIG. 24 shows a generic operating mode. Shown are applications such as Explorer and IIS 2410, namespace provider 2420, TCP/IP TDI clients such as NetBIOS and/or NFS 2430, TDI hook driver 2440, TCP/IP transport driver 2450, secure application manager proxy 2460, and a remote connection towards the intermediate server 2470.

Figure 25:
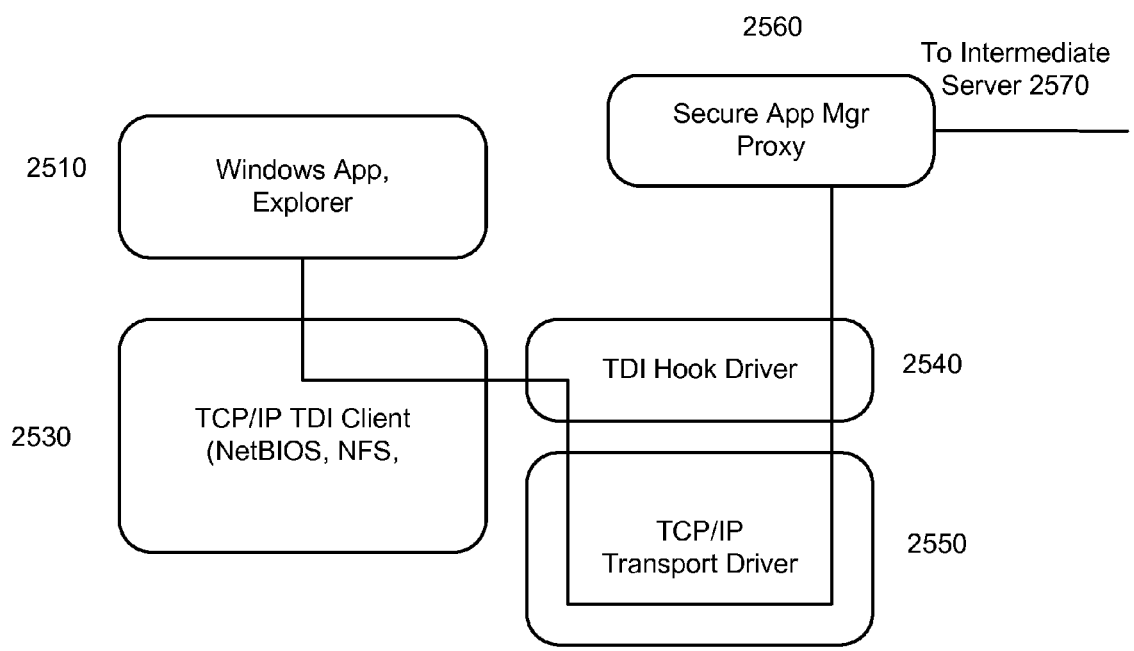
FIG. 25 shows a block diagram of a mode with custom handlers for redirecting file system network connection requests according to one embodiment of the invention.

FIG. 25 shows a mode with custom handlers, similar to FIG. 24 but missing the involvement of the namespace provider.

If an application is flagged on the server as a non-Winsock application, DNS lookups can be performed and/or the results passed to the TDI filter driver. A loopback address and port can be opened by the proxy and also passed to the driver, so that it can modify the target address to re-direct its traffic to the intermediate server.

NetBIOS can be treated by a protocol specific handler because it does not only use DNS. It can perform broadcast discovery using WINS (directed UDP requests to server) and UDP broadcasts on the LAN. It may then perform NetBIOS specific hostname resolution using WINS and/or UDP broadcasts, followed by DNS. To support seamless integration into Microsoft Windows a protocol specific handler can perform network discovery requests on the remote network. Even though NetBIOS can fall back to DNS after WINS and broadcast lookups custom name lookup handling can be performed. With custom name lookup handling, it will be more efficient if NetBIOS name resolution is used as opposed to waiting for timeouts and the fallback to DNS, and NetBIOS DNS resolution can be performed by a system service that started before the secure application manager was launched by the user, which can break the model of SAM.

The TDI Hook Driver can capture NetBIOS discovery requests, make copy of requests and pass to secure application manager proxy which can forward to the intermediate server. Results returned from the intermediate server can be retransmitted locally for the client to discover results.

The intermediate server can require a special protocol handler to support broadcast discovery and/or NetBIOS name lookups. The handler can perform typical NetBIOS tasks on behalf of the remote client, and/or return the results over the secure link.

The following is one example with NetBIOS. Steps can be added, removed, rearranged, and/or modified.

Figure 26:
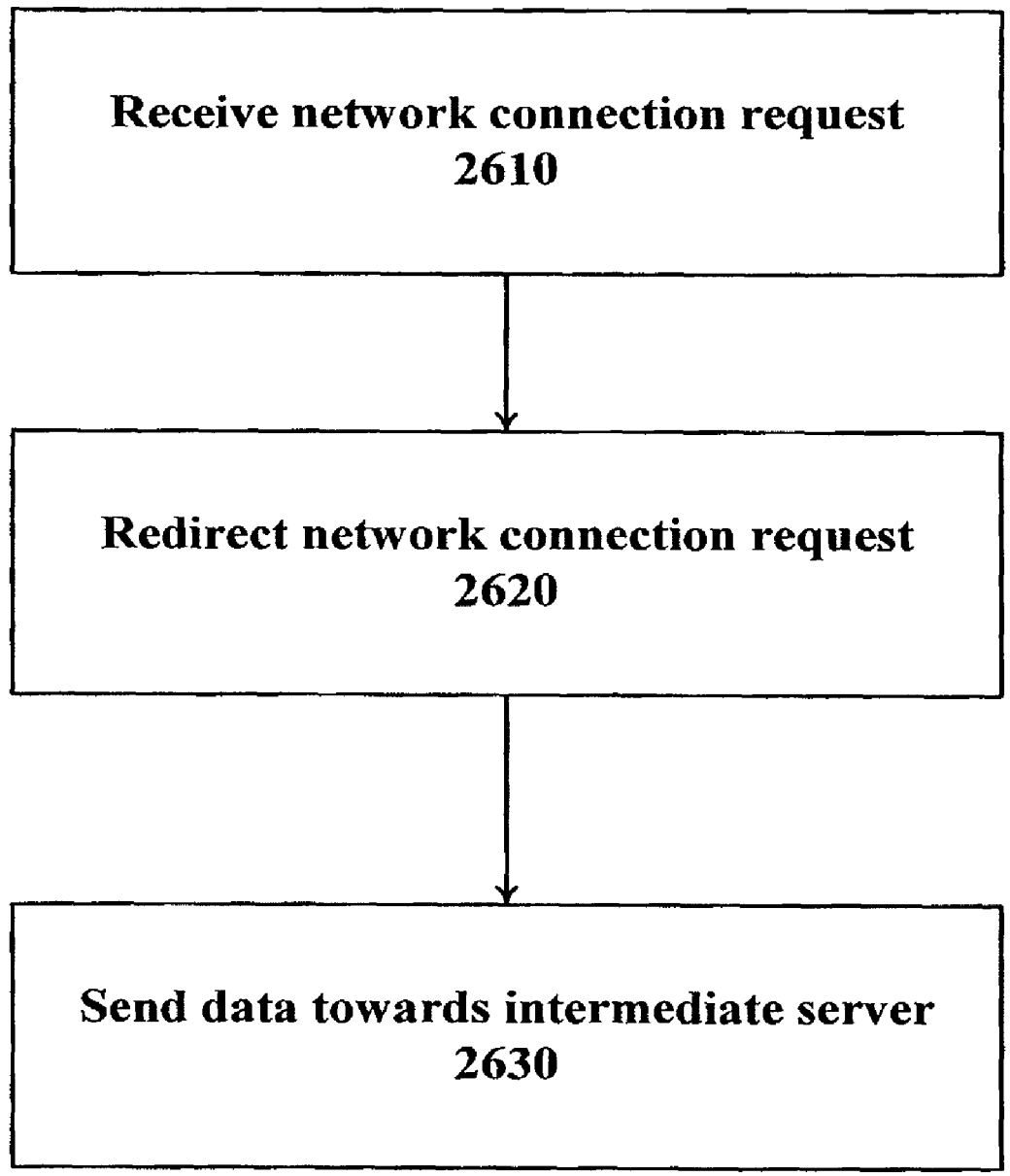
FIG. 26 shows a flow diagram for redirecting network connection requests according to one embodiment of the invention.

1. Administrator configures NetBIOS hosts and/or addresses to be accessed remotely
2. User logs in, configuration is sent to client
3. TDI hook driver loads
4. Secure application manager proxy loads, opens I/O channel to driver
5. User issues request to open network share by NetBIOS name
6. TDI hook driver detects directed WINS query on known NetBIOS ports or broadcast request
7. TDI hook driver consumes request and passes to proxy via ioctl
8. Proxy runs hostname through filtering process; if match found, NetBIOS name lookup forwarded to NetBIOS name service handler on intermediate server. If match not found, request is retransmitted on local network for normal operation.
9. Intermediate server performs WINS and/or broadcast name lookup depending on remote network configuration.
10. Proxy receives NetBIOS name lookup responses
    a. Opens loopback address and port for redirection
    b. Passes real IP address, port+loopback IP address and port TDI filter driver.
    c. Retransmits name lookup result to client application
11. TDI filter detects NetBIOS traffic on resulting destination IP address
12. TDI filter replaces destination IP address with assigned loopback address and port, as a result the TCP/IP stack transmits the data to the secure application manager proxy
13. Proxy forwards NetBIOS to intermediate server FIG. 26 shows a method embodiment. In 2610, a network connection request is received. In 2620, the network connection request is redirected. In 2630, data are sent towards the intermediate server. The method can permit secure remote access to the remote network.

The network connection request can be received on a computer on a local network. The network connection request can be initiated by a client application of a client-server application. The client application can be on the computer. The network connection request can include a destination on a remote network. A server application of the client-server application can be on the remote network.

The network connection request can be redirected within a Windows socket layer on the computer. This can include redirecting the network connection request with the namespace provider (e.g., utilized for domain name service lookups on the remote network) and the layered service provider (e.g., utilized for redirecting the data of the client application from the local network to the remote network). The network connection request can be redirected away from a transport service provider (e.g., a TCP/IP transport service provider) of the computer. The network connection request can be redirected to an intermediate server in the remote network. The intermediate server can perform the network connection request on behalf of the computer. The redirecting can be based on one or more of: a name of the client application, a checksum of the client application, a version of the client application, a server of the destination, and a port of the destination. Prior to the redirecting, the network request can pass through one or more of the Winsock dynamic link library and the Winsock 2 dynamic link library. The network connection request can be redirected to the intermediate server in the remote network via at least a proxy on the computer.

The data of the client application can be sent from the computer towards the intermediate server. A secure sockets layer (SSL) can encrypt communication between the computer and the intermediate server. The data of the client application can be sent from the intermediate server towards the server application. Various embodiments send the data of the client application from the intermediate server towards the server application, or allow this to occur by software or hardware outside of the embodiment. The data of the client application can be sent through at least a local address and a local port of the computer prior to sending the data of the client application towards the intermediate server.

In some embodiments, a visual cue can be provided to indicate a secure connection between the client application and the intermediate server. The namespace provider and the layered service provider can be automatically installed on the computer and/or uninstalled from the computer.

Figure 27:
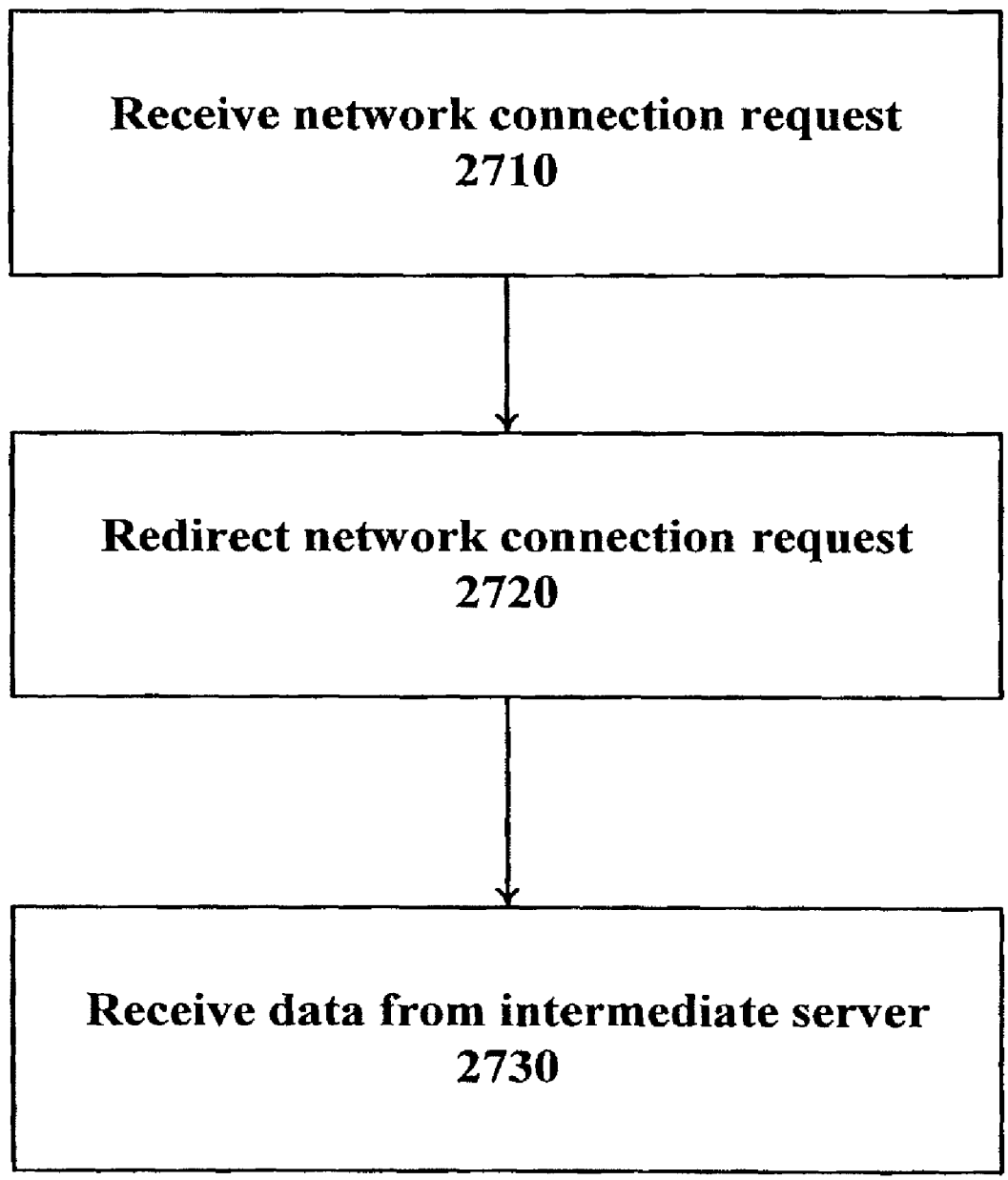
FIG. 27 shows a flow diagram for redirecting network connection requests according to another embodiment of the invention.

FIG. 27 shows another method embodiment. In 2710, a network connection request is received. In 2720, the network connection request is redirected. In 2730, data are received from the intermediate server. The method can permit secure remote access to the remote network.

The network connection request can be received on a computer on a local network. The network connection request can be initiated to a file system on a remote network. The network connection request can include a name of the file system.

The network connection request can be redirected using a transport driver interface on the computer, and may further use a namespace provider. The redirecting can capture network file system traffic. The network connection request can be redirected away from a transport driver (e.g., a TCP/IP transport driver) on the computer. The network connection request can be redirected to an intermediate server in the remote network. The intermediate server performs the network connection request on behalf of the computer. The redirecting is based on one or more of: a destination server and a destination port. Prior to the redirecting, the network connection request can pass through at least a transport driver interface filter.

At the computer data of the file system from the intermediate server can be received. A secure sockets layer (SSL) can encrypt communication between the computer and the intermediate server. The data of the file system can be transferred between the intermediate server and the file system on the remote network. Various embodiments transfer the data of the file system between the intermediate server and the file system, or allow this happen via hardware or software outside of the embodiment.

In some embodiments, the transport driver interface can be automatically installed on the computer and/or uninstalled from the computer.

The various aspects, features, embodiments or implementations of some embodiments described above can be used alone or in various combinations.

Some embodiments can be implemented in software, but can be implemented in hardware or a combination of hardware and software. Some embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of some embodiments are numerous. Different embodiments or implementations may yield one or more of the following advantages. One advantage of some embodiments is that an intermediary server can be interposed between remote servers and clients to facilitate secure access. Another advantage of some embodiments is that content requested by clients can be altered to direct subsequent client requests to an intermediary server which, in turn, acquires the requested content for the clients. Still another advantage of some embodiments is that an intermediary server can authenticate requestors seeking access to resources on private networks through use of native authentication provided by the private network. Yet still another advantage of some embodiments is that secure remote access to private networks can easily be provided for authorized persons at reasonable costs.

The many features and advantages of some embodiments are apparent from the written description and, thus, it is intended by the appended claims to cover all such features and advantages of some embodiments of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of network communication via a client-server application including a client application associated with a first network and a server application associated with a second network, the method comprising:
   generating a network connection request at a computer on the first network, the network connection request initiated by the client application on the computer, the network connection request including a destination of the server application on a destination server on the second network;
   redirecting the network connection request within a namespace provider and a layered service provider of a socket layer on the computer, the network connection request redirected away from a transport service provider of the computer to an intermediate server in the second network; and
   sending data of the client application from the computer towards the intermediate server, where the data of the client application is to be sent from the intermediate server towards the server application.

2. The method of claim 1, where the socket layer includes at least one of: a Winsock dynamic link library, a Winsock 2 dynamic link library, an application programming interface, a transport service provider interface, or a transport service provider.

3. The method of claim 2, where redirecting the network connection request within the socket layer includes redirecting the network connection request by hooking at least one of: the Winsock dynamic link library, or the Winsock 2 dynamic link library.

4. The method of claim 2, further comprising:
passing, prior to the redirecting, the network request through at least one of: the Winsock dynamic link library or the Winsock 2 dynamic link library.

5. The method of claim 1, where the namespace provider is utilized for domain name service lookups on the second network and the layered service provider is utilized for redirecting the data of the client application from the first network to the second network.

6. The method of claim 1, where the redirecting is based on at least one of a name of the client application, a checksum of the client application, a version of the client application, a destination server, or a port of the destination.

7. The method of claim 1, further comprising:
sending the data of the client application through at least a local address and a local port of the computer prior to sending the data of the client application towards the intermediate server.

8. The method of claim 1, further comprising:
automatically installing the namespace provider and the layered service provider on the computer; and
automatically uninstalling the namespace provider and the layered service provider from the computer.

9. A system, comprising:
a processor to:
receive a network connection request on a computer on a local network, the network connection request initiated to a file system on a remote network, the network connection request including a name of the file system;
redirect the network connection request using a namespace provider and a transport driver interface on the computer, the network connection request redirected away from a transport driver on the computer, the network connection request redirected to an intermediate server in the remote network; and
receive, at the computer, data of the file system from the intermediate server, where the data of the file system is transferred between the intermediate server and the file system on the remote network.

10. The system of claim 9, where the processor is further configured to:
pass the network connection request through at least a transport driver interface filter prior to the redirecting.

11. The system of claim 9, where the processor is further configured to:
transfer the data of the file system between the intermediate server and the file system.

12. The system of claim 9, where the processor is configured to redirect the network connection request based on at least one of a server associated with a destination or a port associated with the destination.

13. The system of claim 9, where when redirecting the network connection request, the processor is configured to capture network file system traffic.

14. The system of claim 9, where the processor is further configured to:
automatically install the transport driver interface on the computer.

15. The system of claim 9, where the processor is further configured to:
automatically uninstall the transport driver interface from the computer.

16. A computer-readable memory device including instructions for performing a method of network communication, the method comprising:
generating a network connection request at a computer on a first network, the network connection request initiated by a client application on the computer, the network connection request including a destination of a server application on a destination server on a second network, where the second network is different than the first network;
redirecting the network connection request within a namespace provider and a layered service provider of a socket layer on the computer, the network connection request redirected away from a transport service provider of the computer to an intermediate server in the second network; and
sending data of the client application from the computer towards the intermediate server, where the data of the client application is to be sent from the intermediate server towards the server application.

17. The computer-readable memory device of claim 16, where the socket layer includes at least one of: a Winsock dynamic link library, a Winsock 2 dynamic link library, an application programming interface, a transport service provider interface, or the transport service provider.

18. The computer-readable memory device of claim 17, where redirecting the network connection request within the socket layer includes redirecting the network connection request by hooking at least one of: the Winsock dynamic link library, or the Winsock 2 dynamic link library.

19. The computer-readable memory device of claim 16, where the namespace provider is utilized for domain name service lookups on the second network and the layered service provider is utilized for redirecting the data of the client application from the first network to the second network.

20. The computer-readable memory device of claim 16, where the redirecting is based on at least one of a name of the client application, a checksum of the client application, a version of the client application, a destination server, or a port of the destination.

* * * * *